(12) United States Patent
Zhang et al.

(10) Patent No.: US 10,382,598 B1
(45) Date of Patent: *Aug. 13, 2019

(54) PHYSICAL LAYER FRAME FORMAT FOR WLAN

(71) Applicant: Marvell International Ltd., Hamilton (BM)

(72) Inventors: Hongyuan Zhang, Fremont, CA (US); Yakun Sun, Sunnyvale, CA (US); Lei Wang, San Diego, CA (US)

(73) Assignee: Marvell International Ltd., Hamilton (BM)

( * ) Notice: Subject to any disclaimer, the term of this patent is extended or adjusted under 35 U.S.C. 154(b) by 5 days.

This patent is subject to a terminal disclaimer.

(21) Appl. No.: 15/265,614

(22) Filed: Sep. 14, 2016

Related U.S. Application Data

(63) Continuation-in-part of application No. 15/143,075, filed on Apr. 29, 2016.

(60) Provisional application No. 62/156,076, filed on May 1, 2015, provisional application No. 62/218,309, filed (Continued)

(51) Int. Cl.
| | |
|---|---|
| *H04L 27/28* | (2006.01) |
| *H04L 29/06* | (2006.01) |
| *H04W 28/04* | (2009.01) |
| *H04W 28/06* | (2009.01) |
| *H04W 84/12* | (2009.01) |

(52) U.S. Cl.
CPC .............. *H04L 69/22* (2013.01); *H04W 28/04* (2013.01); *H04W 28/06* (2013.01); *H04W 84/12* (2013.01)

(58) Field of Classification Search
None
See application file for complete search history.

(56) References Cited

U.S. PATENT DOCUMENTS

| | | |
|---|---|---|
| 6,553,534 B2 | 4/2003 | Yonge, III et al. |
| 6,856,590 B2 | 2/2005 | Okada et al. |
| 7,046,746 B1 | 5/2006 | Keaney et al. |

(Continued)

FOREIGN PATENT DOCUMENTS

| | | |
|---|---|---|
| WO | WO-2006/025996 | 3/2006 |
| WO | WO-2008/046163 | 4/2008 |

(Continued)

OTHER PUBLICATIONS

U.S. Appl. No. 15/180,801, Sun et al., "Signaling PHY Preamble Formats" filed Jun. 13, 2016.

(Continued)

*Primary Examiner* — Kouroush Mohebbi

(57) ABSTRACT

A first format according to which a PHY data unit is to be generated is selected. The data unit is generated according to the first format, including generating a PHY preamble of the PHY data unit to include a first field and a second field. The PHY preamble is generated so that one or more OFDM symbols are rotated by 90 degrees with respect to other OFDM symbols in the PHY preamble to signal the first format. Or, the first field is generated to include a set of bits that according to an error detection scheme that does not conform to a second format; or the set of information bits indicates a mode not supported in connection with the second format. Or, a duplicate of at least one of the first field and the second field is included in the PHY preamble, to signal the first format.

20 Claims, 22 Drawing Sheets

Related U.S. Application Data on Sep. 14, 2015, provisional application No. 62/218,309, filed on Sep. 14, 2015.

(56) References Cited

U.S. PATENT DOCUMENTS

| | | |
|---|---|---|
| 7,478,314 B1 | 1/2009 | Cheong et al. |
| 7,558,537 B2 | 7/2009 | Trachewsky et al. |
| 7,577,210 B2 | 8/2009 | Lee |
| 7,599,332 B2 | 10/2009 | van Zelst et al. |
| 7,742,390 B2 | 6/2010 | Mujtaba |
| 7,773,565 B2 | 8/2010 | Hansen et al. |
| 7,889,707 B2 | 2/2011 | Niu et al. |
| 7,904,519 B2 | 3/2011 | Czotscher et al. |
| 7,961,593 B2 | 6/2011 | Porat et al. |
| 7,974,225 B2 | 7/2011 | Kasher |
| 8,144,647 B2 | 3/2012 | Nabar et al. |
| 8,155,138 B2 | 4/2012 | van Nee |
| 8,201,065 B1 | 6/2012 | Cheong et al. |
| 8,289,869 B2 | 10/2012 | Sawai |
| 8,310,981 B2 | 11/2012 | Damnjanovic et al. |
| 8,339,978 B2 | 12/2012 | Sawai et al. |
| 8,369,301 B2 | 2/2013 | Cai |
| 8,494,089 B2 | 7/2013 | Aoki et al. |
| 8,526,351 B2 | 9/2013 | Fischer et al. |
| 8,532,077 B2 | 9/2013 | Stacey et al. |
| 8,599,804 B2 | 12/2013 | Erceg et al. |
| 8,619,907 B2 | 12/2013 | Mujtaba et al. |
| 8,627,171 B2 | 1/2014 | Pi |
| 8,681,757 B2 | 3/2014 | Lee et al. |
| 8,718,021 B2 | 5/2014 | Yu et al. |
| 8,724,720 B2 | 5/2014 | Srinivasa et al. |
| 8,737,189 B2 | 5/2014 | Hansen et al. |
| 8,867,653 B2 | 10/2014 | Zhang et al. |
| 8,873,680 B2 | 10/2014 | Zhang |
| 8,885,740 B2 | 11/2014 | Zhang et al. |
| 8,948,283 B2 | 2/2015 | Zhang |
| 8,953,696 B2 | 2/2015 | Stoye |
| 8,982,889 B2 | 3/2015 | Zhang |
| 9,131,528 B2 | 9/2015 | Zhang et al. |
| 9,209,837 B1 | 12/2015 | Cheong et al. |
| 9,258,178 B2 | 2/2016 | Zhang |
| 9,350,583 B2 | 5/2016 | Zhang |
| 2002/0003773 A1 | 1/2002 | Okada et al. |
| 2002/0188908 A1 | 12/2002 | Yonge et al. |
| 2003/0056043 A1 | 3/2003 | Kostadinov |
| 2004/0179627 A1 | 9/2004 | Ketchum et al. |
| 2006/0034384 A1 | 2/2006 | Lee |
| 2006/0176966 A1 | 8/2006 | Stewart et al. |
| 2006/0182017 A1 | 8/2006 | Hansen et al. |
| 2007/0183523 A1 | 8/2007 | Koo et al. |
| 2008/0299962 A1 | 12/2008 | Kasher |
| 2009/0086699 A1 | 4/2009 | Niu et al. |
| 2009/0122771 A1 | 5/2009 | Cai |
| 2009/0190465 A1 | 7/2009 | Porat et al. |
| 2009/0196163 A1 | 8/2009 | Du |
| 2010/0034323 A1 | 2/2010 | Stoye |
| 2010/0046358 A1 | 2/2010 | van Nee |
| 2010/0046656 A1 | 2/2010 | van Nee et al. |
| 2010/0091673 A1 | 4/2010 | Sawai et al. |
| 2010/0091675 A1 | 4/2010 | Sawai |
| 2010/0103920 A1 | 4/2010 | Damnjanovic et al. |
| 2010/0202301 A1 | 8/2010 | Wen et al. |
| 2010/0260159 A1 | 10/2010 | Zhang et al. |
| 2010/0309834 A1 | 12/2010 | Fischer et al. |
| 2011/0002219 A1 | 1/2011 | Kim et al. |
| 2011/0032875 A1 | 2/2011 | Erceg et al. |
| 2011/0110348 A1 | 5/2011 | Lee et al. |
| 2011/0122846 A1 | 5/2011 | Yu et al. |
| 2011/0271169 A1 | 11/2011 | Pi |
| 2012/0170563 A1 | 7/2012 | Abraham et al. |
| 2012/0195391 A1 | 8/2012 | Zhang et al. |
| 2012/0201316 A1 | 8/2012 | Zhang et al. |
| 2012/0236971 A1* | 9/2012 | Taghavi Nasrabadi ............ H04L 5/0023 375/340 |
| 2012/0294268 A1 | 11/2012 | Lee et al. |
| 2012/0294294 A1 | 11/2012 | Zhang |
| 2012/0294392 A1 | 11/2012 | Zhang |
| 2012/0300874 A1 | 11/2012 | Zhang |
| 2012/0327871 A1 | 12/2012 | Ghosh et al. |
| 2013/0202001 A1 | 8/2013 | Zhang |
| 2013/0259017 A1* | 10/2013 | Zhang ............... H04W 84/02 370/338 |
| 2013/0266083 A1* | 10/2013 | Baik ............... H04L 5/0053 375/260 |
| 2014/0337690 A1 | 11/2014 | Zhang |
| 2015/0071372 A1 | 3/2015 | Zhang |
| 2015/0117227 A1 | 4/2015 | Zhang et al. |
| 2015/0117433 A1 | 4/2015 | Zhang et al. |
| 2016/0156750 A1 | 6/2016 | Zhang et al. |
| 2017/0288748 A1 | 10/2017 | Lou et al. |

FOREIGN PATENT DOCUMENTS

| | | |
|---|---|---|
| WO | WO-2009052420 | 4/2009 |
| WO | WO-2009/059229 | 5/2009 |
| WO | WO-2009/084926 | 7/2009 |
| WO | WO-2012/106635 | 8/2012 |
| WO | WO-2012/122119 | 9/2012 |
| WO | WO-2013/152111 | 10/2013 |
| WO | WO-2014/183059 | 11/2014 |

OTHER PUBLICATIONS

U.S. Appl. No. 15/143,075, Sun et al., "WiFi Classification by Pilot Sequences," filed Apr. 29, 2016.

IEEE Std 802.11ac/D7.0 "Draft Standard for Information Technology—Telecommunications and information exchange between systems-Local and metropolitan area networks-Specific requirements, Part 11: Wireless LAN Medium Access Control (MAC) and Physical Layer (PHY) specifications: Amendment 4: Enhancements for Very High Throughput for Operation in Bands below 6 GHz," *The Institute of Electrical and Electronics Engineers, Inc.*, pp. 1-456 (Sep. 2013).

IEEE Std P802.11ad/D5.0 "Draft Standard for Information Technology—Telecommunications and information exchange between systems-Local and metropolitan area networks-Specific requirements, Part 11: Wireless LAN Medium Access Control (MAC) and Physical Layer (PHY) specifications: Amendment 3: Enhancements for Very High Throughput in the 60 GHz Band," *The Institute of Electrical and Electronics Engineers, Inc.*, pp. 1-601 (Sep. 2011).

IEEE Std 802.11ad™/D9.0 "Draft Standard for Information technology—Telecommunications and information Exchange Between Systems—Local and Metropolitan Area Networks Specific Requirements" Part 11: Wireless LAN Medium Access Control (MAC) and Physical Layer (PHY) Specifications, Amendment 3: Enhancements for Very High Throughput in the 60 GHz Band *The Institute of Electrical and Electronics Engineers, Inc.*, (Jul. 2012).

IEEE Std 802.11af/D1.05 "Draft Standard for Information Technology—Telecommunications and information exchange between systems-Local and metropolitan area networks-Specific requirements, Part 11: Wireless LAN Medium Access Control (MAC) and Physical Layer (PHY) specifications: Amendment 4: TV White Spaces Operation," *The Institute of Electrical and Electronics Engineers, Inc.*, pp. 1-123 (Nov. 2011).

IEEE P802.11ax™/D0.1, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for high efficiency in frequency bands between 1 GHz and 6 GHz," IEEE Computer Society, 221 pages (Mar. 2016).

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(56) References Cited

OTHER PUBLICATIONS

IEEE P802.15.4m/D3, May 2013 IEEE Standard for Local metropolitan area networks—"Part 15.4: Low Rate Wireless Personal Area Networks (LR-WPANs)", Amendment 6: TV White Space Between 54 MHz and 862 MHz Physical Layer, Excerpt, 2 pages (May 2013).
Chen, "Home Network Basis: Transmission Environments and Wired/Wireless Protocols," Prentice Hall, pp. 1-26 (Jul. 2003).
Chun et al., "Legacy Support on HEW frame structure," doc: IEEE 11-13/1057r0, *The Institute of Electrical and Electronics Engineers, Inc.*, pp. 1-8 (Sep. 2013).
de Vegt, "Potential Compromise for 802.11ah Use Case Document", Institute of Electrical and Electronics Engineers, doc. No. IEEE 802.11-11/0457r0, pp. 1-27 (Mar. 2011).
Francis, "Viterbi Decoder Block Decoding—Trellis Termination and Tail Biting," Xilinx XAPP551 v2.0, pp. 1-21 (Jul. 30, 2010).
Gunnam et al., "Multi-Rate Layered Decoder Architecture for Block LDPC Codes of the IEEE 802.11n. Wireless Standard," IEEE International Symposium on Circuits and Systems, 2007 (ISCAS 2007), pp. 1645-1648 (2007).
Harada, "Project: IEEE P802.15 Working Group for Wireless Personal Area Network (WPANs)," IEEE 802.15-07-0693-003c (May 2007).
Hiertz et al., "The IEEE 802.11 Universe," IEEE Communications Magazine, pp. 62-70, (Jan. 2010).
Imashioya et al., "RTL Design of 1.2 Gbps MIMO WLAN System and Its Business Aspect," IEEE 9th Int'l Symposium on Communications and Information Technology (ISCIT 2009), *The Institute of Electrical and Electronics Engineers*, pp. 296-301 (2009).
Lee et al., "TGaf PHY proposal," *The Institute of Electrical and Electronics Engineers*, doc. No. IEEE 802.11-12/0809r5, pp. 1-43, Jul. 10, 2012.
Mujtaba, "IEEE P802.11—Wireless LANs, TGn Sync Proposal Technical Specification," *The Institute of Electrical and Electronics Engineers, Inc.*, doc.: IEEE 802.11-04/0889r6, pp. 1-131 (May 2005).
Park, "Proposed Specification Framework for TGah D9.x", The Institute of Electrical and Electronics Engineers, doc. No. IEEE 802.11-yy/xxxxr0, pp. 1-30 (Jul. 2012).
Park, "Proposed Specification Framework for TGah", *The Institute of Electrical and Electronics Engineers*, doc. No. IEEE 802.11--yy/xxxxr05, (Jan. 2012).
Park, "Proposed Specification Framework for TGah", *The Institute of Electrical and Electronics Engineers*, doc. No. IEEE 802.11-11/1137r11, pp. 1-36 (Sep. 2012).
Park, "Proposed Specification Framework for TGah", *The Institute of Electrical and Electronics Engineers*, doc. No. IEEE 802.11-11/1137r6, pp. 1-13 (Mar. 2012).
Park, "Specification Framework for TGah," *The Institute of Electrical and Electronics Engineers*, doc. No. IEEE 802.11-11/1137r13, pp. 1-58 (Jan. 14, 2013).
Perahia et al., "Gigabit Wireless LANs: an overview of IEEE 802.11 ac and 80211 ad," ACM Sigmobile Mobile Computing and Communications Review, vo. 15, No. 3, pp. 23-33, Jul. 2011.
Seok et al., "HEW PPDU Format for Supporting MIMO-OFDMA," IEEE 802.11-14/1210r0, 16 pages, (Sep. 14, 2014).
Shao, "Channel Selection for 802.11ah," doc.: IEEE 802.11-12/0816r0, pp. 1-11 (Jul. 2012).
Shi et al., "Phase Tracking During VHT-LTF," Doc. No. IEEE 802.11-10/07711-0, *The Institute of Electrical and Electronics Engineers, Inc.*, pp. 1-19 (Jul. 2010).
Stacey et al., "IEEE P802.11, Wireless LANs, Proposed TGac Draft Amendment," Institute of Electrical and Electronics Engineers, doc. No. IEEE 802.11-10, 1361 r3 (Jan. 2011 ).
Stacey et al., "Specification Framework for TGac," document No. IEEE 802.11-09/0992r20, *Institute tor Electrical and Electronics Engineers*, pp. 1-49, Jan. 18, 2011.
Syafei et al., "A Design of Next Generation Gigabit MIMO Wireless LAN System ," IEEE 12th Int'l Conference on Advanced Communication Technology (ICACT 2010), *The Institute of Electrical and Electronics Engineers*, pp. 941-946 (2010).
Syafei et al., "A Gigabit MIMO WLAN System with International Standardization Strategy," IEEE Int'l Symposium on Intelligent Signal Processing and Communication Systems (ISPACS 2009), *The Institute of Electrical and Electronics Engineers*, pp. 228-231 (2009).
Syafei et al., "Design of 1.2 Gbps MIMO WLAN System for 4K Digital Cinema Transmission," IEEE 20th Int'l Symposium on Personal, Indoor and Mobile Radio Communications (PIMRC 2009), *The Institute of Electrical and Electronics Engineers*, pp. 207-211 (2009).
Taghavi et al., "Introductory Submission for TGah", doc. No. IEEE 802.11-11/0062r0, *Institute for Electrical and Electronics Engineers*, pp. 1-5 (Jan. 14, 2011).
van Nee et al., "The 802.11 n. MIMO-OFDM Standard for Wireless LAN and Beyond," Wireless Personal Communications, vol. 37, pp. 445-453 (Jun. 2006).
van Zelst et al., "Pilot Sequence for VHT-Data," Doc. No. IEEE 802.11-10/0811r1, *The Institute of Electrical and Electronics Engineers, Inc.*, pp. 1-10 (Jul. 2010).
Vermani, et al. "Spec Framework Text for PHY Numerology," *The Institute of Electrical and Electronics Engineers*, doc. no. IEEE 802.11-11/1311r0, pp. 1-5 (Sep. 2011).
Vermani et al. "Preamble Format for 1 MHz," *The Institute of Electrical and Electronics Engineers*, doc. No. IEEE 802.11-11/1482r2, pp. 1-30 (Nov. 2011).
Yu et al., "Coverage extension for IEEE802.11ah," *The Institute of Electrical and Electronics Engineers*, doc. No. IEEE 802.11-11/0035r1, pp. 1-10 (Jan. 2011).
Zhang et al., "11ah Data Transmission Flow," *The Institute of Electrical and Electronics Engineers*, doc. No. IEEE 802.11-11/1484r1, pp. 1-15 (Nov. 2011).
Zhang et al., "1MHz Waveform in Wider BW ", *The Institute of Electrical and Electronics Engineers*, doc. No. IEEE 802.11-12/0309r1, pp. 1-10 (Mar. 2012).
Zhang et al., "Beamforming Feedback for Single Stream," *The Institute of Electrical and Electronics Engineers*, doc. No. IEEE 802.11-12/1312r0, pp. 1-22 (Nov. 12, 2012).
Zhang Zhao-Yang: "A Novel AFDM Transmission Scheme with Length-Adaptive Cyclic Prefix," Journal of Zhejiang University. Science, Zhejiant University Press, Hangzhou, CN vol. 5, No. 11, Jul. 7, 2003, pp. 1336-1342.
IEEE Std 802.11-REVmc™/D8.0 (revision of IEEE Std. 802.11™-2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, *The Institute of Electrical and Electronics Engineers, Inc.*, 3774 pages (Aug. 2016).

\* cited by examiner

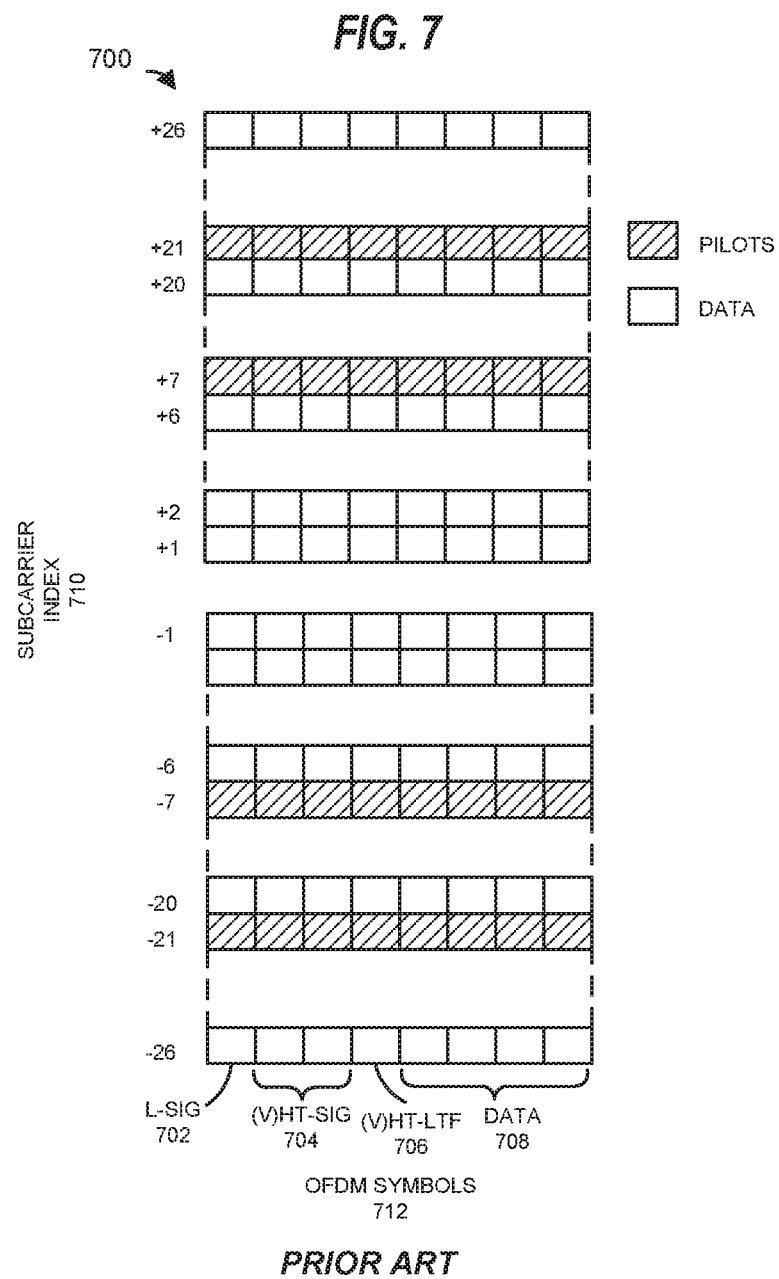

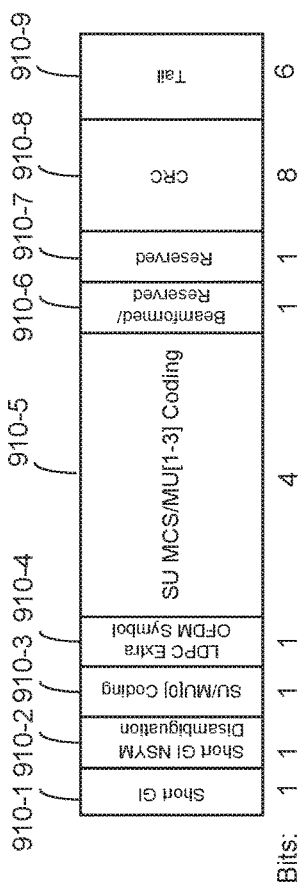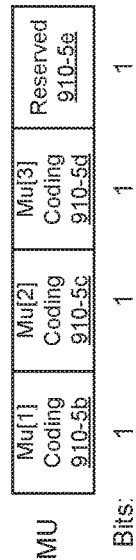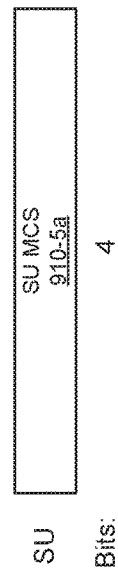
FIG. 9D
FIG. 9E
FIG. 9F

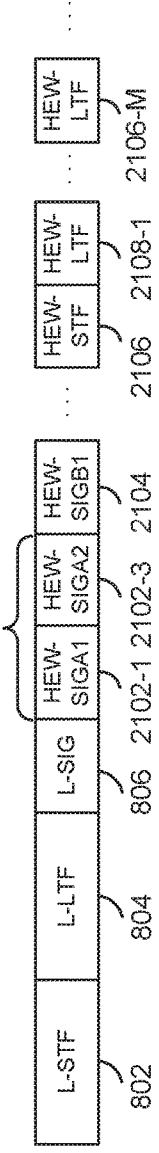
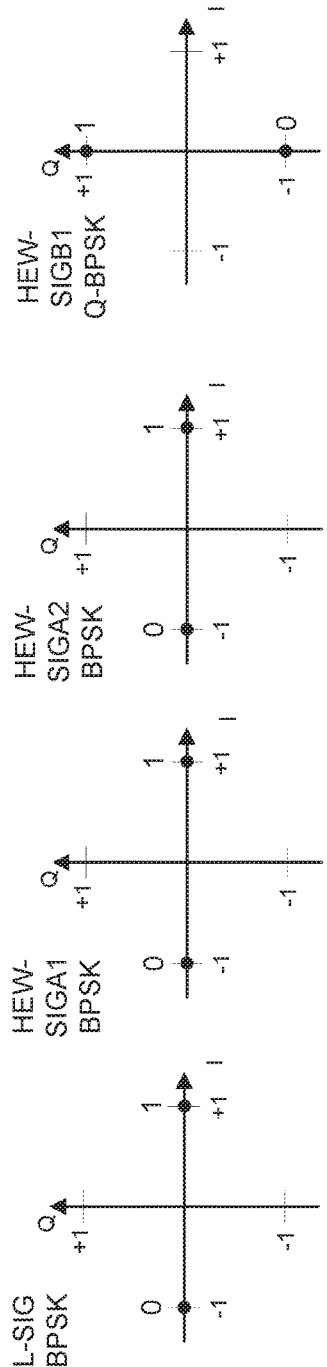
FIG. 20A
FIG. 20B

PHYSICAL LAYER FRAME FORMAT FOR WLAN

CROSS-REFERENCES TO RELATED APPLICATIONS

This application is a continuation-in-part of U.S. patent application Ser. No. 15/143,075, entitled "WiFi Classification by Pilot Sequences," filed on Apr. 29, 2016, which claims the benefit of U.S. Provisional Patent Application No. 62/156,076, entitled "WiFi Classification by Pilot Sequences," filed on May 1, 2015, and U.S. Provisional Patent Application No. 62/218,309, entitled "Physical Layer Frame Format for WLAN," filed on Sep. 14, 2015. Additionally, this application claims the benefit of U.S. Provisional Patent Application No. 62/218,309. The disclosures of all of the applications referenced above are incorporated herein by reference in their entireties.

FIELD OF THE DISCLOSURE

The present disclosure relates generally to wireless communication networks and, more particularly, to physical layer (PHY) frame formats that facilitate coexistence with legacy devices in wireless local area networks.

BACKGROUND

Development of wireless local area network (WLAN) communication protocols, such as those specified in the Institute for Electrical and Electronics Engineers (IEEE) 802.11a, 802.11b, 802.11g, 802.11n, and 802.11ac Standards, has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughputs, such as throughputs in the tens of Gbps range.

SUMMARY

In an embodiment, a method for generating a data unit for transmission via a communication channel includes: selecting, at a communication device, a first format according to which the data unit is to be generated, the first format selected from a plurality of formats; and generating, at the first communication device, the data unit according to the first format, including generating a physical layer (PHY) preamble according to the first format, wherein generating the PHY preamble includes generating the PHY preamble to include a first field and a second field, and wherein generating the PHY preamble further includes at least two of: i) generating the PHY preamble so that one or more orthogonal frequency division multiplexing (OFDM) symbols are rotated by 90 degrees with respect to other OFDM symbols in the PHY preamble to indicate to receiver devices that are configured to recognize the first format that the data unit conforms to the first format, ii) generating, at the communication device, the first field to include a set of one or more information bits that indicate to receiver devices that are configured to recognize the first format that the data unit conforms to the first format, and wherein generating the first field includes one or both of (a) generating the set of one or more information bits according to an error detection scheme that does not conform to a second format, and (b) generating the set of one or more information bits to indicate a mode not supported in connection with the second format, and iii) including, at the communication device, a duplicate of at least one of the first field and the second field in the PHY preamble, wherein the duplicate of the at least one of the first field and the second field indicates to receiver devices that are configured to recognize the first format that the data unit conforms to the first format.

In another embodiment, an apparatus comprises a network interface device having one or more integrated circuits (ICs). The one or more ICs are configured to: select a first format according to which a data unit is to be generated, the first format selected from a plurality of formats; and generate the data unit according to the first format, including generating a physical layer (PHY) preamble according to the first format, wherein generating the PHY preamble includes generating the PHY preamble to include a first field and a second field, and further includes, at least two of: i) generating the PHY preamble so that one or more orthogonal frequency division multiplexing (OFDM) symbols are rotated by 90 degrees with respect to other OFDM symbols in the PHY preamble to indicate to receiver devices that are configured to recognize the first format that the data unit conforms to the first format, ii) generating the first field to include a set of one or more information bits that indicate to receiver devices that are configured to recognize the first format that the data unit conforms to the first format, and wherein generating the first field includes one or both of (a) generating the set of one or more information bits according to an error detection scheme that does not conform to a second format, and (b) generating the set of one or more information bits to indicate a mode not supported in connection with the second format, and iii) including a duplicate of at least one of the first field and the second field in the PHY preamble, wherein the duplicate of the at least one of the first field and the second field indicates to receiver devices that are configured to recognize the first format that the data unit conforms to the first format.

In yet another embodiment, a method includes: receiving, at a communication device, a data unit via a communication channel, wherein the data unit includes a physical layer (PHY) preamble, and wherein the PHY preamble further includes a first field and a second field; and determining, at the communication device, a format of the data unit from among a plurality of formats that the communication device is configured to recognize, wherein determining the format of the data unit includes at least two of: i) determining whether one or more orthogonal frequency division multiplexing (OFDM) symbols in the PHY preamble are rotated by 90 degrees with respect to other OFDM symbols in the PHY preamble, wherein PHY preambles according to the format include the one or more OFDM symbols rotated by 90 degrees, and PHY preambles of one or more other formats do not include the one or more OFDM symbols rotated by 90 degrees, ii) determining whether a set of one or more information bits in the first field is at least one of (a) generated according to an error detection scheme specified by the format and not specified by one or more other formats, and (b) indicates a mode supported by the format and not supported by one or more other formats, and iii) determining whether the PHY preamble includes a duplicate of at least one of the first field and the second field, wherein PHY preambles according to the format include the duplicate of the at least one of the first field and the second field, and PHY preambles of one or more other formats do not include the duplicate of the at least one of the first field and the second field.

In still another embodiment, an apparatus comprises a network interface device having one or more integrated circuits (ICs). The one or more ICs are configured to: receive a data unit via a communication channel, wherein the data unit includes a physical layer (PHY) preamble of the data unit, and wherein the PHY preamble further includes a first field and a second field, and determine a format of the data unit from among a plurality of formats that the communication device is configured to recognize, wherein determining the format includes at least two of: i) determining whether one or more orthogonal frequency division multiplexing (OFDM) symbols in the PHY preamble are rotated by 90 degrees with respect to other OFDM symbols in the PHY preamble, wherein PHY preambles according to the format include the one or more OFDM symbols rotated by 90 degrees, and PHY preambles of one or more other formats do not include the one or more OFDM symbols rotated by 90 degrees, ii) determining whether a set of one or more information bits in the first field is at least one of (a) generated according to an error detection scheme specified by the format and not specified by one or more other formats, and (b) indicates a mode supported by the format and not supported by one or more other formats, and iii) determining whether the PHY preamble includes a duplicate of at least one of the first field and the second field, wherein PHY preambles according to the format include the duplicate of the at least one of the first field and the second field, and PHY preambles of one or more other formats do not include the duplicate of the at least one of the first field and the second field.

In another embodiment, a method for generating a data unit for transmission via a communication channel includes: selecting, at a communication device, a first format according to which the data unit is to be generated, the first format selected from a plurality of formats; generating, at the first communication device, the data unit according to the first format, including generating a physical layer (PHY) preamble according to the first format, wherein generating the PHY preamble includes: generating the PHY preamble to include a first field and a second field, and generating the PHY preamble to include a pilot sequence to indicate to receiver devices that are configured to recognize the first format that the data unit conforms to the first format, wherein a second format does not utilize the pilot sequence. Generating the PHY preamble further includes at least one of: i) generating, at the communication device, the first field to include a set of one or more information bits that indicate to receiver devices that are configured to recognize the first format that the data unit conforms to the first format, wherein generating the first field includes one or both of (a) generating the set of one or more information bits according to an error detection scheme that does not conform to the second format, and (b) generating the set of one or more information bits to indicate a mode not supported in connection with the second format, ii) including, at the communication device, a duplicate of at least one of the first field and the second field in the PHY preamble, wherein the duplicate of the at least one of the first field and the second field indicates to receiver devices that are configured to recognize the first format that the data unit conforms to the first format, and iii) generating the PHY preamble so that one or more orthogonal frequency division multiplexing (OFDM) symbols are rotated by 90 degrees with respect to other OFDM symbols in the PHY preamble to indicate to receiver devices that are configured to recognize the first format that the data unit conforms to the first format.

In yet another embodiment, an apparatus comprises a network interface device having one or more integrated circuits (ICs). The one or more ICs are configured to: select a first format according to which the data unit is to be generated, the first format selected from a plurality of formats, and generate the data unit according to the first format, including generating a physical layer (PHY) preamble according to the first format, wherein generating the PHY preamble includes: generating the PHY preamble to include a first field and a second field, and generating the PHY preamble to include a pilot sequence to indicate to receiver devices that are configured to recognize the first format that the data unit conforms to the first format, wherein a second format does not utilize the pilot sequence. The one or more ICs are configured to, at least one of: i) generate the first field to include a set of one or more information bits that indicate to receiver devices that are configured to recognize the first format that the data unit conforms to the first format, wherein generating the first field includes one or both of (a) generating the set of one or more information bits according to an error detection scheme that does not conform to the second format, and (b) generating the set of one or more information bits to indicate a mode not supported in connection with the second format; ii) include a duplicate of at least one of the first field and the second field in the PHY preamble, wherein the duplicate of the at least one of the first field and the second field indicates to receiver devices that are configured to recognize the first format that the data unit conforms to the first format; and iii) generate the PHY preamble so that one or more orthogonal frequency division multiplexing (OFDM) symbols are rotated by 90 degrees with respect to other OFDM symbols in the PHY preamble to indicate to receiver devices that are configured to recognize the first format that the data unit conforms to the first format.

In still another embodiment, a method includes: receiving, at a communication device, a data unit via a communication channel, wherein the data unit includes a physical layer (PHY) preamble, and wherein the PHY preamble further includes a first field and a second field; and determining, at the communication device, a format of the data unit from among a plurality of formats that the communication device is configured to recognize, wherein determining the format includes determining whether the PHY preamble includes a pilot sequence supported in connection with a first format and not supported in connection with one or more second formats. Determining the format further includes at least one of: i) determining whether the PHY preamble includes a duplicate of at least one of the first field and the second field, wherein PHY preambles according to the first format include the duplicate of the at least one of the first field and the second field, and PHY preambles according to the one or more second formats do not include the duplicate of the at least one of the first field and the second field, ii) determining whether a set of one or more information bits in the first field is at least one of (a) was generated according to an error detection scheme supported in connection with the first format and not supported in connection with one or more second formats, and (b) indicates a mode supported in connection with the first format and not supported in connection with one or more other second formats, and iii) determining whether one or more orthogonal frequency division multiplexing (OFDM) symbols in the PHY preamble are rotated by 90 degrees with respect to other OFDM symbols in the PHY preamble, wherein PHY preambles according to the first format include the one or more OFDM symbols rotated by 90 degrees, and PHY preambles of one or more second formats do not include the one or more OFDM symbols rotated by 90 degrees.

In another embodiment, an apparatus comprises a network interface device having one or more integrated circuits (ICs). The one or more ICs are configured to: receive a data unit via a communication channel, wherein the data unit includes a physical layer (PHY) preamble, and wherein the PHY preamble further includes a first field and a second field; and determine a format of the data unit from among a plurality of formats that the communication device is configured to recognize, wherein determining the format includes determining whether the PHY preamble includes a pilot sequence supported in connection with a first format and not supported in connection with one or more second formats. The one or more ICs are configured to determine the format by further performing at least one of: i) determining whether the PHY preamble includes a duplicate of at least one of the first field and the second field, wherein PHY preambles according to the first format include the duplicate of the at least one of the first field and the second field, and PHY preambles of one or more second formats do not include the duplicate of the at least one of the first field and the second field, ii) determining whether a set of one or more information bits in the first field is at least one of (a) generated according to an error detection scheme supported in connection with the first format and not supported in connection with one or more second formats, and (b) indicates a mode supported in connection with the first format and not supported in connection with one or more other second formats, and iii) determining whether one or more orthogonal frequency division multiplexing (OFDM) symbols in the PHY preamble are rotated by 90 degrees with respect to other OFDM symbols in the PHY preamble, wherein PHY preambles according to the first format include the one or more OFDM symbols rotated by 90 degrees, and PHY preambles of one or more second formats do not include the one or more OFDM symbols rotated by 90 degrees.

BRIEF DESCRIPTION OF THE DRAWINGS

FIG. 7 is a diagram showing data subcarriers and pilot subcarriers in a prior art PHY data unit.

FIGS. 9A-9F include diagrams of example bit allocations for a signal field included in a PHY preamble of the PHY data unit of FIG. 8A, according to an embodiment.

FIG. 20A is a diagram of another example PHY data unit format, according to another embodiment.

FIG. 20B includes diagrams of modulation of OFDM symbols in the PHY data unit of FIG. 20A, according to an embodiment.

DETAILED DESCRIPTION

In embodiments described below, a wireless network device such as an access point (AP) or client station (STA) of a wireless local area network (WLAN) generates a data unit (e.g., a physical layer (PHY) data unit) for transmission over a communication channel. The data unit includes a preamble. In some embodiments, the preamble is configured to indicate a format of the data unit so that a receiver of the data unit can determine the format of the data unit by analyzing the preamble. In embodiments described below, a preamble of a data unit is used to distinguish amongst different data unit formats corresponding to different communication protocols. In other embodiments, a preamble of a data unit is used to distinguish amongst different data unit formats of defined by a single communication protocol. As used herein, the term "preamble" refers to a portion of a data unit that includes a header. Thus, for example, a PHY preamble includes a PHY header.

Figure 1:
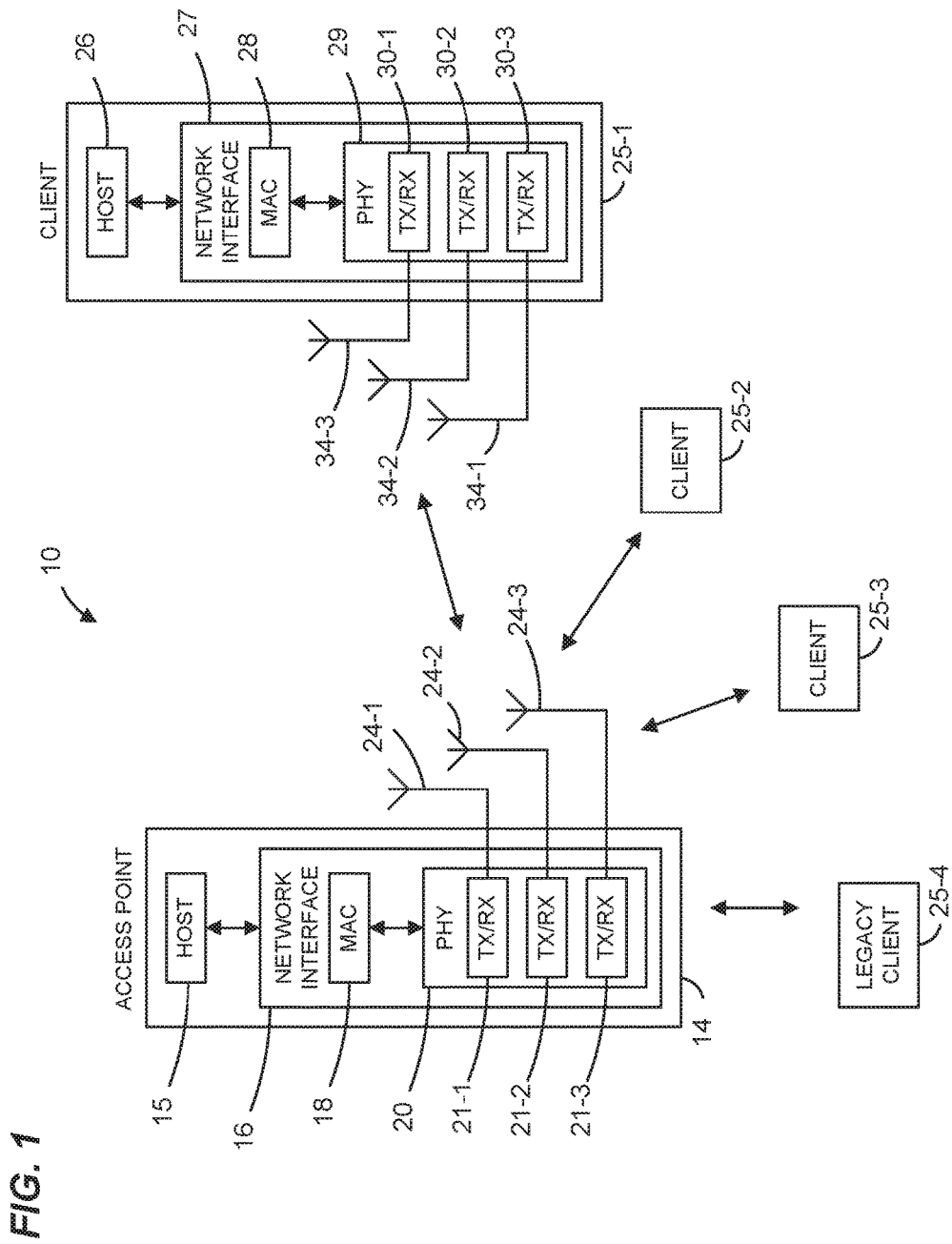
FIG. 1 is a block diagram of an example wireless local area network (WLAN) 10, according to an embodiment.

FIG. 1 is a block diagram of an example wireless local area network (WLAN) 10, according to an embodiment. An AP 14 includes a host processor 15 coupled to a network interface 16. In an embodiment, the network interface 16 includes one or more integrate circuits (ICs) configured to operate as discussed below. The network interface 16 includes a medium access control (MAC) processor 18 and a physical layer (PHY) processor 20. The PHY processor 20 includes a plurality of transceivers 21, and the transceivers 21 are coupled to a plurality of antennas 24. Although three transceivers 21 and three antennas 24 are illustrated in FIG. 1, the AP 14 includes other suitable numbers (e.g., 1, 2, 4, 5, etc.) of transceivers 21 and antennas 24 in other embodiments. In some embodiments, the AP 14 includes a higher number of antennas 24 than transceivers 21, and antenna switching techniques are utilized. In an embodiment, the MAC processor 18 is implemented on at least a first IC, and the PHY processor 20 is implemented on at least a second IC. In an embodiment, at least a portion of the MAC processor 18 and at least a portion of the PHY processor 20 are implemented on a single IC.

In various embodiments, the MAC processor 18 and the PHY processor 20 are configured to operate according to a first communication protocol. In some embodiments, the first communication protocol defines a plurality of different data unit formats (e.g., PHY data unit formats). In some embodiments, the first communication protocol defines a single data unit format (e.g., a single PHY data unit format). In some embodiments, the MAC processor 18 and the PHY processor 20 are also configured to operate according to a second communication protocol that defines one or more data unit formats (e.g., one or more PHY data unit formats) that are different than one or more data units formats defined by the first communication protocol. In some embodiments, the MAC processor 18 and the PHY processor 20 are additionally configured to operate according to a third legacy communication protocol, and/or a fourth legacy communication protocol (e.g., according to the IEEE 802.11ac Standard and/or the IEEE 802.11n Standard).

The WLAN 10 includes a plurality of client stations 25. Although four client stations 25 are illustrated in FIG. 1, the WLAN 10 includes other suitable numbers (e.g., 1, 2, 3, 5, 6, etc.) of client stations 25 in various scenarios and embodiments. At least one of the client stations 25 (e.g., client station 25-1) is configured to operate at least according to the first communication protocol. In some embodiments, at least one of the client stations 25 (e.g., client station 25-1) is configured to operate at least according to the first communication protocol and according to the second communication protocol. In some embodiments, at least one of the client stations 25 is not configured to operate according to the first communication protocol but is configured to operate according to at least one of the third communication protocol and/or the fourth communication protocol (referred to herein as a "legacy client station").

The client station 25-1 includes a host processor 26 coupled to a network interface 27. In an embodiment, the network interface 27 includes one or more ICs configured to operate as discussed below. The network interface 27 includes a MAC processor 28 and a PHY processor 29. The PHY processor 29 includes a plurality of transceivers 30, and the transceivers 30 are coupled to a plurality of antennas 34. Although three transceivers 30 and three antennas 34 are illustrated in FIG. 1, the client station 25-1 includes other suitable numbers (e.g., 1, 2, 4, 5, etc.) of transceivers 30 and antennas 34 in other embodiments. In some embodiments, the client station 25-1 includes a higher number of antennas 34 than transceivers 30, and antenna switching techniques are utilized. In an embodiment, the MAC processor 28 is implemented on at least a first IC, and the PHY processor 29 is implemented on at least a second IC. In an embodiment, at least a portion of the MAC processor 28 and at least a portion of the PHY processor 29 are implemented on a single IC.

According to an embodiment, the client station 25-4 is a legacy client station, i.e., the client station 25-4 is not enabled to receive and fully decode a data unit that is transmitted by the AP 14 or another client station 25 according to the first communication protocol. Similarly, according to an embodiment, the legacy client station 25-4 is not enabled to transmit data units according to the first communication protocol. In some embodiments, the legacy client station 25-4 also is not enabled to receive and fully decode, as well as transmit, data units according to the second communication protocol. In some embodiments, the legacy client station 25-4 is enabled to receive and fully decode, as well as transmit, data units according to the second communication protocol. In some embodiments, the legacy client station 25-4 is enabled to receive and fully decode and transmit data units according to the third communication protocol and/or the fourth communication protocol, in some embodiments.

In an embodiment, one or both of the client stations 25-2 and 25-3, has a structure that is the same as or similar to the client station 25-1. In an embodiment, the client station 25-4 has a structure similar to the client station 25-1. In these embodiments, the client stations 25 structured the same as or similar to the client station 25-1 have the same or a different number of transceivers and antennas. For example, the client station 25-2 has only two transceivers and two antennas (not shown), according to an embodiment.

In various embodiments, the MAC processor 18 and/or the PHY processor 20 of the AP 14 are configured to generate data units conforming to the first communication protocol and/or data units conforming to the second communication protocol. The transceiver(s) 21 is/are configured to transmit the generated data units via the antenna(s) 24. Similarly, the transceiver(s) 21 is/are configured to receive data units via the antenna(s) 24. In some embodiments, the MAC processor 18 and/or the PHY processor 20 of the AP 14 are configured to process received data units conforming to the first communication protocol and having different data unit formats defined by the first communication protocol, and to determine that such data units conform to the various data unit formats of the first communication protocol, according to various embodiments. In some embodiments, the MAC processor 18 and the PHY processor 20 of the AP 14 are configured to process received data units conforming to the first communication protocol and data units conforming to the second communication protocol, and to determine that such data units conform to the first communication protocol or to the second communication protocol, according to various embodiments.

In various embodiments, the MAC processor 28 and the PHY processor 29 of the client device 25-1 are configured to generate data units conforming to the first communication protocol. The transceiver(s) 30 is/are configured to transmit the generated data units via the antenna(s) 34. Similarly, the transceiver(s) 30 is/are configured to receive data units via the antenna(s) 34. In some embodiments, the MAC processor 28 and/or the PHY processor 29 are configured to process received data units conforming to the first communication protocol and having different data unit formats defined by the first communication protocol, and to determine that such data units conform to the various data unit formats of the first communication protocol, according to various embodiments. In some embodiments, the MAC processor 28 and/or PHY processing unit 29 of the client device 25-1 are configured to process received data units conforming to the first communication protocol and data units conforming to the second communication protocol, and to determine that such data units conform to the first communication protocol or the second communication protocol, according to various embodiments.

Figure 2A:
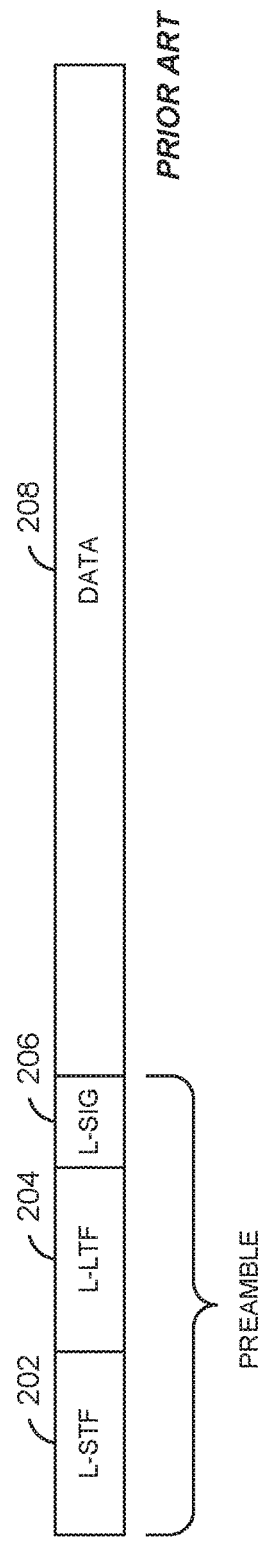
FIGS. 2A and 2B are diagrams of a prior art physical layer (PHY) data unit format.
Figure 2B:
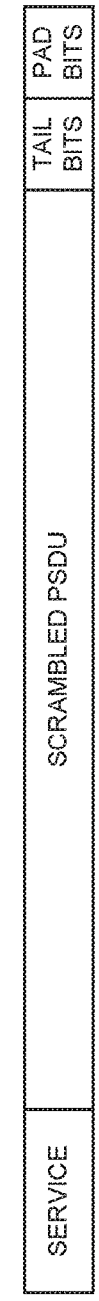

FIG. 2A is a diagram of a prior art data unit 200 that the AP 14 is configured to transmit to the client station 25-4 via orthogonal frequency division multiplexing (OFDM) modulation, according to an embodiment. In an embodiment, the client station 25-4 is also configured to transmit the data unit 200 to the AP 14. The data unit 200 conforms to the IEEE 802.11a Standard and occupies a 20 Megahertz (MHz) band. The data unit 200 includes a preamble having a legacy short training field (L-STF) 202, generally used for packet detection, initial synchronization, and automatic gain control, etc., and a legacy long training field (L-LTF) 204, generally used for channel estimation and fine synchronization. The data unit 200 also includes a legacy signal field (L-SIG) 206, used to carry certain physical layer (PHY) parameters of with the data unit 200, such as modulation type and coding rate used to transmit the data unit, for example. The data unit 200 also includes a data portion 208. FIG. 2B is a diagram of example data portion 208 (not low density parity check encoded), which includes a service field, a scrambled physical layer service data unit (PSDU), tail bits, and padding bits, if needed. The data unit 200 is designed for transmission over one spatial or space-time stream in a single input single output (SISO) channel configuration.

Figure 3:
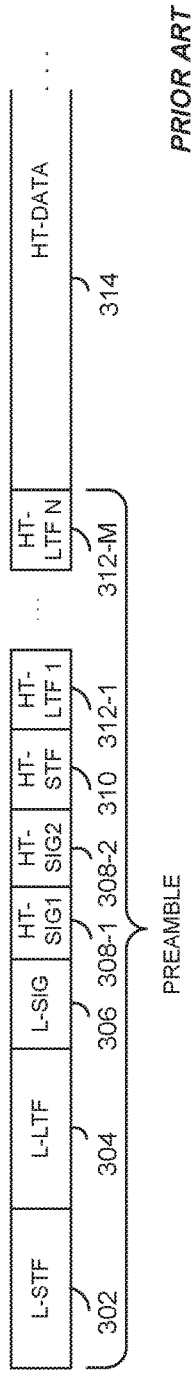
FIG. 3 is a diagram of another prior art PHY data unit format.

FIG. 3 is a diagram of a prior art data unit 300 that the AP 14 is configured to transmit to the client station 25-4 via OFDM modulation, according to an embodiment. In an embodiment, the client station 25-4 is also configured to transmit the data unit 300 to the AP 14. The data unit 300 conforms to the IEEE 802.11n Standard, occupies a 20 MHz band, and is designed for mixed mode situations, i.e., when the WLAN includes one or more client stations that conform to the IEEE 802.11a Standard but not the IEEE 802.11n Standard. The data unit 300 includes a preamble having an L-STF 302, an L-LTF 304, an L-SIG 306, a high throughput signal field (HT-SIG) 308, a high throughput short training field (HT-STF) 310, and M data high throughput long training fields (HT-LTFs) 312, where M is an integer generally determined by the number of spatial streams used to transmit the data unit 300 in a multiple input multiple output (MIMO) channel configuration. In particular, according to the IEEE 802.11n Standard, the data unit 300 includes two HT-LTFs 312 if the data unit 300 is transmitted using two spatial streams, and four HT-LTFs 312 is the data unit 300 is transmitted using three or four spatial streams. An indication of the particular number of spatial streams being utilized is included in the HT-SIG field 308. The data unit 300 also includes a data portion 314.

Figure 4:
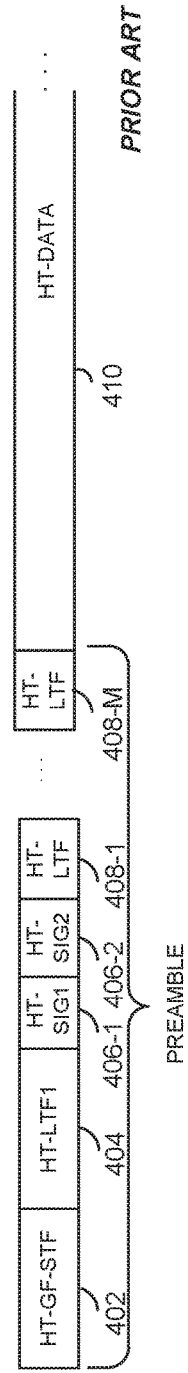
FIG. 4 is a diagram of another prior art PHY data unit format.

FIG. 4 is a diagram of a prior art data unit 400 that the AP 14 is configured to transmit to the client station 25-4 via OFDM modulation, according to an embodiment. In an embodiment, the client station 25-4 is also configured to transmit the data unit 400 to the AP 14. The data unit 400 conforms to the IEEE 802.11n Standard, occupies a 20 MHz band, and is designed for "Greenfield" situations, i.e., when the WLAN does not include any client stations that conform to the IEEE 802.11a Standard but not the IEEE 802.11n Standard. The data unit 400 includes a preamble having a high throughput Greenfield short training field (HT-GF-STF) 402, a first high throughput long training field (HT-LTF1) 404, a HT-SIG 406, and M data HT-LTFs 408, where M is an integer which generally corresponds to a number of spatial streams used to transmit the data unit 400 in a multiple input multiple output (MIMO) channel configuration. The data unit 400 also includes a data portion 410.

Figure 5:
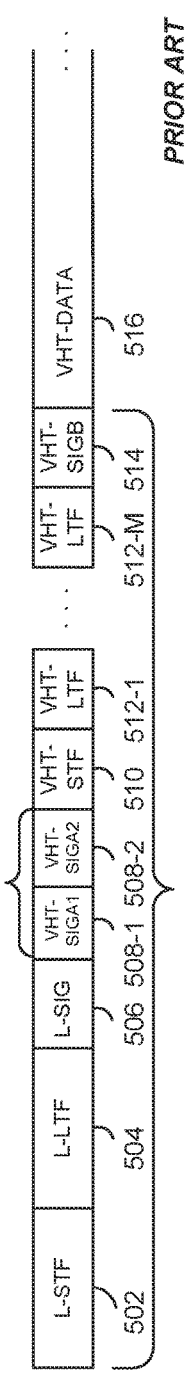
FIG. 5 is a diagram of another prior art PHY data unit format.

FIG. 5 is a diagram of a prior art data unit 500 that the AP 14 is configured to transmit to the client station 25-4 via OFDM modulation, according to an embodiment. In an embodiment, the client station 25-4 is also configured to transmit the data unit 500 to the AP 14. The data unit 500 conforms to the IEEE 802.11ac Standard and is designed for "mixed mode" situations. The data unit 500 occupies a 20 MHz bandwidth. In other embodiments or scenarios, a data unit similar to the data unit 500 occupies a different bandwidth, such as a 40 MHz, an 80 MHz, or a 160 MHz bandwidth. The data unit 500 includes a preamble having an L-STF 502, an L-LTF 504, an L-SIG 506, two first very high throughput signal fields (VHT-SIGAs) 508 including a first very high throughput signal field (VHT-SIGA1) 508-1 and a second very high throughput signal field (VHT-SIGA2) 508-2, a very high throughput short training field (VHT-STF) 510, M very high throughput long training fields (VHT-LTFs) 512, where M is an integer, and a second very high throughput signal field (VHT-SIG-B) 514. The data unit 500 also includes a data portion 516.

Figure 6A:
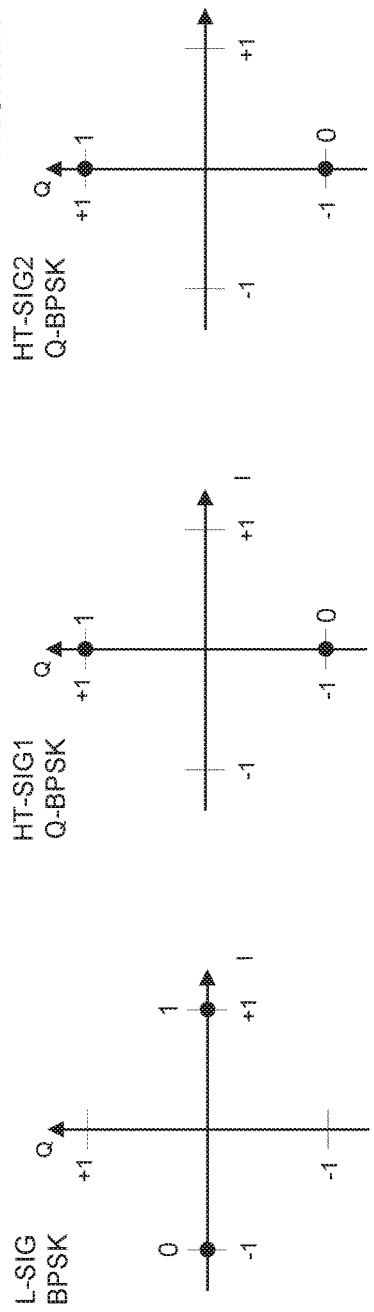
FIGS. 6A and 6B include diagrams of modulation of orthogonal frequency division multiplex (OFDM) symbols in prior art PHY data units.

FIG. 6A is a set of diagrams illustrating modulation of the L-SIG, HT-SIG1, and HT-SIG2 fields of the data unit 300 of FIG. 3, as defined by the IEEE 802.11n Standard. The L-SIG field is modulated according to binary phase shift keying (BPSK), whereas the HT-SIG1 and HT-SIG2 fields are modulated according to BPSK, but on the quadrature axis (Q-BPSK). In other words, the modulation of the HT-SIG1 and HT-SIG2 fields is rotated by 90 degrees as compared to the modulation of the L-SIG field.

Figure 6B:
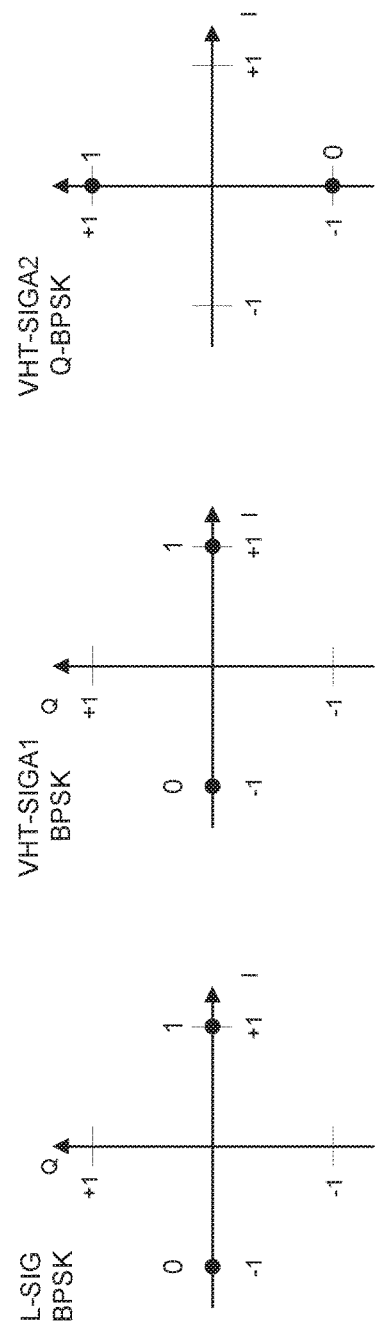

FIG. 6B is a set of diagrams illustrating modulation of the L-SIG, VHT-SIGA1, and VHT-SIGA2 fields of the data unit 500 of FIG. 5, as defined by the IEEE 802.11ac Standard. Unlike the HT-SIG1 field in FIG. 6A, the VHT-SIGA1 field is modulated according to BPSK, which is the same as the L-SIG field. On the other hand, the VHT-SIGA2 field is rotated by 90 degrees as compared to the modulation of the L-SIG field.

FIG. 7 is a diagram of a prior art data unit 700 that the AP 14 is configured to transmit to one or more of the client stations 25 via OFDM modulation, according to an embodiment. In an embodiment, one or more of the client stations 25 are also configured to transmit the data unit 700 to the AP 14. In an embodiment, the data unit 700 conforms to the IEEE 802.11n Standard. In another embodiment, the data unit 700 conforms to the IEEE 802.11ac Standard. In the embodiment of FIG. 7, the data unit 700 occupies a 20 MHz bandwidth. The OFDM data unit 700 includes 52 total subcarriers, comprising 48 data subcarriers and 4 pilot subcarriers, and the pilot subcarriers are located on subcarrier indices ±7, ±21. In an embodiment, the subcarriers are spaced 312.5 kHz apart. The pilot subcarriers modulate pilot sequences that are defined by a communication protocol (e.g., defined by the IEEE 802.11n Standard or the IEEE 802.11ac Standard). In some embodiments, PHY preamble fields L-SIG, HT-SIG, HT-LTFs, and a data portion (see e.g., FIG. 4) are transmitted using all of the data subcarriers of the data unit 700. In other embodiments, PHY preamble fields L-SIG, VHT-SIGAs, VHT-LTFs, and a data portion (see e.g., FIG. 5) are transmitted using all of the data subcarriers of the data unit 700.

In some embodiments, an n-th OFDM symbol of the data unit 700, e.g., starting from L-SIG, is given by:

$$r_n(t) = \frac{1}{\sqrt{N_{field}^{tone}}} \sum_{k=-N_{SD}}^{N_{SD}} (x_{n,k} + p_n P_k) \exp(j2\pi k \Delta_F(t - T_{GI})) \quad \text{Equation 1}$$

where, $x_{n,k}$ is a value of a mapped constellation point of the data unit for the n-th symbol at a k-th subcarrier tone, k is a subcarrier index, $\pm N_{SD}$ are the minimum and maximum subcarrier indices, $\Delta_F$ is a subcarrier frequency spacing, $p_n$ is an n-th value of a bit sequence defined by a communication protocol, $P_k$ is another sequence defined by the communication protocol, and $T_{GI}$ is a guard interval duration. Parameter $p_n P_k$ sets a pilot value at the n-th symbol and k-th subcarrier tone. In some embodiments, $P_k = \{1,1,1,-1\}$ are pilot values at k=−21,−7, 7, and 21, and zero at other values of k. In some embodiments, $p_n$ is a cyclic extension of a 127-bit sequence.

Figure 8A:
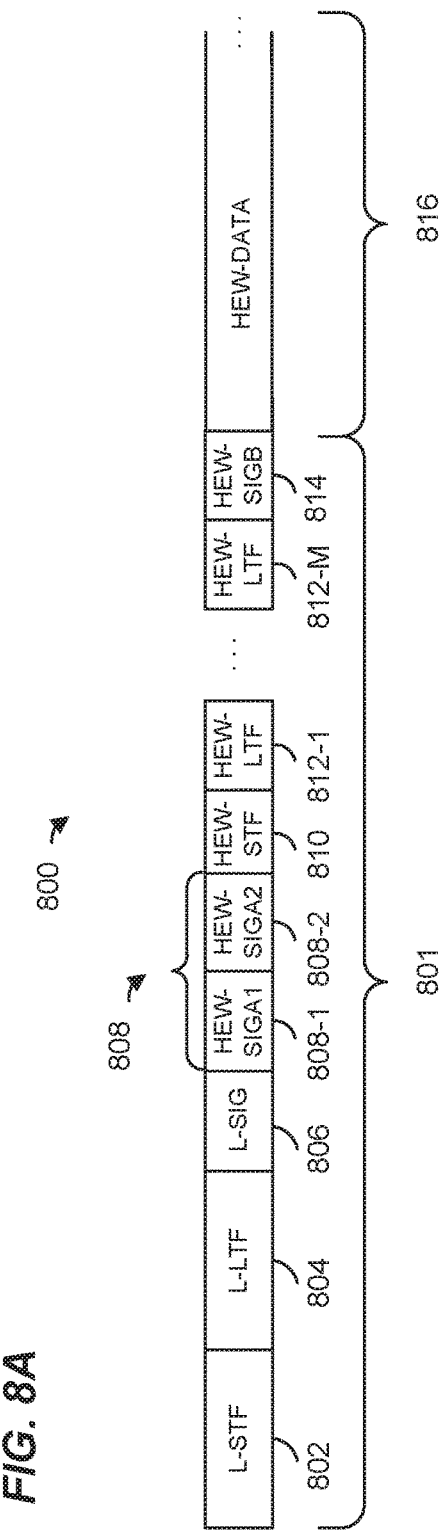
FIG. 8A is a diagram of an example PHY data unit format, according to an embodiment.

FIG. 8A is a diagram of a data unit 800 that the AP 14 is configured to transmit to the client station 25-1 via OFDM modulation, according to an embodiment. In an embodiment, the client station 25-1 is also configured to transmit the data unit 800 to the AP 14. The data unit 800 conforms to the first communication protocol and occupies a 20 MHz bandwidth. Data units that conform to the first communication protocol similar to the data unit 700 may occupy another suitable bandwidth such as 5 MHz, 10 MHz, 40 MHz, 80 MHz, 160 MHz, 320 MHz, 640 MHz, for example, or other suitable bandwidths, in other embodiments. The data unit 800 is suitable for "mixed mode" situations, e.g., when the WLAN 10 includes a client station (e.g., the legacy client station 25-4) that conforms to a legacy communication protocol, but not the first communication protocol. The data unit 800 is utilized in other situations as well, in some embodiments.

In an embodiment, the data unit 800 includes a preamble 801 having an L-STF 802, an L-LTF 804, an L-SIG 806, a first HEW signal field (HEW-SIGA) 808 including a first field (HEW-SIGA1) 808-1 and a second field (HEW-SIGA2) 808-2, an HEW short training field (HEW-STF) 810, M HEW long training fields (HEW-LTFs) 812, where M is an integer, and a second HEW signal field (HEW-SIGB) 814. Each of the L-STF 802, the L-LTF 804, the L-SIG 806, the HEW-SIGAs 808, the HEW-STF 810, the M HEW-LTFs 812, and the HEW-SIGB 814 comprises an integer number of one or more OFDM symbols. For example, in an embodiment, the HEW-SIGAs 808 comprise two OFDM symbols, where the HEW-SIGA1 808-1 field comprises the first OFDM symbol and the HEW-SIGA2 comprises the second OFDM symbol. In another embodiment, for example, the preamble 801 includes a third HEW signal field (HEW-SIGA3, not shown) and the HEW-SIGAs 808 comprise three OFDM symbols, where the HEW-SIGA1 808-1 field comprises the first OFDM symbol, the HEW-SIGA2 comprises the second OFDM symbol, and the HEW-SIGA3 comprises the third OFDM symbol. In at least some examples, the HEW-SIGAs 808 are collectively referred to as a single HEW signal field (HEW-SIGA) 808. In some embodiments, the data unit 800 also includes a data portion 816. In other embodiments, the data unit 800 omits the data portion 816 (e.g., as with a null data packet (NDP), etc.).

In the embodiment of FIG. 8A, the data unit 800 includes one of each of the L-STF 802, the L-LTF 804, the L-SIG 806, the HEW-SIGA1 808. In other embodiments in which an OFDM data unit similar to the data unit 800 occupies a cumulative bandwidth other than 20 MHz, each of the L-STF 802, the L-LTF 804, the L-SIG 806, the HEW-SIGAs 808 is repeated over a corresponding number of 20 MHz sub-bands of the whole bandwidth of the data unit, in an embodiment. For example, in an embodiment, the OFDM data unit occupies an 80 MHz bandwidth and, accordingly, includes four of each of the L-STF 802, the L-LTF 804, the L-SIG 806, the HEW-SIGAs 808, in an embodiment. In some embodiments, the modulation of different 20 MHz sub-bands signals is rotated by different angles. For example, in one embodiment, a first sub-band is rotated 0-degrees, a second sub-band is rotated 90-degrees, a third sub-band is rotated 180-degrees, and a fourth sub-band is rotated 270-degrees. In other embodiments, different suitable rotations are utilized. The different phases of the 20 MHz sub-band signals result in reduced peak to average power ratio (PAPR) of OFDM symbols in the data unit 800, in at least some embodiments. In an embodiment, if the data unit that conforms to the first communication protocol is a data unit that occupies a cumulative bandwidth such as 20 MHz, 40 MHz, 80 MHz, 160 MHz, 320 MHz, 640 MHz, etc., the HEW-STF, the HEW-LTFs, the HEW-SIGB and the HEW data portion occupy the corresponding whole bandwidth of the data unit.

Figure 8B:
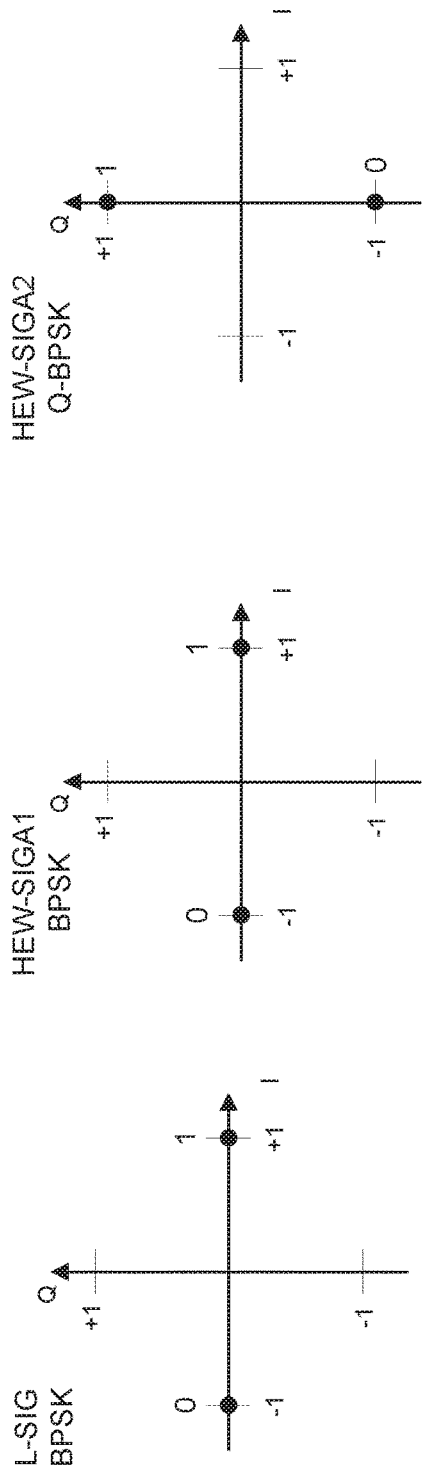
FIG. 8B includes diagrams of modulation of OFDM symbols in the PHY data unit of FIG. 8A, according to an embodiment.

FIG. 8B is a set of diagrams illustrating modulation of the L-SIG 806, HEW-SIGA1 808-1, and HEW-SIGA2 808-2 of the data unit 800 of FIG. 8A, according to an embodiment. In this embodiment, the L-SIG 806, HEW-SIGA1 808-1, and HEW-SIGA2 808-2 fields have the same modulation as the modulation of the corresponding field as defined in the IEEE 802.11ac Standard and depicted in FIG. 6B. Accordingly, the HEW-SIGA1 field is modulated the same as the L-SIG field. On the other hand, the HEW-SIGA2 field is rotated by 90 degrees as compared to the modulation of the L-SIG field. In some embodiments having the third HEW-SIGA3 field, the HEW-SIGA2 field is modulated the same as the L-SIG field and the HEW-SIGA1 field, while the HEW-SIGA3 field is rotated by 90 degrees as compared to the modulation of the L-SIG field, the HEW-SIGA1 field, and the HEW-SIGA2 field.

In an embodiment, because the preamble 801 includes L-STF 802, L-LTF 804 and L-SIG 806, a legacy communication device operating according to the IEEE 802.11a Standard will assume that the data unit 800 conforms to the IEEE 802.11a Standard. In an embodiment, the modulations of the L-SIG 806, HEW-SIGA1 808-1, and HEW-SIGA2 808-2 fields of the data unit 800 correspond to the modulations of the corresponding fields in a data unit that conforms to the IEEE 802.11a Standard. In an embodiment, because the modulations of the L-SIG 806, HEW-SIGA1 808-1, and HEW-SIGA2 808-2 fields of the data unit 800 correspond to the modulations of the corresponding fields in a data unit that conforms to the IEEE 802.11a Standard, legacy communication devices configured to operate according to the IEEE 802.11n Standard will assume, in at least some circumstances, that the data unit 800 conforms to the IEEE 802.11a Standard and will process the data unit 800 accordingly. For example, a client station that conforms to the IEEE 802.11a Standard and/or the IEEE 802.11n Standard will recognize the legacy IEEE 802.11a Standard portion of the preamble of the data unit 800 and will set a duration of the data unit (or the data unit duration) according to a duration indicated in the L-SIG 806. For example, the legacy client station 25-4 will calculate a duration for the data unit based on a rate and a length (e.g., in number of bytes) indicated in the L-SIG field 806, according to an embodiment. In an embodiment, the rate and the length in the L-SIG field 806 are set such that a client station configured to operate according to a legacy communication protocol will calculate, based the rate and the length, a packet duration (T) that corresponds to, or at least approximates, the actual duration of the data unit 800. For example, the rate is set to indicate a lowest rate defined by the IEEE 802.11a Standard (i.e., 6 Mbps), and the length is set to a value computed such that packet duration computed using the lowest rate at least approximates the actual duration of the data unit 800, in one embodiment.

In an embodiment, a legacy communication device that conforms to the IEEE 802.11a Standard or the IEEE 802.11n Standard will detect errors when attempting to decode the data unit 800 (under the assumption that the data unit is an IEEE 802.11a data unit) and will therefore assume that the data unit 800 is defective. For example, in an embodiment, the legacy communication device will continue decoding the data unit 800, but will fail an error check (e.g., using a frame check sequence (FCS)) at the end of the data unit 800. Thus, in an embodiment, a legacy communication device that conforms to the IEEE 802.11a Standard or the IEEE 802.11n Standard, when receiving the data unit 800, will compute a packet duration for the data unit 800, e.g., using a rate field and a length field of L-SIG field 806, and will wait until the end of the computed packet duration before performing clear channel assessment (CCA), in an embodiment. Thus, in this embodiment, communication medium is protected against access by the legacy client station at least for the duration of the data unit 800.

In an embodiment, the modulations of the L-SIG 806, HEW-SIGA1 808-1, and HEW-SIGA2 808-2 fields of the data unit 800 correspond to the modulations of the corresponding fields in a data unit that conforms to the IEEE 802.11ac Standard. In an embodiment, because the modulations of the L-SIG 806, HEW-SIGA1 808-1, and HEW-SIGA2 808-2 fields of the data unit 800 correspond to the modulations of the corresponding fields in a data unit that conforms to the IEEE 802.11ac Standard, a legacy client station configured to operate according to the IEEE 802.11ac Standard but not the first communication protocol, when receiving the data unit 800, will compute a packet duration (T) of the data unit 800 based on the rate and the length indicated in the L-SIG 806 of the data unit 800, in an embodiment. However, the legacy client station will not be able to detect, based on the modulation of the data unit 800, that the data unit 800 does not conform to the IEEE 802.11ac Standard, in an embodiment. In some embodiments, one or more HEW signal fields (e.g., the HEW-SIGA1 and/or the HEW-SIGA2) of the data unit 800 is/are formatted to intentionally cause the legacy client station to detect an error when decoding the data unit 800, and to therefore stop decoding (or "drop") the data unit 800. For example, HEW-SIGA 808 of the data unit 800 is formatted to intentionally cause an error when the SIGA field is decoded by a legacy device according to the IEEE 802.11ac Standard, in an embodiment. Further, according to the IEEE 802.11ac Standard, when an error is detected in decoding the VHT-SIGA field, the client station will drop the data unit 800 and will wait until the end of a computed packet duration (T), calculated, for example, based on a rate and a length indicated in the L-SIG 806 of the data unit 800, before performing clear channel assessment (CCA), in an embodiment. Thus, communication medium will be protected from access by the legacy client station for the duration of the data unit 800, in an embodiment.

FIGS. 9A-9F include diagrams of example bit allocations for various portions of the HEW-SIGA field 808, according to an embodiment. In particular, FIGS. 9A-9C include diagrams of example bit allocations for the HEW-SIGA1 field 808-1 (or portions of the HEW-SIGA1 field 808-1), and FIGS. 9D-9F include diagrams of example bit allocations for the HEW-SIGA2 field 808-2 (or portions of the HEW-SIGA1 field 808-2), according to an embodiment. The HEW-SIGA field 808 is generally formatted similar to a VHT-SIGA field as specified in the IEEE 802.11ac Standard, but one or more subfields of the HEW-SIGA field 808 are altered as compared to the corresponding subfields defined in the IEEE 802.11ac Standard and/or include values unsupported by the IEEE 802.11ac Standard to intentionally cause a legacy client station configured to operate according to the IEEE 802.11ac Standard to detect an error when processing the HEW-SIGA field 808, in some embodiments. Although FIGS. 9A-9F illustrate example numbers of bits of fields and an example of arrangements of fields, other suitable numbers of bits and/or other suitable arrangements are utilized, according to other embodiments.

Figure 9A:
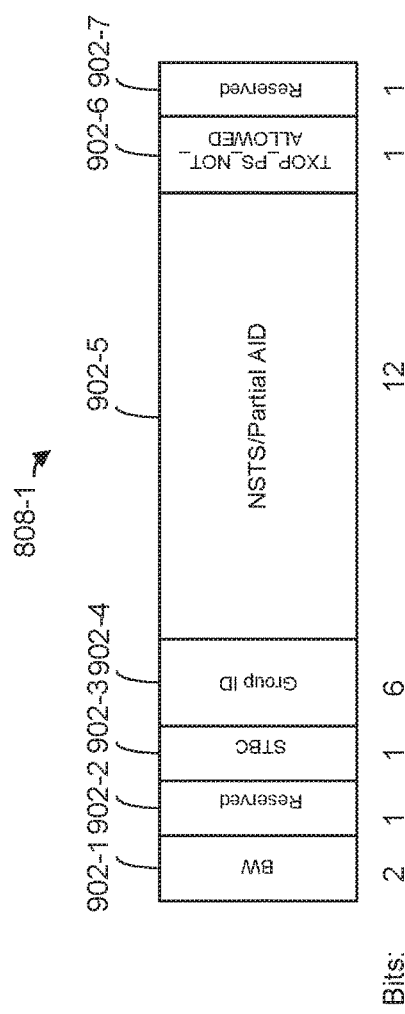
Figure 9C:
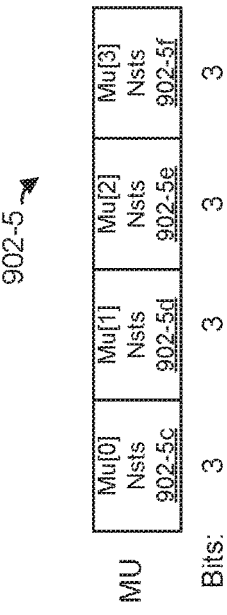
Figure 9B:
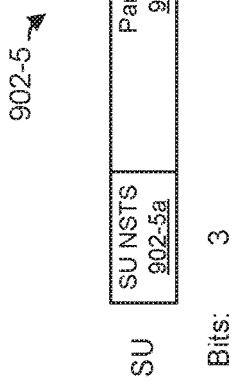

Referring to FIG. 9A, the HEW-SIGA1 field 808-1 includes a plurality of subfields 902 that collectively comprise 24 information bits, in the illustrated embodiment. In other embodiments, the HEW-SIGA1 field 808-1 spans another suitable number of bits other than 24. The plurality of subfields 902 includes a bandwidth (BW) subfield 902-1, a first reserved subfield 902-2, a space time block coding (STBC) subfield 902-3, a Group Identification (Group ID) subfield 902-4, a number of space-time streams (NSTS)/Partial AID subfield 902-5, the content of which depends on whether the data unit 700 is a single user data unit (e.g., a data unit that used to transmit information to a single client station) or in a multiuser data unit (e.g., a data unit that includes independent data streams to multiple client stations), a TXOP_PS_NOT_ALLOWED subfield 902-6, and a second reserved subfield 902-7. FIGS. 9B and 9C are diagrams of the NSTS/Partial AID subfield 902-5 for a single user and a multi user data unit, respectively, according to an embodiment. Referring to FIG. 9B, in an embodiment in which the data unit 700 is a single user data unit, the NSTS/Partial AID subfield 902-5 comprises a single user number of space-time streams (Nsts) subfield 902-5a and a Partial AID subfield 902-5b. Referring to FIG. 9C, in an embodiment in which the data unit 800 is a multiuser data unit, the NSTS/Partial AID subfield 902-5 comprises four user Nsts subfields 902-5c through 902-5f, where each of the user subfields 902-5c through 902-5f indicates a number of space time streams corresponding to an intended recipient of the data unit.

Referring to now FIG. 9D, the HEW-SIGA2 field 808-2 includes a plurality of subfields 910 that collectively comprise 24 information bits, in the illustrated embodiment. In other embodiments, the HEW-SIGA2 field 808-2 spans another suitable number of bits other than 24. The plurality of subfields 910 includes a Short GI subfield 810-1, a Short GI NSYM Disambiguation subfield 910-2, a SU/MU[0] Coding subfield 910-3, an LDPC Extra OFDM Symbol subfield 910-4, a SU MCS/MU[1-3] Coding subfield 910-5, the content of which depends on whether the data unit 800 is a single user data unit or a multiuser data unit, a beam-steering/reserved subfield 910-6, a reserved subfield 910-7, a cyclic redundancy check (CRC) subfield 910-8, and a tail subfield 901-9. FIGS. 9E and 9F include diagrams of the SU MCS/MU[1-3] Coding subfield 910-5 for a single user and a multi user data unit, respectively. Referring to FIG. 9E, in an embodiment in which the data unit 800 is a single user data unit, the SU MCS/MU[1-3] Coding subfield 910-5 comprises a single user (SU) MCS subfield 910-5a. Referring to FIG. 9F, in an embodiment in which the data unit 800 is a multiuser data unit, the SU MCS/MU[1-3] Coding subfield 910-5 comprises four subfields 910-5b through 910-5e, where each of the subfields 910-5b through 910-5d indicates a coding utilized for a particular intended recipient of the signal field 910, and the subfield 910-5e is reserved.

In some embodiments, a signal field of a data unit that conforms to the first communication protocol (e.g., the HEW-SIGA field 808 of the data unit 800) is formatted similarly to a corresponding signal field of a legacy data unit specified by a legacy communication protocol (e.g., the VHT-SIGA as specified in the IEEE 802.11ac Standard), but with a set of one or more information bits generated differently than the corresponding information bits generated according to the legacy communication protocol. For example, the set of one or more information bits includes information bits generated by an error detection scheme (e.g., CRC) not specified by the legacy communication protocol, in an embodiment. As another example, the set of one or more information bits includes information bits set to indicate a mode not supported by the legacy communication protocol, in an embodiment. The differences between the signal field formatted according to the first communication protocol and a signal field formatted according to the legacy communication protocol cause a receiving device that conforms to the legacy communication protocol, but not the first communication protocol, to detect an error when decoding a signal field of a data unit that conforms to the first communication protocol, in at least some embodiments and/or scenarios. Further, such differences permit a receiver device that conforms to the first communication protocol to determine whether a data unit being received conforms to the first communication protocol or to a legacy communication protocol, in at least some embodiments.

For example, in some embodiments, a CRC to be included in the CRC subfield 810-8 (FIG. 9C) is generated differently than a CRC specified for the VHT-SIGA field by the IEEE 802.11ac Standard. The different CRC for the HEW-SIGA 808 field will cause a CRC error when the HEW-SIGA field 808 is decoded by a client station that conforms to the IEEE 802.11ac Standard, but not the first communication protocol, in an embodiment. In an embodiment, the different CRC will permit a client station that conforms to the first communication protocol to determine that the data unit 800 conforms to the first communication protocol.

Figure 10A:
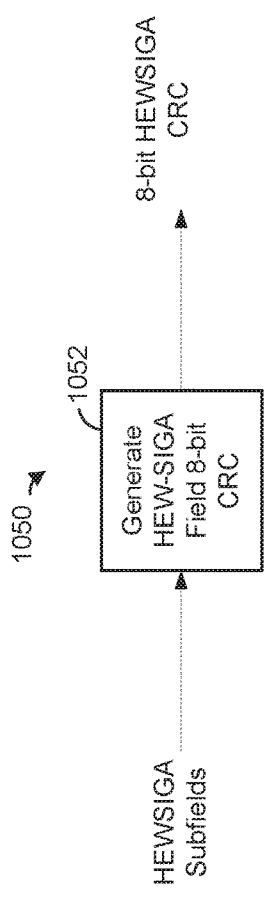
FIGS. 10A-10C include diagrams depicting several example cyclic redundancy check (CRC) generation schemes, according to various embodiments.
Figure 10B:
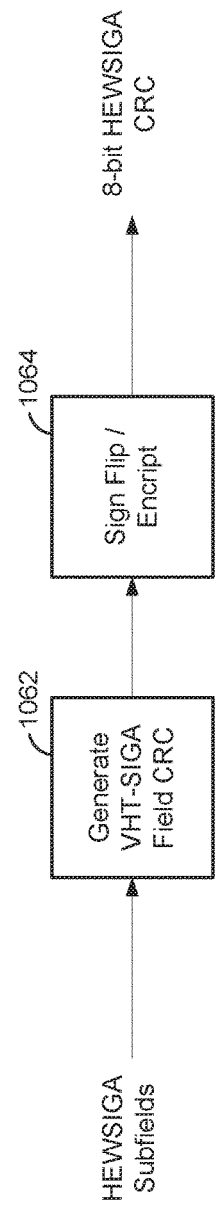
Figure 10C:
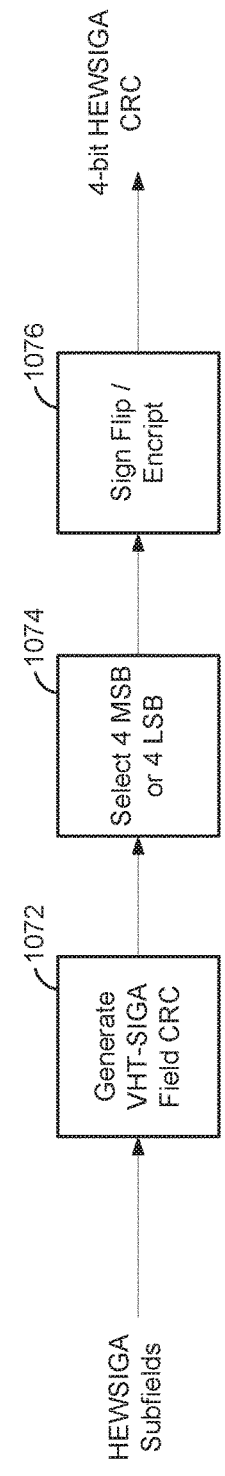

FIGS. 10A-10C include diagrams depicting several example CRC generation schemes 1050, 1060, 1070 used for generating a CRC for a HEW-SIGA field of a data unit that conforms to the first communication protocol, according to various embodiments. In various embodiments, the CRC generation schemes 1050, 1060, 1070 are used to generate the CRC subfield 910-8 (FIG. 9D) or a CRC field for another suitable HEW-SIGA field of a data unit that conforms to the first communication protocol.

Referring to FIG. 10A, according to the CRC generation scheme 1050, an 8-bit CRC for the HEW-SIGA field is generated using a polynomial that is different from the polynomial specified for the CRC for the VHT-SIGA field in the IEEE 802.11ac Standard, in an embodiment. For example, an 8-bit polynomial at least substantially orthogonal to the polynomial specified for the VHT-SIGA field is utilized at block 1052, in one embodiment. In other embodiments, other suitable polynomials different from the CRC polynomial specified for the VHT-SIGA field are utilized at block 1052.

Referring now to FIG. 10B, according to the CRC generation scheme 1060, an 8-bit CRC for the HEW-SIGA 808 is generated using the polynomial specified for the VHT-SIGA field in the IEEE 802.11ac Standard (block 1062), but one or more bits of the generated CRC are flipped (i.e., "0" changed to "1" and "1" changed to "0"), or otherwise encrypted at block 1064, according to an embodiment. In other embodiments, another suitable CRC polynomial different than the polynomial specified for the VHT-SIGA field in the IEEE 802.11ac Standard is utilized.

Referring now to FIG. 10C, according to the CRC generation scheme 1070, a CRC having less bits than the 8-bit CRC specified for the VHT-SIGA field in the IEEE 802.11ac Standard is generated for the HEW-SIGA field, in an embodiment. For example, a 4-bit CRC is generated for the HEW-SIGA, in some embodiments. The 4-bit CRC is generated, for example, using the polynomial specified for the VHT-SIGA field in the IEEE 802.11ac Standard (block 1072). Then, a 4-bit subset of the generated CRC (block 1074) is selected. For example, the four most significant bits (MSB) or the four most significant bits (LSB) of the generated CRC (block 1074) are selected, in some embodiments. Further, one or more bits of the selected 4-bit CRC are flipped (i.e., "0" changed to "1" and "1" changed to "0"), or otherwise encrypted at block 1076, according to an embodiment. In other embodiments, the CRC generation scheme 1070 generates a CRC that is another suitable number of bits less than 8 (e.g., 7 bits, 6 bits, 5 bits, etc.). For example, a 5-bit CRC is generated using the polynomial specified for the VHT-SIGA field in the IEEE 802.11ac Standard, selecting five most significant bits (MSB) of the generated CRC, the five least significant bits (LSB) of the generated CRC, or another 5-bit subset of the generated CRC, and encrypting (e.g., flipping) one or more bits of the resulting 5-bit CRC, in some embodiments. In some embodiments in which fewer CRC bits are utilized as compared to the legacy protocol (e.g., fewer than 8), the remaining bit locations of the HEW-SIGA field (e.g., the other ones of MSBs or LSBs of the CRC subfield 810-8 of FIG. 9D) are reserved and/or are utilized to signal additional information relevant to the first communication protocol.

In other embodiments, another suitable CRC polynomial different than the polynomial specified for the VHT-SIGA field in the IEEE 802.11ac Standard is utilized. In some embodiments, the CRC polynomial (different than the polynomial specified for the VHT-SIGA field in the IEEE 802.11ac Standard) is configured to generate less bits as compared to the CRC defined by the legacy protocol. Thus, in some embodiments, block 1074 is omitted.

While FIGS. 10A-10C depict several example CRC generation schemes utilized for the HEW-SIGA field 808 according to some embodiments, in general, any suitable CRC generation scheme different than a CRC generation scheme specified for the VHT-SIGA field by the IEEE 802.11ac Standard can be utilized, and thus other suitable CRC generation schemes are utilized to generate CRC for the HEW-SIGA field 808 in other embodiments.

As just an example, in some embodiments, CRC having less bits than the 8-bit CRC specified for the VHT-SIGA field in the IEEE 802.11ac Standard is generated for the HEW-SIGA field using a polynomial that is different from the polynomial specified by the IEEE 802.11ac Standard.

For example, an x-bit CRC is generated using an x-bit polynomial designed such that the generated CRC is at least substantially uncorrelated with the corresponding bits of the VHT-SIGA CRC generated according to the IEEE 802.11ac Standard, where x is an integer between 1 and 7, in some embodiments. In some such embodiments, the remaining bit locations of the HEW-SIGA field that correspond to bit locations of the CRC subfield of a VHT-SIGA field defined by the IEEE 802.11ac Standard (e.g., the other ones of MSBs or LSBs of the CRC subfield 910-8 of FIG. 9D) are reserved or are utilized to signal additional information relevant to the first communication protocol.

In an embodiment, differences in CRC generation for the HEW-SIGA field according to the first communication protocol and for the VHT-SIGA field as defined in the IEEE 802.11ac Standard will cause a legacy client station configured to operate according to the IEEE 802.11ac Standard to detect a CRC error when decoding the data unit 800 and to therefore drop the data unit 800. Further, differences in CRC generation for the HEW-SIGA field according to the first communication protocol and for the VHT-SIGA field defined in the IEEE 802.11ac Standard will permit a client station configured to operate according to the first communication protocol, when receiving a data unit, to detect whether the data unit conforms to the first communication protocol or to the IEEE 802.11ac Standard.

Figure 11:
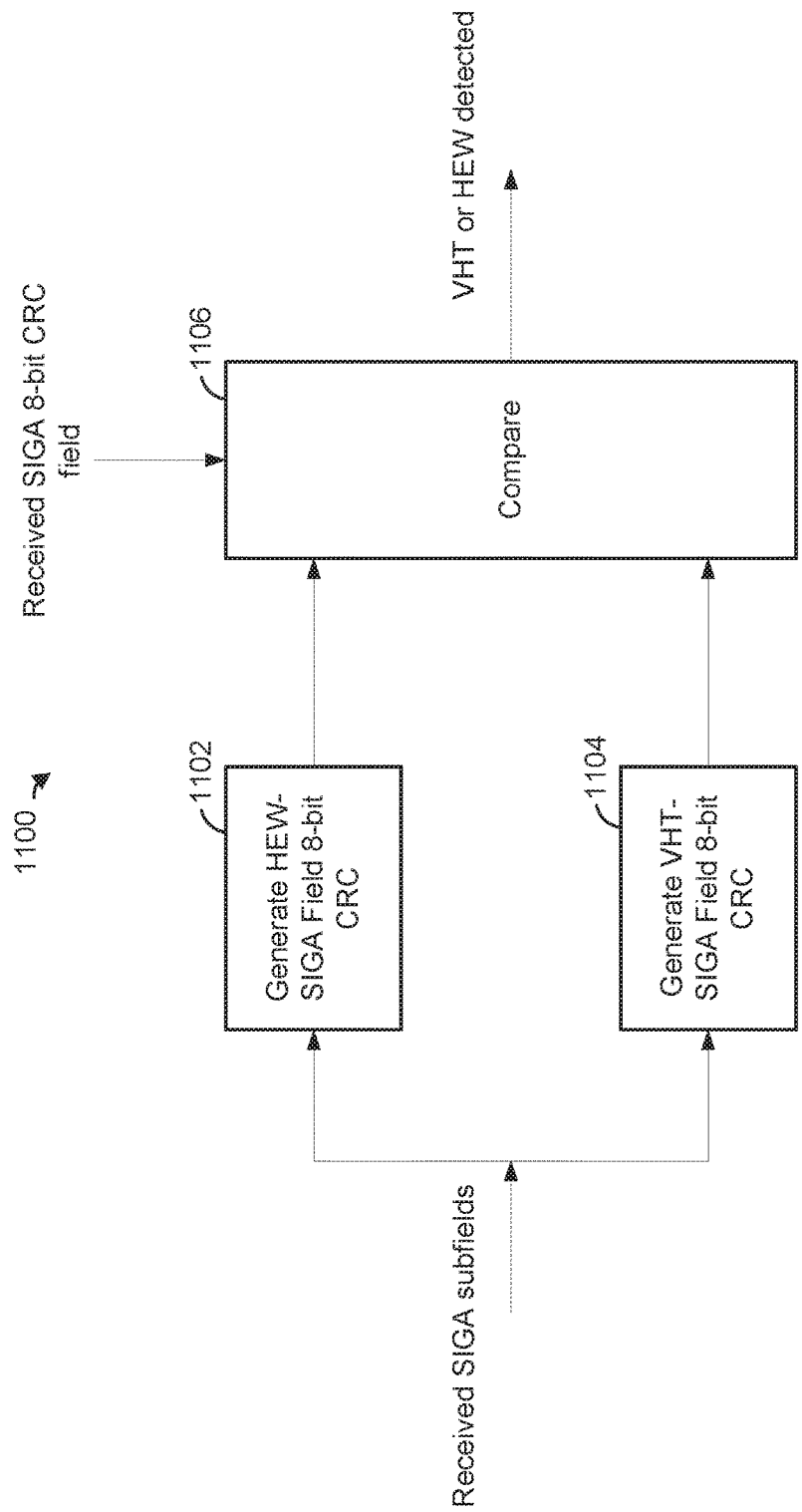
FIG. 11 is a block diagram depicting an example method for detecting whether a PHY data unit conforms to a first format or to a second format, according to an embodiment.

FIG. 11 is a block diagram depicting a detection scheme 1100 used by a client station (e.g., the client station 25-1) configured to operate according the first communication protocol to determine whether a data unit conforms to the first communication protocol or to a legacy communication protocol (e.g., the IEEE 802.11ac Standard), according to an embodiment. The detection scheme 1100 is suitable for use in embodiments in which the HEW-SIGA field of data units conforming to the first communication protocol include a CRC having the same number of bits as CRC specified for a corresponding field by the legacy communication protocol (e.g., 8 bits). According to the detection scheme 1100, a client station receiving a data unit decodes the SIGA field of the data unit. After decoding the signal field, the client station extracts bits from the decoded SIGA field (e.g., extracts bits other than CRC bits and BCC tail bits) for performing a CRC for the SIGA field of the data unit, in an embedment. Then, a first CRC for the SIGA field is generated (block 1102) based on the set of bits and using a CRC generation scheme specified in the first communication protocol. A second CRC for the SIGA field is generated (block 1104) based on the set of bits and using a CRC generation scheme specified in the legacy communication protocol (e.g., the IEEE 802.11ac Standard). The first generated CRC and the second generated CRC are compared (block 1106) to the received CRC that was received in the SIGA field of the data unit. When a match is detected between the received CRC and the first generated CRC, it is determined that the data unit conforms to the first communication protocol, in an embodiment. On the other hand, when a match is detected between the received CRC and the second generated CRC, it is determined that the data unit conforms to the legacy communication protocol (e.g., the IEEE 802.11ac Standard), in an embodiment.

In other embodiments, only one of blocks 1102, 1104 is performed initially, and the CRC generated by one of the blocks 1102, 1104 is compared (block 1106) to the received CRC. When a match is detected between the received CRC and the generated CRC, it is determined that the data unit conforms to the first communication protocol (if block 1102 was performed) or to the legacy protocol (if block 1104 was performed), in an embodiment. On the other hand, when a match is not detected, the other one of blocks 1102, 1104 is performed, and the CRC generated by the other one of the blocks 1102, 1104 is compared (block 1106) to the received CRC. When a match is detected between the received CRC and the generated CRC, it is determined that the data unit conforms to the first communication protocol (if block 1102 was performed) or to the legacy protocol (if block 1104 was performed), in an embodiment.

Figure 12:
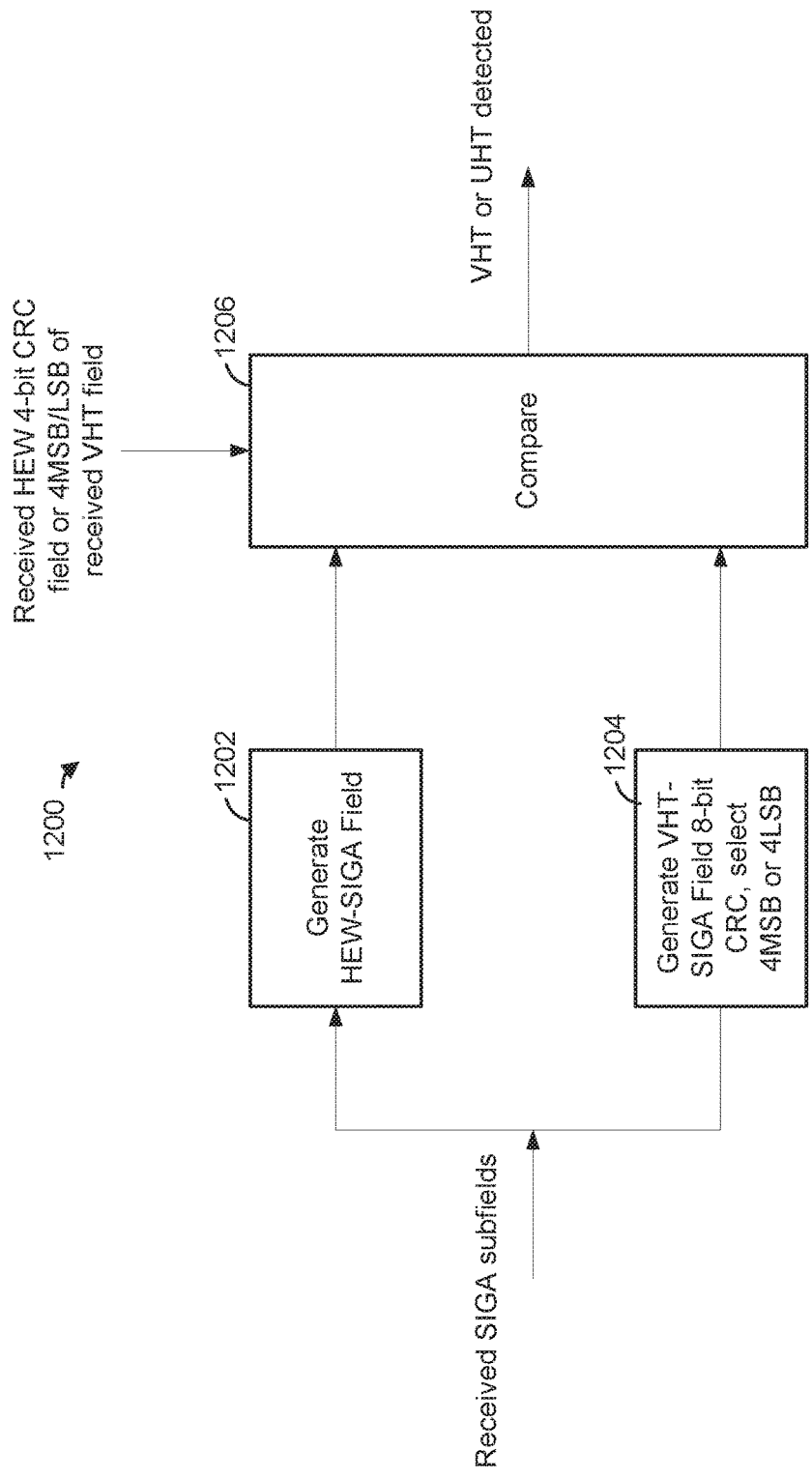
FIG. 12 is a block diagram depicting another example method for detecting whether a PHY data unit conforms to a first format or to a second format, according to another embodiment.

FIG. 12 is a block diagram depicting a detection scheme 1200 used by a client station (e.g., the client station 25-1) configured to operate according the first communication protocol to detect to whether a data unit conforms to the first communication protocol or to a legacy communication protocol, according to another embodiment. The detection scheme 1200 is suitable for use in embodiments in which the CRC for the HEW-SIGA field includes fewer bits (e.g., 4 bits) than the number of CRC bits specified by the legacy communication protocol, according to an embodiment. According to the detection scheme 1200, the client station, when receiving a data unit, decodes the SIGA field of the data unit. The client station then extracts bits from the decoded SIGA field (e.g., extracts bits other than CRC bits and BCC tail bits) for performing a CRC for the SIGA field of the data unit. Then, a first CRC for the received SIGA field is generated (block 1202) based on the set of bits and using the CRC generation scheme specified in the first communication protocol. In an embodiment, the CRC is generated as specified by the first communication protocol. For example, in an embodiment, the CRC is generated by applying a CRC polynomial specified by the legacy communication protocol to the set of bits, selecting a subset of bits of the generated CRC (e.g., four LSBs, four MSBs, another suitable subset of CRC bits, etc.), and encrypting one or more bits in the selected subset to generate the first CRC.

A second CRC for the SIGA field is generated (block 1204) based on the set of bits and according to the CRC generation scheme specified in the IEEE 802.11ac Standard. The first generated CRC and the second generated CRC are compared (block 1206) to the corresponding bits of the CRC that was received in the SIGA field of the data unit. When a match is detected between the received CRC and the first generated CRC, it is determined that the data unit conforms to the first communication protocol, in an embodiment. On the other hand, when a match is detected between the received CRC and the second generated CRC, it is determined that the data unit conforms to the legacy communication protocol (e.g., the IEEE 802.11ac Standard), in an embodiment.

In other embodiments, only one of blocks 1202, 1204 is performed initially, and the CRC generated by one of the blocks 1202, 1204 is compared (block 1206) to the received CRC. When a match is detected between the received CRC and the generated CRC, it is determined that the data unit conforms to the first communication protocol (if block 1202 was performed) or to the legacy protocol (if block 1204 was performed), in an embodiment. On the other hand, when a match is not detected, the other one of blocks 1202, 1204 is performed, and the CRC generated by the other one of the blocks 1202, 1204 is compared (block 1206) to the received CRC. When a match is detected between the received CRC and the generated CRC, it is determined that the data unit conforms to the first communication protocol (if block 1202 was performed) or to the legacy protocol (if block 1204 was performed), in an embodiment.

In some embodiments, in addition to or instead of using CRC to intentionally cause a legacy station to detect an error from the HEW-SIGA field 808, one or more subfields of the HEW-SIGA field 808 are set to indicate a mode that is not supported by legacy client stations configured to operate according to the legacy communication protocol to intentionally cause a legacy station to detect an error from the HEW-SIGA field 808.

For example, the HEW-SIGA field 808 includes an indication of a modulation and coding scheme (e.g., in the field 910-5, in some embodiments) not supported by a legacy client station operating according to the IEEE 802.11ac Standard to intentionally cause the legacy client station to detect an error when decoding the HEW-SIGA field 808, in an embodiment. As another example, in some embodiments, the HEW-SIGA field 808 includes a subfield combination that is not supported or specified as "unallowable" by the IEEE 802.11ac Standard. For example, for a single user data unit, the Group ID subfield 902-4 of the HEW-SIGA field 808 is set to a value of 0 or 63 and the SU MCS field 902-5*b* is set to indicate an MCS greater than 9, which is a subfield combination not supported by the IEEE 802.11ac Standard, according to an embodiment.

As another example, in another embodiment, the STBC subfield 902-3 and the SU NSTS subfield 902-5*a* are both set to a logic one (1), which is a subfield combination not supported by the IEEE 802.11ac Standard. As yet another example, in yet another embodiment, for a multi-user data unit, the STBC subfield 902-3 and each of Nsts subfields 902-5*c* through 902-5*f* is set to a logic one (1), which is a subfield combination not supported by the IEEE 802.11ac Standard. In other embodiments, other SIGA subfield combinations unallowable in the IEEE 802.11ac Standard are utilized in the HEW-SIGA field 808 to intentionally cause an error when the HEW-SIG field 808 is decoded by a legacy client station. Further, such unallowable combinations included in the HEW-SIGA field 808 of the data unit 800 indicate to a client station that conforms to the first communication protocol that the data unit 800 conforms to the first communication protocol, in some embodiments.

In some embodiments, one or more additional indications is/are included in the HEW-SIGA field 808 of the data unit 800 to indicate to a client station configured to operate according to the first communication protocol that the data unit 800 conforms to the first communication protocol. For example, a subfield that corresponds to a reserved subfield in a VHT-SIGA field generated according to the IEEE 802.11ac Standard is set to a logic zero (0) in the HEW-SIGA field 808 to indicate to a client station configured to operate according to the first communication protocol that the data unit 800 conforms to the first communication protocol. In this embodiment, a client station operating according to the first communication protocol, when receiving a data unit, determines that the data unit conforms to the first communication protocol if the reserved bit in the HEW-SIGA field is set of logic zero (0) and determines that the data unit conforms to the IEEE 802.11ac Standard if the reserved bit is set to a logic one (1), in an embodiment.

In some embodiments, at least some portions (e.g., subfields) of a HEW-SIGA field (e.g., the HEW-SIGA field 808) that are not used to intentionally cause an error at a legacy device are not formatted the same as the corresponding portions (e.g., subfields) of a VHT-SIGA field specified by the IEEE 802.11ac Standard. For example, such portions are altered to include additional information relevant to the first communication protocol, in some embodiments. For example, whereas the VHT-SIGA field specified by the IEEE 802.11ac Standard includes two bits to indicate the BW of a data unit, some data units that conform to the first communication protocol occupy wider bandwidth than the widest bandwidth specified by the IEEE 802.11ac Standard. Thus, in some embodiments, one or more extra bits are needed to signal the bandwidth for data units that conform to the first communication protocol. For example, in one embodiment, the HEW-SIGA field includes a bandwidth indication subfield spanning three bits. Additionally or alternatively, in some embodiments, extra signal field bits are utilized for the HEW-SIGA field to signal new physical layer (PHY) features that are not present in the IEEE 802.11ac Standard.

In some such embodiments, VHT-SIGA subfields that are reserved according to the IEEE 802.11ac Standard are utilized in the HEW-SIGA field to signal the wider bandwidth and/or additional PHY features according to the first communication protocol. Additionally or alternatively, in some embodiments in which HEW-SIGA utilizes a CRC that is shorter than the eight bit CRC defined for VHT-SIGA in the IEEE 802.11ac Standard, bits corresponding to the remaining CRC bits of the VHT-SIGA field are utilized in the HEW-SIGA field to signal the wider bandwidth and/or additional PHY features according to the first communication protocol.

In some embodiments in which the HEW-SIGA field 808 includes an explicit indication to signal that the data unit 800 conforms to the first communication protocol, schemes designed to intentionally cause an error at a legacy client station are not employed for the HEW-SIGA field 808. For example, in an embodiment, a CRC for the HEW-SIGA field 808 is generated using the VHT-SIGA CRC polynomial specified in the IEEE 802.11ac Standard and with the same number of bits as specified in the IEEE 802.11ac Standard. Further, in this embodiment, a subfield that corresponds to a reserved subfield in a VHT-SIGA field generated according to the IEEE 802.11ac Standard is set to a logic zero (0) in the HEW-SIGA field 808 to indicate to a client station configured to operate according to the first communication protocol that the data unit 800 conforms to the first communication protocol. In this case, a client station configured to operate according to the first communication protocol will determine that the data unit 800 conforms to the first communication protocol based on the indication included in the HEW-SIGA field 808. However, a legacy client station client station receiving the data unit 800, in this case, will not necessarily detect an error from the HEW-SIGA field 808 and will not necessarily drop the data unit 800. In some situations, in such embodiments, the legacy client station will drop the data unit 800 even without detecting an intentionally caused error from the HEW-SIGA field 808. For example, the legacy client station will determine that the partial address identification (PAID) and/or the group ID (GID) included in the HEW-SIGA field 808 do not match the corresponding parameters of the client station, and will drop (stop decoding) the data unit 800 based on this determination. In other embodiments, however, the legacy client station will not drop the data unit 800 even when the client station determines that the partial address identification (PAID) and/or the group ID (GID) included in the HEW-SIGA field 808 do not match the corresponding parameters of the client station. In this case, the client station will continue decoding the data unit 800 for the duration of the data unit 800, and will discard the data unit 800 based on a failed FCS check at the end of the data unit 800, in at least some situations.

In another embodiment, CRC for the HEW-SIGA field 808 is generated using the VHT-SIGA CRC polynomial specified in the IEEE 802.11ac Standard, but with fewer bits than specified in the IEEE-802.11ac Standard. For example, a CRC is generated using the VHT-SIGA CRC polynomial, and x number of bits of the generated CRC is/are used as the CRC for the HEW-SIGA field 808. For example, four (or another suitable number, such as e.g., 5 or 6) MSB or LSB of the CRC generated using the VHT-SIGA CRC polynomial are utilized, in some embodiments. In some such embodiments, the remaining bit locations of the CRC subfield are reserved or are utilized to signal additional information relevant to the first communication protocol. In such embodiments, although the CRC is not intentionally designed to cause an error from the HEW-SIGA field at a legacy client device, it is highly likely that such an error will be detected, in which case the client station will drop the data unit 800. Further, in such embodiments, a client station configured to operate according to the first communication protocol will perform a CRC check for the HEW-SIGA field 808 by generating the CRC based on received bits of the HEW-SIGA field 808 using the CRC polynomial specified for the VHT-SIGA field in the IEEE 802.11ac Standard, and comparing four (or another suitable number, such as e.g., 5 or 6) MSB or LSB bits of the generated CRC to the received CRC in the HEW-SIGA field. Upon passing the CRC check, the client station will decode the received HEW-SIGA field and will determine that the data unit 800 conforms to the first communication protocol based on the indication included in the HEW-SIGA field.

Figure 13A:
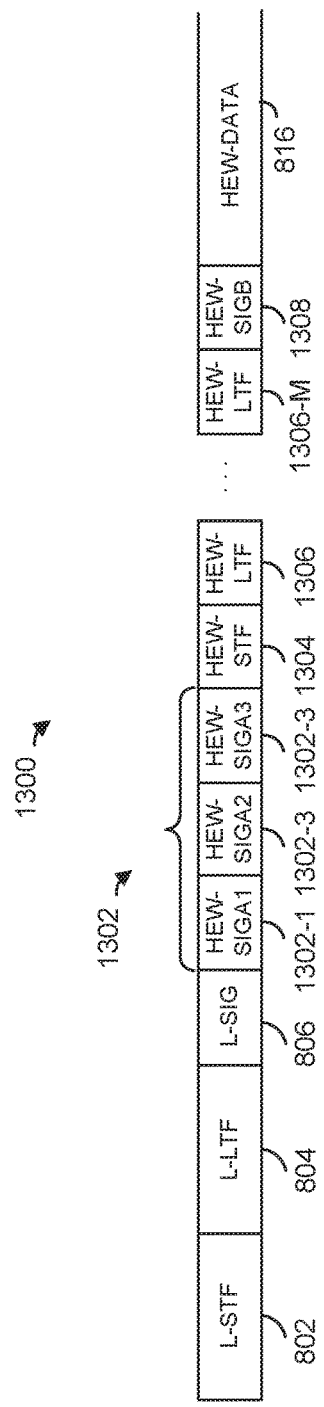
FIG. 13A is a diagram of another example PHY data unit format, according to another embodiment.

FIG. 13A is a diagram of an example data unit 1300 that the client station AP 14 is configured to transmit to the client station 25-1 via OFDM modulation, according to an embodiment. In an embodiment, the client station 25-1 is also configured to transmit the data unit 1300 to the AP 14. The data unit 1300 conforms to the first communication protocol and occupies a 20 MHz bandwidth. Data units similar to the data unit 1300 occupy other suitable bandwidth such as 40 MHz, 80 MHz, 160 MHz, 320 MHz, 640 MHz, or other suitable bandwidths, in other embodiments. The data unit 1300 is suitable for "mixed mode" situations, i.e. when the WLAN 10 includes a client station (e.g., the legacy client station 24-4) that conforms to a legacy communication protocol, but not the first communication protocol. The data unit 1300 is utilized in other situations as well, in some embodiments.

Figure 13B:
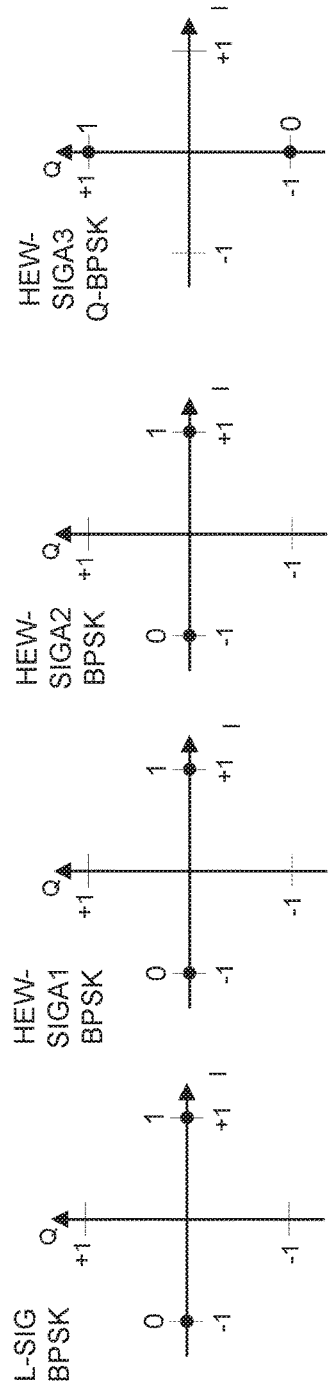
FIG. 13B includes diagrams of modulation of OFDM symbols in the PHY data unit of FIG. 13A, according to an embodiment.

The data unit 1300 is similar to the data unit 800 of FIG. 8A, except that the data unit 1200 includes three HEW-SIGA fields 1302 as compared to two HEW-SIGA fields 808 included in the data unit 800. In some embodiments, data unit similar to the data unit 1300 include other suitable numbers (e.g., 4, 5, 6, etc.) of the HEW-SIGA fields 1302. Each HEW-SIGA field 1302 comprises one OFDM symbol of the data unit 1300, in an embodiment. Additional HEW-SIGA fields 1320 as compared to the two HEW-SIGA fields 808 of the data unit 800 are utilized to carry additional information relevant to the first communication protocol, for example to signal wider bandwidths defined in the first communication protocol, or to signal additional PHY features included in the first communication protocol. In some embodiments, HEW-SIGB field 1308 is omitted from the data unit 1300, and at least some of the Information included in the HEW-SIGB field 1308 (e.g., MU information) is moved to the HEW-SIGA fields 1302, in some such embodiments. In some embodiments, the HEW-SIGA3 field 1302-3 is referred to as a HEW-SIGB field, and the HEW SIGB field 1308 is omitted. Thus, in some embodiment, FIG. 13B is a set of diagrams illustrating modulation of the L-SIG 706, HEW-SIGA1 1302-1, and HEW-SIGA2 1302-2, and HEW-SIGA2 1302-2 of the data unit 1300 of FIG. 13A, according to an embodiment. In an embodiment, because a preamble of the data unit 1300 includes L-STF 802, L-LTF 804 and L-SIG 806, a legacy communication device operating according to the IEEE 802.11a Standard will assume that the data unit 1300 conforms to the IEEE 802.11a Standard.

In this embodiment, the L-SIG 706, the HEW-SIGA1 1302-1, and the HEW-SIGA2 1302-2 fields are modulated according to BPSK modulation, which causes legacy communication devices configured to operate according to the IEEE 802.11n Standard and/or the IEEE 802.11ac Standard to assume that the data unit 1300 conforms to the IEEE 802.11a Standard. Accordingly, legacy client stations configured to operate to the IEEE 802.11a Standard, the IEEE 802.11n Standard, and/or the IEEE 802.11ac will process the data unit 1300 in the same manner that such devices would treat an IEEE 802.11a packet, in at least some embodiments and/or scenarios. For example, a legacy client station will compute, based on the L-SIG field 806, a packet duration for the data unit 1300, and will wait until the end of the computed packet duration before performing clear channel assessment (CCA), in an embodiment. Similar to the data unit format discussed above with respect to FIGS. 8A and 8B, legacy communication devices, having assumed that the data unit 1300 conforms to the IEEE 802.11a Standard, will determine that the data unit 1300 includes errors and will not further process the data unit 1300. Further, a client station configured to operate according to the first communication protocol will detect the modulation of the HEW-SIGA3 field 1302-3 (e.g., Q-BPSK) and, based on the detected modulation, will determine that the data unit 1300 conforms to the first communication protocol, in an embodiment.

In various embodiments, one or more techniques such as described above with respect to FIGS. 13A and 13B are combined with one or more techniques such as described above with respect to FIGS. 8A, 8B, 9A-F, 10A-C, 11, and 12 such that the AP 14 and/or the client station 25-1 conforming to the first communication protocol are able to determine, using the preamble, the data unit format of a received data unit. In various embodiments, one or more techniques such as described above with respect to FIGS. 13A and 13B are combined with one or more techniques such as described above with respect to FIGS. 8A, 8B, 9A-F, 10A-C, 11, and 12 such that the AP 14 and/or the client station 25-1 conforming to the first communication protocol are able to determine, using the preamble, that a received data unit conforms to the first communication protocol. Similarly, a client station 25-4 that operates according to a legacy protocol, and not the first communication protocol, is able to determine certain information regarding the data unit, such as a duration of the data unit, and/or that the data unit does not conform to the legacy protocol. Similarly, the AP 14 and/or the client station 25-1 configured to operate according to the first communication protocol also generate and transmit data units such as described above.

Figure 14:
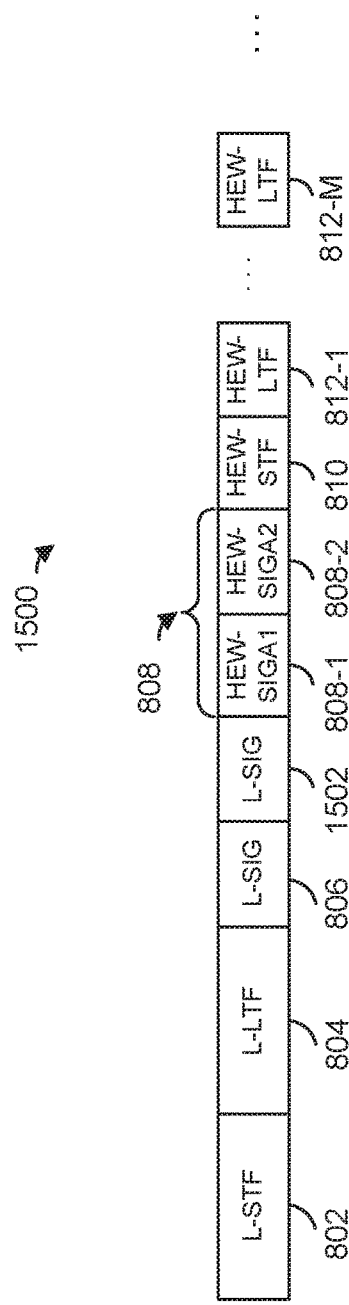
FIG. 14 is a diagram of another example PHY preamble format, according to another embodiment.

FIG. 14 is a diagram of a PHY preamble 1500 of a data unit that conforms to the first communication protocol, according to an embodiment. In an embodiment, the network interface device 16 of the AP 14 is configured to generate and transmit a data unit 1500 to the client station 25-1 via OFDM modulation, according to an embodiment. In an embodiment, the network interface device 27 of the client station 25-1 is configured to determine that a data unit including the data unit 1500 conforms to the first communication protocol using techniques discussed below.

In an embodiment, the network interface device 27 of the client station 25-1 is also configured to generate and transmit a data unit including the PHY preamble 1500 to the AP 14. In an embodiment, the network interface device 16 of the AP 14 is configured to determine that a data unit including the PHY preamble 1500 conforms to the first communication protocol using techniques discussed below.

A data unit including the PHY preamble 1500 conforms to the first communication protocol and occupies a 20 MHz bandwidth, according to an embodiment. Data units that conform to the first communication protocol similar to the data unit including the PHY preamble 1500 may occupy other suitable bandwidth such as 40 MHz, 80 MHz, 160 MHz, 320 MHz, 640 MHz, for example, or other suitable bandwidths, in various other embodiments. The data unit including the PHY preamble 1500 is suitable for "mixed mode" situations, i.e., when the WLAN 10 includes a client station (e.g., the legacy client station 25-4) that conforms to a legacy communication protocol, but not the first communication protocol. The data unit including the PHY preamble 1500 is utilized in other situations as well, in some embodiments.

The PHY preamble 1500 includes an L-STF 802, L-LTF 804, and L-SIG 806, according to an embodiment. The L-STF 802, L-LTF 804, and L-SIG 806 are part of a first portion of the preamble that matches a corresponding first portion of a legacy preamble (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 806 and determine a length of a PHY data unit that includes the PHY preamble. For example, the L-SIG 806 includes a length field set to a value that indicates a length of the PHY data unit that includes the PHY preamble 1500, in an embodiment. The preamble 1500 further includes HEW-SIG field 808, including a HEW-SIGA1 808-1 and a HEW-SIGA2 808-2, a HEW-STF 810, and M-HEW LTFs 812, where M is an integer.

The PHY preamble 1500 includes a second L-SIG field 1502. In an embodiment, the L-SIG field 1502 is a duplicate of the L-SIG field 806. In an embodiment, a communication device configured to operate according to the first communication protocol is configured to detect repetition of the L-SIG field 1502 in the PHY preamble 1500, and based on the detected reception of the L-SIG field 806, determine that the PHY preamble 1500 conforms to the first communication protocol. In an embodiment, upon detecting the repetition of the L-SIG fields 806, 1502, the receiving device uses duplication in the repeating L-SIG fields as additional training information to improve channel estimation, in an embodiment. In some embodiments, the receiving device first decodes the L-SIG 806, and then detects the repetition of the L-SIG fields 806, 1502 using the value of the length subfield in L-SIG 806. In another embodiment, the receiving device first detects the repetition of the L-SIG fields 806, 1502, and then combines the detected multiple L-SIG fields 806, 1502 to improve decoding reliability of the L-SIG fields 806, 1502 and/or uses the redundant information in the multiple L-SIG fields 806, 1502 to improve channel estimation.

Figure 15:
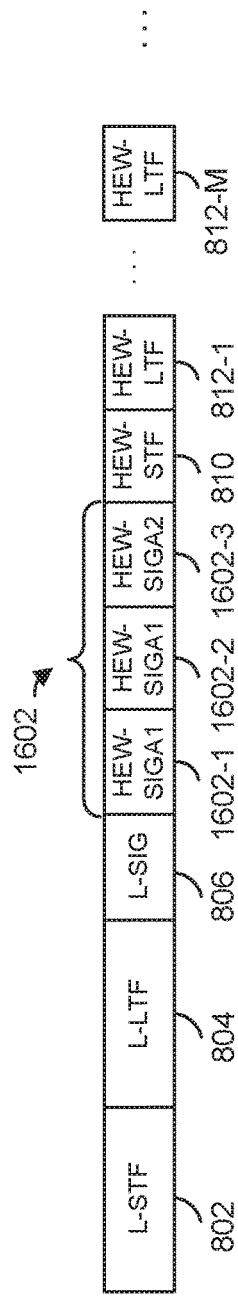
FIG. 15 is a diagram of another example PHY preamble format, according to another embodiment.

FIG. 15 is a diagram of a PHY preamble 1600 of a data unit that conforms to the first communication protocol, according to another embodiment. In an embodiment, the network interface device 16 of the AP 14 is configured to generate and transmit a data unit including the PHY preamble 1600 to the client station 25-1 via OFDM modulation, according to an embodiment. In an embodiment, the network interface device 27 of the client station 25-1 is configured to determine that a data unit including the PHY preamble 1600 conforms to the first communication protocol using techniques discussed below.

In an embodiment, the network interface device 27 of the client station 25-1 is also configured to generate and transmit a data unit including the PHY preamble 1600 to the AP 14. In an embodiment, the network interface device 16 of the AP 14 is configured to determine that a data unit including the PHY preamble 1600 conforms to the first communication protocol using techniques discussed below.

A data unit including the PHY preamble 1600 conforms to the first communication protocol and occupies a 20 MHz bandwidth, according to an embodiment. Data units that conform to the first communication protocol and including a preamble similar to the preamble 1600 may occupy other suitable bandwidth such as 40 MHz, 80 MHz, 160 MHz, 320 MHz, 640 MHz, for example, or other suitable bandwidths, in various other embodiments. The preamble 1600 is suitable for "mixed mode" situations, i.e., when the WLAN 10 includes a client station (e.g., the legacy client station 25-4) that conforms to a legacy communication protocol, but not the first communication protocol. The PHY preamble 1600 is utilized in other situations as well, in some embodiments.

The PHY preamble 1600 includes an L-STF 802, L-LTF 804, and L-SIG 806, according to an embodiment. The L-STF 802, L-LTF 804, and L-SIG 806 are part of a first portion of the preamble that matches a corresponding first portion of a legacy preamble (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 806 and determine a length of a PHY data unit that includes the PHY preamble 1600. For example, the L-SIG 806 includes a length field set to a value that indicates a length of the PHY data unit that includes the PHY preamble 1600, in an embodiment. The PHY preamble 1600 further includes a HEW-STF 810, and M-HEW LTFs 812, where M is an integer.

Unlike the PHY preamble 1500, the PHY preamble 1600 omits the second L-SIG 1502. Additionally, unlike the PHY preamble 1500, HEW-SIGA field 1602 includes a HEW-SIGA1 1602-1, a HEW-SIGA1 1602-2, and a HEW-SIGA2 1602-3. HEW-SIGA1 1602-2 is a duplicate of HEW-SIGA1 1602-1, in an embodiment. In an embodiment, a communication device configured to operate according to the HEW protocol is configured to detect repetition of the HEW-SIGA1 fields 1602-1, 1602-2 in the PHY preamble 1600, and based on the detected repetition of the HEW-SIGA1 fields 1602-1, 1602-2 determine that the preamble 1600 conforms to the HEW communication protocol. In an embodiment, the receiving device conforming to the first communication protocol uses duplication in the repeating HEW-SIGA1 fields 1602-1, 1602-2 as additional training information to improve channel estimation, in an embodiment. In another embodiment, the receiving device conforming to the first communication protocol combines the detected multiple HEW-SIGA1 fields 1602-1, 1602-2 to improve decoding reliability of the HEW-SIGA1 fields 1602-1, 1602-2 and/or uses the redundant information in the multiple HEW-SIGA1 fields 1602-1, 1602-2 to improve channel estimation.

In an embodiment, L-SIG 806, HEW-SIGA1 1602-1, and the duplicate HEW-SIGA1 1602-2 are modulated using BPSK. In another embodiment, L-SIG 806 and HEW- SIGA1 1602-1 are modulated using BPSK, whereas the duplicate HEW-SIGA1 1602-2 is modulated using Q-BPSK. In another embodiment, L-SIG 806 is modulated using BPSK, whereas HEW-SIGA1 1602-1 and the duplicate HEW-SIGA1 1602-2 are modulated using Q-BPSK. In another embodiment, L-SIG 806 and the duplicate HEW-SIGA1 1602-1 are modulated using BPSK, whereas the HEW-SIGA1 1602-2 is modulated using Q-BPSK.

The IEEE 802.11ac Standard specifies that the length subfield in L-SIG must be set to a value that specifies a number of bytes that is a multiple of three. In an embodiment, the length subfield in the L-SIG 806 of the PHY preamble 1600 is set to a value that is not a multiple of three. In an embodiment, when a first client station that conforms to the IEEE 802.11ac protocol but not to the HEW protocol receives a PHY data unit having the PHY preamble 1600, where L-SIG 806 and HEW-SIGA1 1602-1 are modulated using BPSK, the duplicate HEW-SIGA1 1602-2 is modulated using Q-BPSK, and the length subfield in L-SIG 806 is set to a value that is not a multiple of three, the first client station will conclude that i) the PHY data unit conforms to the IEEE 802.11ac protocol, ii) that there is an error in the PHY data unit (because length subfield in L-SIG 806 is set to a value that is not a multiple of three). In response, the first client station will assume that the medium is busy for a period of time indicated by the length subfield in L-SIG 806, and will discard the PHY data unit. In an embodiment, when a first client station that conforms to the IEEE 802.11ac protocol but not to the HEW protocol receives a PHY data unit having the PHY preamble 1600, where L-SIG 806 and HEW-SIGA 11602-1 are modulated using BPSK, the duplicate HEW-SIGA1 1602-2 is modulated using Q-BPSK, the first client station will conclude that i) the PHY data unit conforms to the IEEE 802.11ac protocol, ii) that there is an error in the PHY data unit (because a CRC generated based on HEW-SIGA1 1602-1 and the duplicate of HEW-SIGA1 1602-2). In response, the first client station will assume that the medium is busy for a period of time indicated by the length subfield in L-SIG 806, and will discard the PHY data unit.

In an embodiment, when a second client station that conforms to the HEW protocol receives a PHY data unit having the PHY preamble 1600, where L-SIG 806 and HEW-SIGA1 1602-1 are modulated using BPSK, the duplicate HEW-SIGA1 1602-2 is modulated using Q-BPSK, and the length subfield in L-SIG 806 is set to a value that is not a multiple of three, the second client station will conclude that the PHY data unit conforms to the HEW protocol based at least on detecting HEW-SIGA1 1602-1 and the duplicate HEW-SIGA1 1602-2. In an embodiment, the second client station will conclude that the PHY data unit conforms to the HEW protocol also based on i) detecting that L-SIG 806 and HEW-SIGA1 1602-1 are modulated using BPSK, whereas the duplicate HEW-SIGA1 1602-2 is modulated using Q-BPSK, and ii) detecting that length subfield in L-SIG 806 is set to a value that is not a multiple of three. In an embodiment, the second client station will conclude that the PHY data unit conforms to the HEW protocol solely based on i) detecting that L-SIG 806 and HEW-SIGA 11602-1 are modulated using BPSK, whereas the duplicate HEW-SIGA1 1602-2 is modulated using Q-BPSK, and ii) detecting that length subfield in L-SIG 806 is set to a value that is not a multiple of three.

Figure 16:
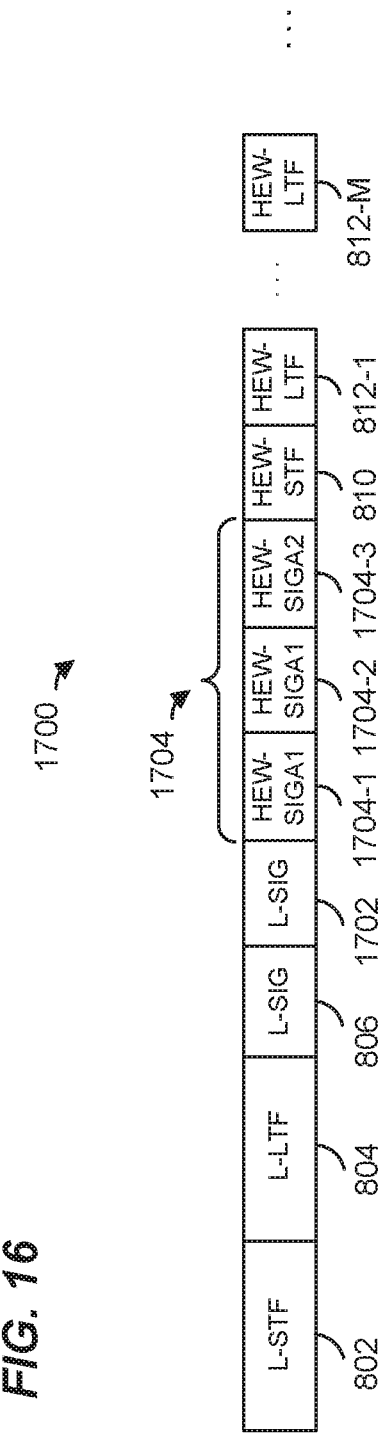
FIG. 16 is a diagram of another example PHY preamble format, according to another embodiment.

FIG. 16 is a diagram of an example PHY preamble 1700 that conforms to the first communication protocol, according to another embodiment. In an embodiment, the network interface device 16 of the AP 14 is configured to generate and transmit a data unit including the PHY preamble 1700 to the client station 25-1 via OFDM modulation, according to an embodiment. In an embodiment, the network interface device 27 of the client station 25-1 is configured to determine that a data unit including the preamble 1700 conforms to the first communication protocol using techniques discussed below.

In an embodiment, the network interface device 27 of the client station 25-1 is also configured to generate and transmit a data unit including the PHY preamble 1700 to the AP 14. In an embodiment, the network interface device 16 of the AP 14 is configured to determine that a data unit including the preamble 1700 conforms to the first communication protocol using techniques discussed below.

A data unit including the PHY preamble 1700 conforms to the first communication protocol and occupies a 20 MHz bandwidth, according to an embodiment. Data units that conform to the first communication protocol and including a preamble similar to the preamble 1700 may occupy other suitable bandwidth such as 40 MHz, 80 MHz, 160 MHz, 320 MHz, 640 MHz, for example, or other suitable bandwidths, in various other embodiments. The preamble 1700 is suitable for "mixed mode" situations, i.e., when the WLAN 10 includes a client station (e.g., the legacy client station 25-4) that conforms to a legacy communication protocol, but not the first communication protocol. The preamble 1700 is utilized in other situations as well, in some embodiments.

Unlike the preamble 1500, HEW-SIGA field 1702 includes a HEW-SIGA 11702-1, a HEW-SIGA1 1702-2, and a HEW-SIGA2 1702-3. HEW-SIGA1 1702-2 is a duplicate of HEW-SIGA1 1702-1, in an embodiment. Unlike the preamble 1600, preamble 1700 includes the secondary L-SIG field 1702. In an embodiment, the L-SIG 1702 is a duplicate of the L-SIG 806.

The L-STF 802, L-LTF 804 and the L-SIG 806 are part of a first portion of the PHY preamble 1700 that matches a corresponding first portion of a legacy preamble (e.g. a preamble that conforms to the IEEE 802.11a Standard, the IEEE 802.11g Standard, the IEEE 802.11n Standard, and/or the IEEE 802.11ac Standard), according to an embodiment. A legacy device is able to decode the L-SIG 806 and determine a length of a PHY data unit that includes the PHY preamble 1700. For example, the L-SIG 806 includes a length field set to a value that indicates a length of the PHY data unit that includes the PHY preamble 1700, in an embodiment.

In an embodiment, a communication device configured to operate according to the HEW protocol is configured to detect repetition of the L-SIG field 806, 1702 in the preamble 1700, and based on the detected repetition of the L-SIG field 806, 1702, determine that the preamble 1700 conforms to the HEW communication protocol. In an embodiment, upon detecting the repetition of the L-SIG fields 806, 1702 the receiving device uses duplication in the repeating L-SIG fields as additional training information to improve channel estimation, in an embodiment. In some embodiments, the receiving device first decodes the L-SIG 806, and then detects the repetition of the L-SIG fields 806, 1702 using the value of the length subfield in L-SIG 806. In another embodiment, the receiving device first detects the repetition of the L-SIG fields 806, 1702, and then combines the detected multiple L-SIG fields 806, 1702 to improve decoding reliability of the L-SIG fields 806, 1702 and/or uses the redundant information in the multiple L-SIG fields 806, 1702 to improve channel estimation.

In an embodiment, a communication device configured to operate according to the HEW protocol is configured to detect repetition of the HEW-SIGA1 fields 1704-1, 1704-2 in the preamble 1700, and based on the detected repetition of the HEW-SIGA1 fields 1704-1, 1704-2, determine that the preamble 1700 conforms to the HEW communication protocol. In an embodiment, the receiving device conforming to the HEW protocol uses duplication in the repeating HEW-SIGA1 fields 1704-1, 1704-2 as additional training information to improve channel estimation, in an embodiment. In another embodiment, the receiving device conforming to the HEW protocol combines the detected multiple 1704-1, 1704-2 to improve decoding reliability of the HEW-SIGA1 fields 1704-1, 1704-2 and/or uses the redundant information in the multiple HEW-SIGA1 fields 1704-1, 1704-2 to improve channel estimation.

Various methods for generating a preamble of a data unit according to a data unit format and further determining that a received data unit is according to a data unit format are described in U.S. patent application Ser. No. 15/017,385, filed Feb. 5, 2016, which is hereby incorporated by reference in its entirety. In various embodiments, one or more techniques such as described above with respect to FIGS. 14-16 are combined with one or more techniques such as described above with respect to FIGS. 8A, 8B, 9A-F, 10A-C, 11, 12, 13A, and 13B such that a an AP 14 and/or a client station 25-1 conforming to the first communication protocol are able to determine, using the preamble, the data unit format of a received data unit. In various embodiments, one or more techniques such as described above with respect to FIGS. 15-17 are combined with one or more techniques such as described above with respect to FIGS. 8A, 8B, 9A-F, 10A-C, 11, 12, 13A, and 13B such that a an AP 14 and/or a client station 25-1 conforming to the first communication protocol are able to determine, using the preamble, that a received data unit conforms to the first communication protocol. Similarly, a client station 25-4 that operates according to a legacy protocol, and not the first communication protocol, is able to determine certain information regarding the data unit, such as a duration of the data unit, and/or that the data unit does not conform to the legacy protocol. Similarly, an AP 14 and/or the client station 25-1 configured to operate according to the first communication protocol also transmit data units such as described above.

Pilots, transmitted in the form of pilot sequences that are modulated over pilot subcarriers and typically used for phase and frequency tracking, and channel estimation purposes, are used for enabling distinction between different data unit formats, according to some embodiments. In embodiments described herein, data unit formats (e.g., PHY data unit formats) are distinguished based on pilot sequences in OFDM symbols of a data unit. In various embodiments, one or more pilot sequences are selected from a plurality of pilot sequences based on a format of the data unit to be transmitted, wherein different pilot sequences in the plurality of pilot sequences correspond to different data unit formats (e.g., PHY data unit formats). In some embodiments, the one or more selected pilot sequences span multiple OFDM symbols of the data unit. In other embodiments, the one or more selected pilot sequences span a single OFDM symbol of the data unit. In some embodiments, a format of a received data unit is determined on the basis of an identified pilot sequence in the received data unit.

Figure 17:
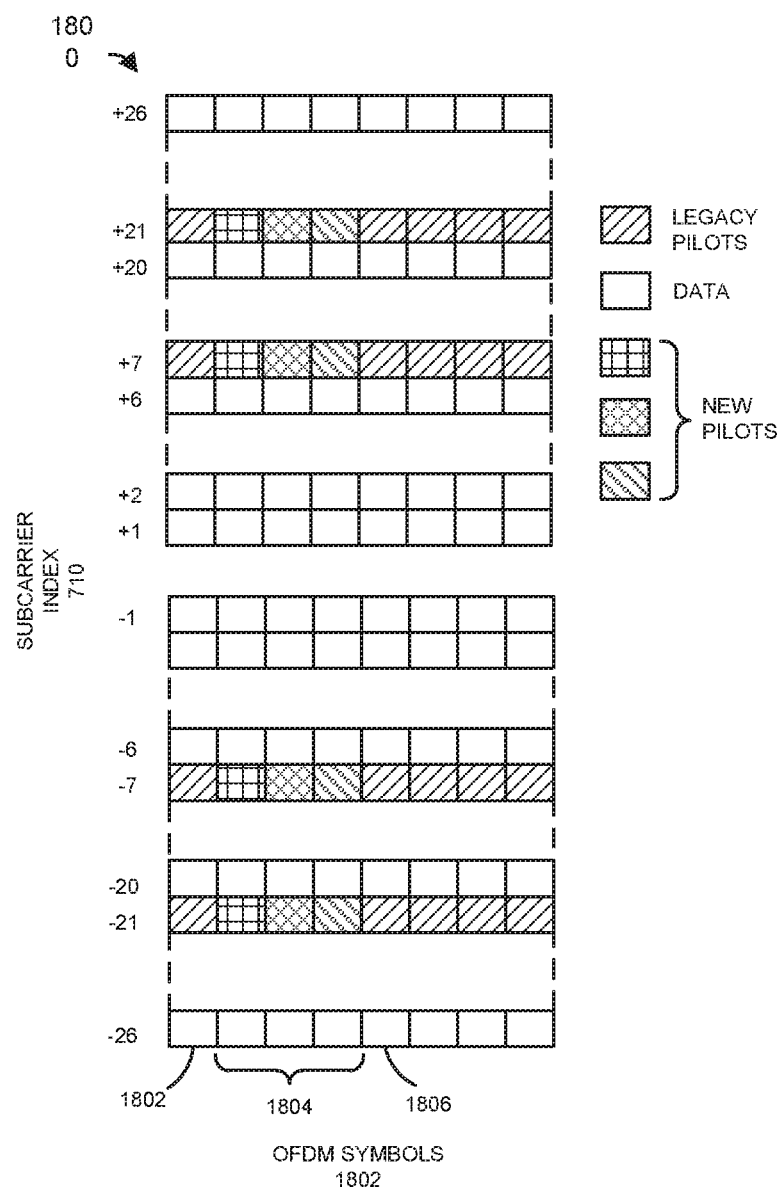
FIG. 17 is a diagram showing an example pattern of pilot signals in an example PHY preamble, according to an embodiment.

FIG. 17 is a diagram of an example data unit 1800 that the AP 14 is configured to generate and transmit to the client station 25-1 via OFDM modulation, according to some embodiments. In some embodiments, the client station 25-1 is also configured to generate and transmit the data unit 1800 to the AP 14. In an embodiment, the data unit 1800 conforms to the first communication protocol and occupies a 20 MHz bandwidth. The OFDM data unit 1800 includes 52 total subcarriers, comprising 48 data subcarriers and 4 pilot subcarriers, and the pilot subcarriers are located on subcarrier indices ±7, ±21. In an embodiment, the subcarriers are spaced 312.5 kHz apart. The pilot subcarriers modulate pilot sequences.

The AP 14 or the client station 25-1 selects a pilot sequence based on the format of the data unit 1800 that is to be transmitted, where different pilot sequences correspond to different data unit formats, according to some embodiments. The selected pilot sequence is included in the data unit 1800 on pilot subcarriers. The AP 14 or the client station 25-1 selects the pilot sequence from a plurality of pilot sequences that correspond to a plurality of different data unit formats. In some embodiments, the selected pilot sequence is used for generating pilots on pilot subcarriers across multiple OFDM symbols 1804 of the data unit 1800.

In the illustrative embodiment of FIG. 17, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 17 as compared to the pilot tone sequence illustrated in FIG. 7, and based on the recognition, determined that the data unit 1800 conforms to the first communication protocol, for example, rather than another communication protocol to which the data unit 700 of FIG. 7 conforms.

While the embodiment of FIG. 17 illustrates different pilots (as compared to the pilots illustrated in FIG. 7) on three OFDM symbols 1804, in other embodiments, different pilots are on a different suitable number of OFDM symbols (e.g., one, two, four, five, etc.).

In FIG. 17, some pilots (sometimes referred to herein as "legacy pilots") are the same as pilots illustrated in FIG. 7.

In some embodiments, the OFDM symbols 1804 comprising the new pilots are included in the data unit 1800 after an OFDM symbol 1802 that includes legacy pilots. In some embodiments, an OFDM symbol 1806 that follows the OFDM symbols 1804 comprises legacy pilots. In some embodiments, the OFDM symbol 1802 corresponds to L-SIG 806 (FIG. 8). In some embodiments, the OFDM symbols 1804 correspond to HEW-SIGA field 808 and HEW-STF 810 (FIG. 8). In some embodiments, the OFDM symbol 1806 corresponds to HEW-LTF 812-1 (FIG. 8). In some embodiments, OFDM symbols 1804 corresponds to HEW-SIGA field 1302 (FIG. 13A). In some embodiments, OFDM symbols 1804 corresponds to L-SIG 1502 and the HEW-SIGA field 808 (FIG. 14). In some embodiments, OFDM symbols 1804 corresponds to HEW-SIGA field 1602 (FIG. 15). In some embodiments, OFDM symbols 1804 corresponds to HEW-SIGA field 1704 (FIG. 16).

Referring now to FIGS. 1 and 17, in some embodiments, the AP 14 is configured to receive the data unit 1800 from the client station 25-1. The AP 14 (e.g., the PHY processor 20) determines a pilot sequence that is modulated by pilot subcarriers of the received data unit 1800. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 17 as compared to another one or more sequences, such as the sequence illustrated in FIG. 7. In some embodiments, the plurality of data unit formats include different data unit formats corresponding to different communication protocols and/or different data unit formats of a single communication protocol. Following identification of the data unit format, the AP 14 (e.g., the PHY processor 20 and/or the MAC processor 18) the processes the received data unit 1800 according to the identified data unit format.

Similarly, in an embodiment, the client station 25-1 is configured to receive the data unit 800 from the AP 14 or from another client station 25. The client station 25-1 (e.g., the PHY processor 29) determines a pilot sequence that is modulated by pilot subcarriers of the received data unit 1800. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 17 as compared to another one or more sequences, such as the sequence illustrated in FIG. 7. In some embodiments, the plurality of data unit formats include different data unit formats corresponding to different communication protocols and/or different data unit formats of a single communication protocol (e.g., multiple data unit formats of the first communication protocol). Following identification of the data unit format, the client station 25-1 (e.g., the PHY processor 29 and/or the MAC processor 28) the processes the received data unit 1800 according to the identified data unit format.

Figure 18:
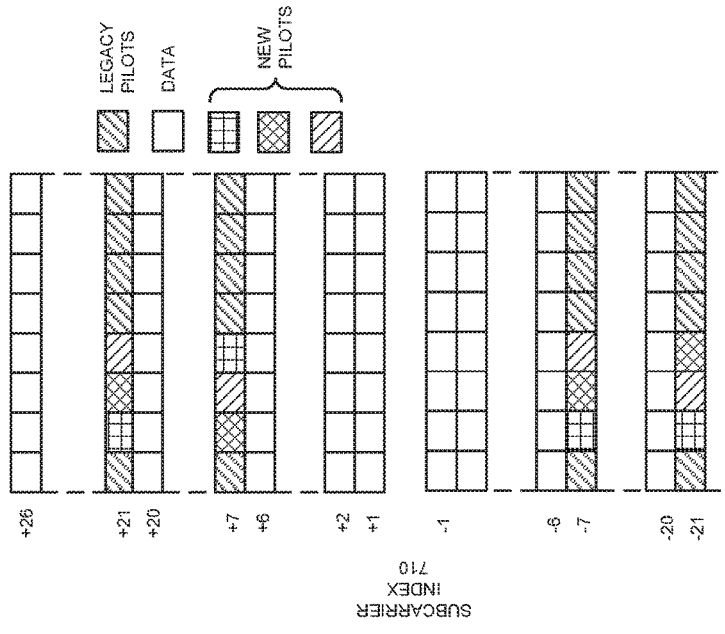
FIG. 18 is a diagram showing another example pattern of pilot signals in an example PHY preamble, according to another embodiment.

FIG. 18 is a diagram of an example data unit 1900 that the AP 14 or the client station 25-1 is configured to generate and transmit according to some embodiments. The data unit 1900 is similar to the OFDM data unit 1800 in some embodiments. The AP 14 or the client station 25-1 selects a pilot sequence based on the data unit format of the data unit 1900 that is to be transmitted. The AP 14 or the client station 25-1 selects the pilot sequence from a plurality of pilot sequences that correspond to a plurality of data unit formats, in some embodiments. The selected pilot sequence is used for generating pilots that are transmitted on pilot subcarriers of one OFDM symbol 1904 of the OFDM data unit 1900.

In the illustrative embodiment of FIG. 18, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 18 as compared to the pilot tone sequence illustrated in FIG. 7, and based on the recognition, determined that the data unit 1900 conforms to the first communication protocol, for example, rather than another communication protocol to which the data unit 700 of FIG. 7 conforms.

In the illustrative embodiment of FIG. 18, some pilots are different as compared to the pilot tone sequence illustrated in FIG. 17. Thus, in an embodiment, a receiver is configured to recognize the pilot tone sequence illustrated in FIG. 18 as compared to the pilot tone sequence illustrated in FIG. 17, and based on the recognition, determined that the data unit 1900 is of a different format, for example, as compared to a data unit format of the data unit 1800 of FIG. 17.

In some embodiments, the OFDM symbol 1904 is included in the data unit 1900 after an OFDM symbol 1902 that includes legacy pilots. In some embodiments, an OFDM symbol 1906 that follows the OFDM symbols 1904 comprises legacy pilots. In some embodiments, the OFDM symbol 1902 corresponds to L-SIG 806 (FIG. 8). In some embodiments, the OFDM symbol 1904 corresponds to HEW-SIGA1 808-1 (FIG. 8). In some embodiments, the OFDM symbol 1906 corresponds to HEW-SIGA2 808-2 (FIG. 8). In some embodiments, OFDM symbols 1902, 1904, and 1906 corresponds to the L-SIG 806, the HEW-SIGA1 field 1302-1, and the HEW-SIGA2 field 1302-2, respectively (FIG. 13A). In some embodiments, OFDM symbols 1902, 1904, and 1906 corresponds to L-SIG 1502, the HEW-SIGA1 field 808-1, and the HEW-SIGA2 field 808-2, respectively (FIG. 14). In some embodiments, OFDM symbols 1902, 1904, and 1906 corresponds to L-SIG 806, the HEW-SIGA1 field 1602-1, and the HEW-SIGA2 field 1602-2, respectively (FIG. 15). In some embodiments, OFDM symbols 1902, 1904, and 1906 corresponds to L-SIG 1702, the HEW-SIGA1 field 1704-1, and the HEW-SIGA2 field 1704-2, respectively (FIG. 16).

Referring now to FIGS. 1 and 18, in some embodiments, the AP 14 is configured to receive the data unit 1900 from the client station 25-1. The AP 14 (e.g., the PHY processor 20) determines a pilot sequence that is modulated by pilot subcarriers of the received data unit 1900. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 18 as compared to another one or more sequences, such as the sequence illustrated in FIG. 7 and/or the sequence illustrated in FIG. 17. In some embodiments, the plurality of data unit formats include different data unit formats corresponding to different communication protocols and/or different data unit formats of a single communication protocol (e.g., multiple data unit formats of the first communication protocol). Following identification of the data unit format, the AP 14 (e.g., the PHY processor 20 and/or the MAC processor 18) the processes the received data unit 1900 according to the identified data unit format.

Similarly, in an embodiment, the client station 25-1 is configured to receive the data unit 900 from the AP 14 or from another client station 25. The client station 25-1 (e.g., the PHY processor 29) determines a pilot sequence that is modulated by pilot subcarriers of the received data unit 1900. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 18 as compared to another one or more sequences, such as the sequence illustrated in FIG. 7 and/or the sequence illustrated in FIG. 17. In some embodiments, the plurality of data unit formats include different data unit formats corresponding to different communication protocols and/or different data unit formats of a single communication protocol (e.g., different data unit formats of the first communication protocol). Following identification of the data unit format, the client station 25-1 (e.g., the PHY processor 29 and/or the MAC processor 28) the processes the received data unit 900 according to the identified data unit format.

Figure 19:
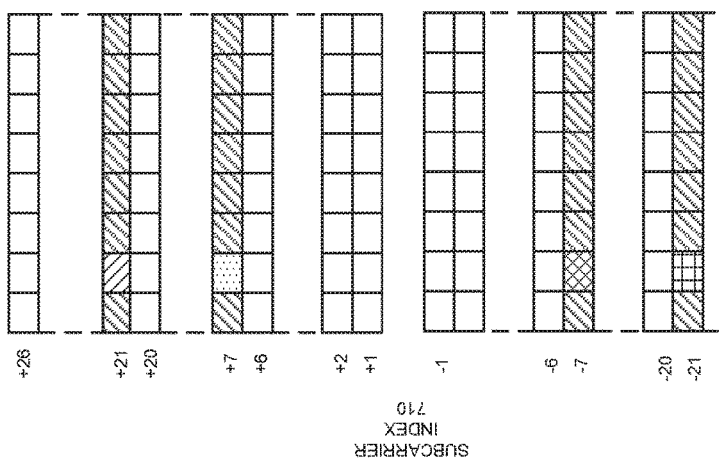
FIG. 19 is a diagram showing another example pattern of pilot signals in an example PHY preamble, according to another embodiment.

FIG. 19 is a diagram of OFDM data unit 1000 that the AP 14 or the client station 25-1 is configured to generate and transmit according to some embodiments. The OFDM data unit 2000 is similar to the OFDM data unit 800 in some embodiments. The AP 14 or the client station 25-1 selects a pilot sequence based on the format of the OFDM data unit 2000 to be transmitted. The AP 14 or the client station 25-1 selects a pilot sequence from a plurality of pilot sequences that correspond to a plurality of data unit formats. In some embodiments, the selected pilot sequence is used for generating pilots on pilot subcarriers across multiple OFDM symbols 2004 of the data unit 2000.

In the illustrative embodiment of FIG. 19, some pilots (sometimes referred to herein as "new pilots") are different as compared to the pilot tone sequence illustrated in FIG. 7. Thus, in an embodiment, a receiver is configured to recognize the pilot tone sequence illustrated in FIG. 19 as compared to the pilot tone sequence illustrated in FIG. 7, and based on the recognition, determined that the data unit 2000 conforms to the first communication protocol, for example, rather than another communication protocol to which the data unit 700 of FIG. 7 conforms.

In the illustrative embodiment of FIG. 19, some pilots are different as compared to the pilot tone sequences illustrated in FIGS. 17 and 18. Thus, in an embodiment, a receiver is configured to recognize the pilot tone sequence illustrated in FIG. 19 as compared to the pilot tone sequences illustrated in FIGS. 17 and 18, and based on the recognition, determined that the data unit 2000 is of a different format, for example, as compared to a data unit formats of the data units 1800 and 1900 of FIGS. 17 and 18.

While the embodiment of FIG. 19 illustrates different pilots (as compared to the pilots illustrated in FIG. 7) on three OFDM symbols 2004, in other embodiments, different pilots are on a different suitable number of OFDM symbols (e.g., one, two, four, five, etc.).

In FIG. 19, some pilots (sometimes referred to herein as "legacy pilots") are the same as pilots illustrated in FIG. 7.

In some embodiments, the OFDM symbols 2004 comprising the new pilots are included in the data unit 2000 after an OFDM symbol 2002 that includes legacy pilots. In some embodiments, an OFDM symbol 2006 that follows the OFDM symbols 2004 comprises legacy pilots. In some embodiments, the OFDM symbol 2002 corresponds to L-SIG 806 (FIG. 8). In some embodiments, the OFDM symbols 2004 corresponds to HEW-SIGA fields 808 and HEW-STF 810 (FIG. 8). In some embodiments, the OFDM symbol 2006 corresponds to HEW-LTF 812-1 (FIG. 8). In some embodiments, OFDM symbols 2004 corresponds to HEW-SIGA field 1302 (FIG. 13A). In some embodiments, OFDM symbols 2004 corresponds to L-SIG 1502 and the HEW-SIGA field 808 (FIG. 14). In some embodiments, OFDM symbols 2004 corresponds to HEW-SIGA field 1602 (FIG. 15). In some embodiments, OFDM symbols 2004 corresponds to HEW-SIGA field 1704 (FIG. 16).

Referring now to FIGS. 1 and 19, in some embodiments, the AP 14 is configured to receive the data unit 2000 from the client station 25-1. The AP 14 (e.g., the PHY processor 20) determines a pilot sequence that is modulated by pilot subcarriers of the received data unit 2000. The AP 14 (e.g., the PHY processor 20) then identifies the pilot sequence from among a plurality of pilot sequences corresponding to a plurality of data unit formats. As merely an illustrative example, the AP 14 (e.g., the PHY processor 20) determines that that the pilot sequence corresponds to the sequence illustrated in FIG. 19 as compared to another one or more sequences, such as one or more of the sequences illustrated in FIGS. 7, 17 and 18. In some embodiments, the plurality of data unit formats include different data unit formats corresponding to different communication protocols and/or different data unit formats of a single communication protocol (e.g., multiple data unit formats of the first communication protocol). Following identification of the data unit format, the AP 14 (e.g., the PHY processor 20 and/or the MAC processor 18) the processes the received data unit 2000 according to the identified data unit format.

Similarly, in an embodiment, the client station 25-1 is configured to receive the data unit 2000 from the AP 14 or from another client station 25. The client station 25-1 (e.g., the PHY processor 29) determines a pilot sequence that is modulated by pilot subcarriers of the received data unit 2000. The client station 25-1 (e.g., the PHY processor 29) then identifies the pilot sequence from among a plurality of pilot sequences corresponding to a plurality of data unit formats. As merely an illustrative example, the AP client station 25-1 (e.g., the PHY processor 29) determines that that the pilot sequence corresponds to the sequence illustrated in FIG. 19 as compared to another one or more sequences, such as one or more of the sequences illustrated in FIGS. 7, 17, and 18. In some embodiments, the plurality of data unit formats include different data unit formats corresponding to different communication protocols and/or different data unit formats of a single communication protocol (e.g., different data unit formats of the first communication protocol). Following identification of the data unit format, the client station 25-1 (e.g., the PHY processor 29 and/or the MAC processor 28) the processes the received data unit 2000 according to the identified data unit format.

In some embodiments, an n-th symbol of an OFDM data unit starting from L-SIG is expressed as:

$$r_n(t) = \frac{1}{\sqrt{N_{field}^{tone}}} \sum_{k=-N_{SD}}^{N_{SD}} (x_{n,k} + p_n c_{n,k} P_k) \exp(j2\pi k \Delta_F (t - T_{GI}))$$

Equation 2 where $c_{n,k}$ is an n-th value of a sequence at the k-th subcarrier tone. Parameter $p_n c_{n,k} P_k$ sets a pilot value of the pilot sequence at the n-th symbol and the k-th subcarrier tone, and the sequence $c_{n,k}$ is selected from a plurality of sequences on a data unit format of the data unit to be transmitted.

In one such embodiment according to Equation 2, the sequence varies for different OFDM symbols, but is identical for all pilot subcarrier tones in each OFDM symbol. In the embodiment where a total of 52 subcarriers are present, pilot subcarrier tones at subcarrier indices ±7, ±21 modulate a pilot sequence which is set by the selected sequence $c_{n,k}$. In some embodiments, some values of the sequence $c_{n,k}$ correspond to a value of a pilot flipped in polarity as compared to other sequences $c_{n,k}$ and/or as compared to legacy pilots. In one illustrative embodiment, an n-th value of the sequence at a k-th subcarrier tone is defined by an equation:

$$c_{n,k} = \begin{cases} 1 & n \in \{1\} \cup \Omega_1 \\ -1 & n \in \Omega_2 \end{cases}, \text{ for } k = \pm 7, \pm 21$$

Equation 3 where the OFDM symbol corresponding to n=1 corresponds to L-SIG 806 (FIG. 8), $\Omega_1$ is a first set of OFDM symbols in the data unit, and $\Omega_2$ is a second set of OFDM symbols in the data unit. In another embodiment, $c_{n,k}$ includes one or more elements that is/are complex valued. In another embodiment, $c_{n,k}$ is different for each symbol in $\Omega_2$.

In an embodiment according to Equation 2, multiple elements of $c_{n,k}$ for multiple pilots in a single OFDM symbol have different values. In another embodiment according to Equation 2, elements of the sequence $c_{n,k}$ corresponding pilots in an OFDM symbol are all different. In an embodiment where a total of 52 subcarriers are present, pilot subcarrier tones at subcarrier indices ±7, ±21 modulate pilot sequences which are set by a selected sequence. In one such embodiment, an n-th value of the sequence at a k-th subcarrier tone is defined by an equation:

$$c_{n,k} = \begin{cases} [1\ 1\ 1\ 1] & n \in \{1\} \cup \Omega_1 \\ [s_{n,1}\ s_{n,2}\ s_{n,3}\ s_{n,4}] & n \in \Omega_2 \end{cases} \quad \text{Equation 4}$$

where parameters $s_{n,k}$ correspond to suitable values for distinguishing between different pilot tone sequences. In an embodiment, each symbol in $\Omega_2$ uses a same set of parameters $s_{n,k}$. In another embodiment, multiple symbols in $\Omega_2$ use different sets of parameters $s_{n,k}$. In another embodiment, each symbol in $\Omega_2$ uses a unique and different set of parameters $s_{n,k}$. In an embodiment, parameters among the set of parameters $s_{n,k}$ are integers. In an embodiment, parameters among the set of parameters $s_{n,k}$ are real-valued numbers. In an embodiment, parameters among the set of parameters $s_{n,k}$ are complex valued numbers.

In some embodiments, a pilot sequence for a data unit is selected from among a plurality of pilot sequences, wherein the plurality of pilot sequences are in a look-up table stored in a memory of the AP 14 or the client station 25-1. In another embodiment, a pilot sequence is generated using a sequence which is selected from a plurality of sequences in a look-up table stored in a memory of the AP 14 or the client station 25-1. In an embodiment, a pilot sequence is generated using $p_n c_{n,k} P_k$ as discussed above. In another embodiment, a pilot sequence is generated using selected parameters according to another suitable method. In an embodiment, a sequence corresponds to a parameter having a different format as compared to Equation 3 and Equation 4.

Following the selection of a pilot sequence, the AP 14 or the client station 25-1, generates a data unit to include the selected pilot sequence. The generated data unit is then transmitted.

Referring again to FIG. 17, in some embodiments, where an n-th OFDM symbol of a data unit corresponds to Equation 2, a pilot sequence in the received data unit 1800 is defined by the parameter $p_n c_{n,k} P_k$, and identifying the pilot sequence includes identifying whether the pilot sequence in the received data unit 1800 is in accordance with the parameter $p_n c_{n,k} P_k$. Similarly, referring again to FIGS. 18 and 19, in other embodiments, a pilot sequence in the data unit 1900 or the data unit 2000 is defined by the parameter $p_n c_{n,k} P_k$, and identifying the pilot sequence includes identifying whether the pilot sequence in the received data unit 1900/2000 is in accordance with the parameter $p_n c_{n,k} P_k$. In some embodiments, identifying a pilot sequence defined by a parameter $p_n c_{n,k} P_k$ includes identifying the sequence $c_{n,k}$. Parameter $p_n c_{n,k} P_k$ can be used to determine a set of values (e.g., for multiple pilot tones at different values of k) of the sequence $c_{n,k}$ for a given n.

In some embodiments, a sequence $c_{n,k}$ in the data unit 1800, the data unit 1900, or the data unit 2000 is defined by a specification such as Equation 3 or Equation 4 (or according to another equation or specification), and identifying the sequence $c_{n,k}$ includes identifying whether the sequence is corresponds to the specification. In other embodiments, a pilot sequence is identified from a sequence $c_{n,k}$ using suitable mathematical operations different from that defined in Equations 2-4.

In some embodiments, a pilot sequence for a received data unit (e.g., the data unit 1800, the data unit 1900, the data unit 2000, or another suitable data unit) is identified from among a plurality of pilot sequences, wherein indications of the plurality of pilot sequences are stored in a memory of a communication device that received the data unit (e.g., the AP 14, the client device 25-1, etc.). In some embodiments, a sequence $c_{n,k}$ is determined from a pilot sequence in the received data unit (e.g., the data unit 1800, the data unit 1900, the data unit 2000, or another suitable data unit), and the sequence $c_{n,k}$ is identified from a plurality of sequences $c_{n,k}$ stored in the memory of the communication device that receives the data unit.

Following identification of the pilot sequence in the received data unit, the communication device that received the data unit (e.g., AP 14, the client station 25-1, or another suitable communication device) determines, based on the identified pilot sequence, a format of the received data unit. Finally, the communication device that received the data unit processes the received data unit according to the determined format of the data unit.

Various methods for generating a preamble of a data unit to include a pilot sequence and further determining that a received data unit is formatted according to a data unit format based on detecting a pilot sequence are described in U.S. patent application Ser. No. 15/143,075, entitled "WiFi Classification by Pilot Sequences," filed on Apr. 29, 2016, which is incorporated by reference herein in its entirety.

In various embodiments, one or more techniques such as described above with respect to FIGS. 17-19 are combined with one or more techniques such as described above with respect to FIGS. 8A, 8B, 9A-F, 10A-C, 11, 12, 13A, 13B, and 14-16 such that the AP 14 and/or the client station 25-1 conforming to the first communication protocol are able to determine, using the preamble, the data unit format of a received data unit. In various embodiments, one or more techniques such as described above with respect to FIGS. 17-19 are combined with one or more techniques such as described above with respect to FIGS. 8A, 8B, 9A-F, 10A-C, 11, 12, 13A, 13B, and 14-16 such that the AP 14 and/or the client station 25-1 conforming to the first communication protocol are able to determine, using the preamble, that a received data unit conforms to the first communication protocol. Similarly, a client station 25-4 that operates according to a legacy protocol, and not the first communication protocol, is able to determine certain information regarding the data unit, such as a duration of the data unit, and/or that the data unit does not conform to the legacy protocol. Similarly, an AP 14 and/or the client station 25-1 configured to operate according to the first communication protocol also transmit data units such as described above.

In some embodiments, the first communication protocol defines a plurality of data unit formats. In some embodiments, the plurality of data unit formats include data unit formats corresponding to single user (SU) data units, uplink multi-user (UL-MU) data units, and downlink multi-user (DL-MU) data units. In some embodiments, one or more techniques such as described above with respect to FIGS. 8A, 8B, 9A-F, 10A-C, 11, 12, 13A, 13B, and 14-19 are utilized at an AP and/or a client station to generate and transmit a preamble of a data unit according to the first communication protocol, wherein the preamble of the data unit is generated based on the data unit format. An AP and/or a client station that operates according to the first communication protocol is able to determine, using a preamble of a received data unit, a data unit format of the received data unit and also determine that the data unit conforms to the first communication protocol.

FIG. 20A is a diagram of a portion of an example PHY preamble 2100 that the network interface device 16 of the AP 14 is configured to generate and transmit to the client station 25-1 via OFDM modulation, according to an embodiment. In an embodiment, the network interface device 16 of the AP 14 is configured to generate and transmit a data unit including the PHY preamble 2100 to the client station 25-1 via OFDM modulation, according to an embodiment. In an embodiment, the network interface device 27 of the client station is configured to determine that a data unit including the PHY preamble 2100 conforms to the first communication protocol and/or that the data unit conforms to a particular format defined by the first communication protocol using techniques discussed below.

A data unit including the PHY preamble 2100 conforms to the first communication protocol and occupies a 20 MHz bandwidth, according to an embodiment. Data units that conform to the first communication protocol and including a preamble similar to the preamble 2100 may occupy other suitable bandwidth such as 40 MHz, 80 MHz, 160 MHz, 320 MHz, 640 MHz, for example, or other suitable bandwidths, in various other embodiments. The preamble 2100 is suitable for "mixed mode" situations, i.e., when the WLAN 10 includes a client station (e.g., the legacy client station 25-4) that conforms to a legacy communication protocol, but not the first communication protocol. The preamble 2100 is utilized in other situations as well, in some embodiments.

In an embodiment, the PHY preamble 2100 is for data units according to a first communication protocol that defines a common data unit format for SU data units, UL-MU data units, and DL-MU data units. In another embodiment, the PHY preamble 2100 is for data units of a first format specified by the first communication protocol, where the first communication protocol defines different data unit formats. For example, in an embodiment, the first communication protocol defines different data unit formats for SU data units, UL-MU data units, and DL-MU data units. In some embodiments, the PHY preamble 2100 is for data units according to a first communication protocol that defines a common data unit format for SU data units and UL-MU data units, but a different data unit format for DL-MU data units. In an embodiment, the PHY preamble 2100 is for corresponds to a format other than SU data units, UL-MU data units, and DL-MU data units. For example, in some embodiments, the first communication protocol defines different data unit formats for other types of data units, such as i) a first format for regular mode data units and a second format for long range mode data units, ii) a first format for a data mode and a second format for a control mode, etc.

The PHY preamble 2100 has an L-STF 802, an L-LTF 804, an L-SIG 806, two HEW-SIGAs 2102 including a HEW-SIGA1 2102-1 and a HEW-SIGA2 2102-2, a HEW-SIGB1 2104, a HEW-STF 2106, and M HEW-LTFs, where M is an integer. HEW-SIGA fields 2102 are different from the HEW-SIGA fields 1302 of the data unit 1300, in some embodiments. For example, one or more information bits of the HEW-SIGA fields 1302 are moved from the HEW-SIGA fields 1302 to the HEW-SIGB1 field 2104, in an embodiment. The HEW-SIGA1 field 2102-1, the HEW-SIGA2 field 2102-2, and the HEW-SIGB1 field 2104-1 each comprise one OFDM symbol of the data unit 1300, in an embodiment.

FIG. 20B is a set of diagrams illustrating modulation of the L-SIG 806, HEW-SIGA1 2102-1, and HEW-SIGA2 2102-2, and HEW-SIGB 1 2104 of the data unit including the PHY preamble 2100 of FIG. 20A, according to an embodiment. In this embodiment, the L-SIG 806, the HEW-SIGA1 2102-1, and the HEW-SIGA2 2102-2 fields are modulated according to BPSK modulation, signaling to legacy client stations configured to operate to the IEEE 802.11a Standard and/or the IEEE 802.11n Standard and/or the IEEE 802.11ac Standard that the data unit including the preamble 2100 conforms to the IEEE 802.11a Standard. Accordingly, legacy client stations configured to operate to the IEEE 802.11 a Standard, the IEEE 802.11n Standard and/or the IEEE 802.11ac will process the data unit 2100 in the same manner that such devices would treat an IEEE 802.11a packet, in at least some embodiments and/or scenarios. In some embodiments, a legacy communication device will process the packet similar to that described with respect to FIGS. 13A and 13B. For example, a legacy client station will compute, based on the L-SIG field 806, a packet duration for the data unit including the preamble 2100, and will wait until the end of the computed packet duration before performing clear channel assessment (CCA), in an embodiment.

Further, a client station configured to operate according to the first communication protocol detects the modulation of the HEW-SIGB1 field 2104 (e.g., Q-BPSK) and, based on the detected modulation, determines that the data unit conforms to a data unit format corresponding to the first communication protocol, in some embodiments.

In some embodiments, a CRC to be included in a CRC subfield of the HEW-SIGA fields 2102 is generated differently than CRC specified for the VHT-SIGA field by the IEEE 802.11ac Standard. In some embodiments, a CRC is generated according to a method such as described above with respect to FIGS. 10A-C. In other embodiments, the CRC is generated according to another suitable method. The generated CRC for the HEW-SIGA field 2102 will cause a CRC error when the data unit including the preamble 2100 is decoded by a client station that conforms to the IEEE 802.11ac Standard, but not the first communication protocol, in an embodiment. The generated CRC included in the CRC subfield of HEW-SIGA field 2102 will permit a client station that conforms to the first communication protocol to determine that the data unit conforms to a data unit format corresponding to the first communication protocol, in some embodiments.

In some embodiments, in addition to or instead of using CRC to determine a data unit format of the data unit including the preamble 2100, one or more subfields of the HEW-SIGA field 2102 are set to indicate a mode that is not supported by legacy client stations. Further, such unallowable combinations included in the HEW-SIGA field 2102 indicate to a client station that conforms to the first communication protocol that the data unit conforms to a data unit format corresponding to the first communication protocol, in some embodiments. In some embodiments, one or more additional indications is/are included in the HEW-SIGA field 2102 to indicate to a client station that conforms to the first communication protocol that the data unit conforms to a data unit format corresponding to the first communication protocol, in some embodiments.

In some embodiments, a data unit including a PHY preamble 2100 includes a pilot sequence in the PHY preamble. In some embodiments, in addition to or instead of one or more of i) using CRC to determine a data unit format, ii) setting one or more subfields of the HEW-SIGA field 2102 to indicate a mode that is not supported by legacy client stations, and/or iii) including one or more additional indications in the HEW-SIGA field 2102 to indicate that the data unit conforms to a data unit format corresponding to the first communication protocol, the communication device selects a pilot sequence based on the format of the data unit that is to be transmitted, where different pilot sequences correspond to different data unit formats, according to some embodiments. The selected pilot sequence is included in the PHY preamble 2100 of the data unit on pilot subcarriers. In some embodiments, the selected pilot sequence is included in at least the HEW-SIGA fields of the PHY preamble 2100. A client station configured to operate according to the first communication protocol will detect the pilot sequence in a PHY preamble 2100 of a received data unit to determine that the data unit conforms to a data unit format corresponding to the first communication protocol, in some embodiments.

In some embodiments, the HEW-SIGB 1 field 2104 is modulated the same as the HEW-SIGA fields 2102 (e.g., BPSK). In some embodiments, instead of modulating the HEW-SIGB 1 field 2104 using Q-BPSK, a communication device performs two or more of i) generating a CRC to be included in a CRC subfield of the HEW-SIGA fields 2102 differently than a CRC specified for signal field of a legacy protocol, ii) setting one or more subfields of the HEW-SIGA field 2102 to indicate a mode that is not supported by legacy client stations, iii) including one or more additional indications in the HEW-SIGA field 2102 to indicate that the data unit conforms to a data unit format corresponding to the first communication protocol, and/or iv) the communication device selects a pilot sequence based on the format of the data unit that is to be transmitted, where different pilot sequences correspond to different data unit formats, according to some embodiments. In an embodiment, a receiver device, configured according to the first communication protocol, detects two or more of i) a CRC in a subfield of the HEW-SIGA fields 2102 that is generated differently than a CRC specified for signal field of a legacy protocol, ii) one or more subfields of the HEW-SIGA field 2102 set to indicate a mode that is not supported by one or more legacy protocol, iii) including one or more additional indications in the HEW-SIGA field 2102 to indicate that the data unit conforms to a data unit format corresponding to the first communication protocol, and/or iv) a pilot sequence in the preamble 2100, and determines that a data unit having the preamble 2100 has a format corresponding to the first communication protocol based on two or more of i) the detected CRC technique, ii) the mode not supported by a legacy protocol, iii) the one or more additional indications that indicate the first communication protocol, and/or iv) the detected pilot sequence.

In some embodiments, a communication device (e.g., the AP 14 or the client device 25-1) generates the preamble 2100 using two or more of the above-discussed techniques, e.g., two or more of i) the modulation illustrated in FIG. 20A (or another suitable modulation), ii) a CRC such as described with reference to FIGS. 10A-C (or another suitable CRC technique), iii) a signal field indicating a mode not supported by a legacy protocol (and/or including other suitable field values that indicate the data unit conforms to a format corresponding to the first communication protocol, or iv) a pilot sequence indicating that the data unit conforms to a format corresponding to the first communication protocol. For example, the preamble 2100 includes i) the modulation illustrated in FIG. 20A (or another suitable modulation), and ii) a CRC such as described with reference to FIGS. 10A-C (or another suitable CRC technique), in an embodiment. In an embodiment, a receiver device, configured according to the first communication protocol, detects i) the modulation illustrated in FIG. 20A (or another suitable modulation), and/or ii) a CRC such as described with reference to FIGS. 10A-C (or another suitable CRC technique), and determines that a data unit having the preamble 2100 has a format corresponding to the first communication protocol based on one or both of i) the detected modulation and/or ii) the detected CRC technique, in an embodiment.

In some embodiments, the preamble 2100 is utilized for multiple modes defined by the first communication protocol. For example, in an embodiment, the preamble 2100 is utilized for both uplink (UL) and downlink (DL) single user (SU) transmissions, UL multi-user (MU) transmissions, and DL MU transmissions. In other embodiments, the data unit format 2100 is utilized for only some modes defined by the first communication protocol. For example, in an embodiment, the preamble 2100 is utilized for DL MU transmissions, whereas another data unit format is utilized for SU transmissions and UL MU transmissions. For example, in an embodiment, the HESIGB field 2104 is omitted from one or more formats utilized for SU transmissions and UL MU transmissions. Thus, in some embodiments, one or more techniques such as described above are utilized to signal to which of multiple formats defined by the first communication protocol the data unit corresponds.

Figure 21A:
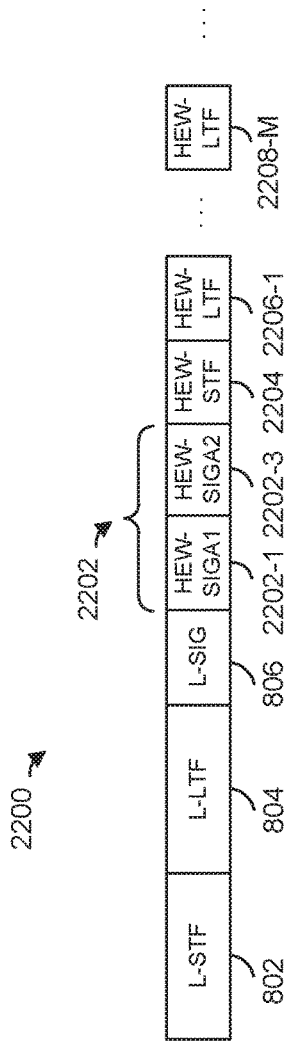
FIG. 21A is a diagram of another example PHY data unit format, according to another embodiment.

For example, in an embodiment, the first communication protocol specifies that data units for DL-MU transmissions are to utilize the preamble 2100 of FIG. 20A, whereas the first communication protocol specifies that data units for SU transmissions and UL-MU transmissions are to utilize a preamble corresponding to FIG. 21A. In particular, FIG. 21A is a diagram of a portion of an example PHY preamble 2200 that the network interface device 16 of the AP 14 and/or the network interface device 27 of the client station 25-1 are configured to generate and transmit via OFDM modulation, according to an embodiment. As discussed above, in some embodiments, the first communication protocol specifies that data units for SU transmissions and UL-MU transmissions are to utilize the preamble 2200, whereas the first communication protocol specifies that data units for DL-MU transmissions are to utilize another preamble having a HEW-SIGB field, such as the preamble 2100 of FIG. 20A.

A data unit including the PHY preamble 2200 conforms to the first communication protocol and occupies a 20 MHz bandwidth, according to an embodiment. Data units that conform to the first communication protocol and including a preamble similar to the preamble 2200 may occupy other suitable bandwidth such as 40 MHz, 80 MHz, 160 MHz, 320 MHz, 640 MHz, for example, or other suitable bandwidths, in various other embodiments. The preamble 2200 is suitable for "mixed mode" situations, i.e., when the WLAN 10 includes a client station (e.g., the legacy client station 25-4) that conforms to a legacy communication protocol, but not the first communication protocol. The preamble 2200 is utilized in other situations as well, in some embodiments.

The PHY preamble 2200 has an L-STF 802, an L-LTF 804, an L-SIG 806, two HEW-SIGAs fields 2202 including a HEW-SIGA1 2202-1 and a HEW-SIGA2 2202-2, a HEW-STF 2106, and M HEW-LTFs, where M is an integer. In an embodiment, the PHY preamble 2200 is for data units according to the first communication protocol that do not require a HEW-SIGB field, whereas the PHY preamble 2100 is for data units according to the first communication protocol that do require a HEW-SIGB field.

Figure 21B:
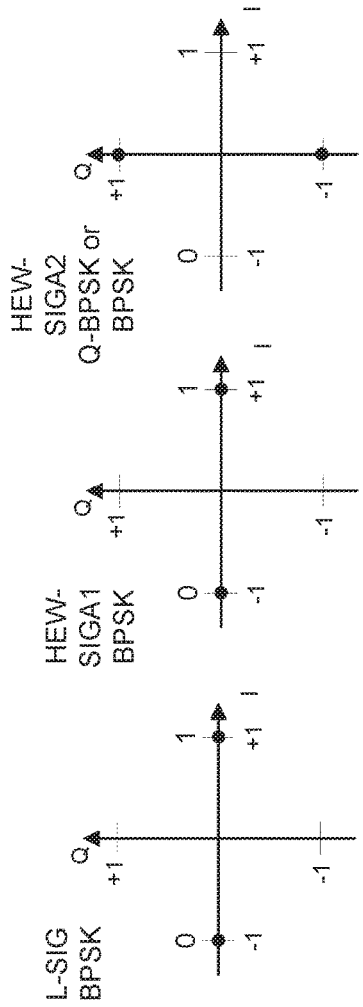
FIG. 21B includes diagrams of modulation of OFDM symbols in the PHY data unit of FIG. 21A, according to an embodiment.

FIG. 21B is a set of diagrams illustrating modulation of the L-SIG 806, HEW-SIGA1 2202-1, and HEW-SIGA2 2202-2 of the data unit including the PHY preamble 2200 of FIG. 21A, according to an embodiment. In an embodiment, because the preamble 2200 includes L-STF 802, L-LTF 804 and L-SIG 806, a legacy communication device operating according to the IEEE 802.11a Standard will assume that a data unit including the preamble 2200 conforms to the IEEE 802.11a Standard. Similarly, in an embodiment, because the preamble 2200 includes L-STF 802, L-LTF 804 and L-SIG 806, and because the L-SIG 806 and the HEW-SIGA1 2202-1, are modulated according to BPSK modulation, a legacy communication device configured to operate to the IEEE 802.11n Standard that the data unit including the preamble 2200 conforms to the IEEE 802.11a Standard. Accordingly, legacy client stations configured to operate to the IEEE 802.11a Standard and/or the IEEE 802.11n Standard will process a data unit having the preamble 2200 in the same manner that such devices would treat an IEEE 802.11a packet, in at least some embodiments and/or scenarios. In an embodiment, legacy client stations configured to operate to the IEEE 802.11a Standard and/or the IEEE 802.11n Standard will process a data unit having the preamble 2200 in a manner similar that discussed with respect to FIGS. 8A and 8B.

In an embodiment, the modulations of the L-SIG 806, HEW-SIGA1 808-1, and HEW-SIGA2 808-2 fields of the data unit 800 correspond to the modulations of the corresponding fields in a data unit that conforms to the IEEE 802.11ac Standard. Accordingly, legacy client stations configured to operate to the IEEE 802.11ac Standard will process a data unit having the preamble 2200 in the same manner that such devices would treat an IEEE 802.11ac packet, in at least some embodiments and/or scenarios. In an embodiment, legacy client stations configured to operate to the IEEE 802.11ac Standard will process a data unit having the preamble 2200 in a manner similar that discussed with respect to FIGS. 8A and 8B.

In some embodiments, a CRC to be included in a CRC subfield of the HEW-SIGA fields 2202, wherein the CRC subfield of HEW-SIGA fields 2202 is the same as or similar to the CRC subfield 910-8 discussed above, is generated differently than CRC specified for the VHT-SIGA field by the IEEE 802.11ac Standard. In some embodiments, a CRC is generated according to a method such as described above with respect to FIGS. 10A-C, or using another suitable method. The generated CRC for the HEW-SIGA 2202 field will cause a CRC error when the data unit including the preamble 2200 is decoded by a communication device that conforms to the IEEE 802.11ac Standard, but not the first communication protocol, in an embodiment. The generated CRC included in the CRC subfield of HEW-SIGA field will permit a communication device that conforms to the first communication protocol to determine a data unit format of a data unit including the preamble 2200, according to an embodiment.

In some embodiments, in addition to or instead of using CRC to determine a data unit format of the data unit including the preamble 2200, one or more subfields of the HEW-SIGA field 2102 are set to indicate a mode that is not supported by a legacy protocol (e.g., the IEEE 802.11ac Standard). Further, such unallowable combinations included in the HEW-SIGA field 2102 indicate to a client station that conforms to the first communication protocol that a format of a data unit including the preamble 2200 corresponds to the first communication protocol, in an embodiment. In some embodiments, one or more additional indications is/are included in the HEW-SIGA field 2202 to indicate to a client station that conforms to the first communication protocol the data unit format of a data unit including the preamble 2200, and also determine that the data unit conforms to the first communication protocol.

In some embodiments, a data unit including a PHY preamble 2200 includes a pilot sequence in the PHY preamble. A pilot sequence is selected based on the format of the data unit that is to be transmitted, where different pilot sequences correspond to different data unit formats, according to some embodiments. The selected pilot sequence is included in the PHY preamble 2200 of the data unit on pilot subcarriers. In some embodiments, the selected pilot sequence is included in HEW-SIGA fields of the PHY preamble 2200. In an embodiment, a communication device configured to operate according to the first communication protocol will detect a pilot sequence in the PHY preamble 2200 of a received data unit, and determine a data unit format of the data unit including the preamble 2200 based on the detected pilot sequence. In an embodiment, a communication device configured to operate according to the first communication protocol will detect a pilot sequence in the PHY preamble 2200 of a received data unit, and determine that the data unit conforms to the first communication protocol based on the detected pilot sequence.

In some embodiments, data unit including the PHY preamble 2200 includes a CRC subfield of HEW-SIGA fields 2202, and further also includes a selected pilot sequence based on the format of the data unit. In some embodiments, a CRC to be included in a CRC subfield of HEW-SIGA fields 2202 is generated according to methods described above with respect to FIG. 10A-C. In other embodiments, any suitable CRC generation scheme different than those described above with respect to FIGS. 10A-C is used for generating the CRC to be included in a CRC subfield of HEW-SIGA fields 2202. In an embodiment, a communication device configured to operate according to the first communication detects a CRC technique utilized to generate a CRC in the CRC subfield of HEW-SIGA field 2202, and further detects a pilot sequence in a received data unit, and determines a data unit format of the data unit including the preamble 2200 based on the detected CRC technique and the detected pilot sequence. In an embodiment, the communication device determines that the data unit conforms to the first communication protocol based on the detected CRC technique and the detected pilot sequence.

In an embodiment, the PHY preamble 2200 is for data units according to a first communication protocol that defines a common data unit format for SU data units, UL-MU data units, and DL-MU data units. In another embodiment, the PHY preamble 2200 is for data units according to a first communication protocol that defines different data unit formats for SU data units, UL-MU data units, and DL-MU data units. In some embodiments, the PHY preamble 2200 is for data units according to a first communication protocol that defines a common data unit format (e.g., having the preamble 2100 of FIG. 21) for SU data units and UL-MU data units, but a different data unit format (e.g., having the preamble 2200 of FIG. 22) for DL-MU data units.

In some embodiments, techniques described above can be used at an AP and/or a client station to generate and transmit a preamble of a data unit according to the first communication protocol such that a receiving device (e.g., the AP and/or a client station) that operates according to the first communication protocol is able to determine, using the preamble, the data unit format of the received data unit, and/or that the data unit conforms to the first communication protocol.

Figure 22:
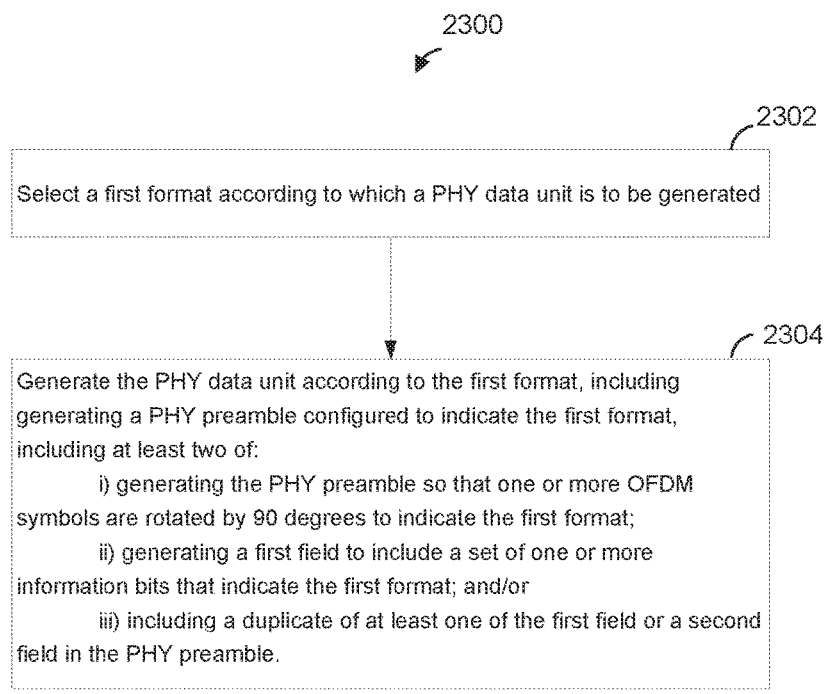
FIG. 22 is a flow diagram of an example method for generating a PHY data unit, according to an embodiment.

FIG. 22 is a flow diagram of an example method 2300 for generating a data unit, according to an embodiment. With reference to FIG. 1, the method 2300 is implemented by the network interface 16, in an embodiment. For example, in one such embodiment, the PHY processing unit 20 is configured to implement the method 2300. According to another embodiment, the MAC processing 18 is also configured to implement at least a portion of the method 2300. With continued reference to FIG. 1, in yet another embodiment, the method 2300 is implemented by the network interface 27. For example, in one such embodiment, the PHY processing unit 29 is configured to implement the method 2300. According to another embodiment, the MAC processing unit 28 is also configured to implement at least a portion of the method 2300. In other embodiments, the method 2300 is implemented by other suitable network interfaces.

At block 2302, a first format according to which a data unit is to be generated is selected from a plurality of formats. In an embodiment, the first format corresponds to the first communication protocol. In an embodiment, the first format is corresponds to one of a plurality of formats defined by the first communication protocol. In an embodiment, the first format corresponds to a mode of the first communication protocol. In some embodiments, the plurality of formats correspond to different PHY preamble formats having one or more of i) different fields, ii) different lengths of fields, iii) fields with different subfields, iv) different modulation(s) of one or more fields, etc.

At block 2304, the data unit is generated according to the selected format. Generating the data unit includes generating a PHY preamble of the data unit configured to indicate that the data unit conforms to the first format. In an embodiment, generating the PHY preamble includes generating the PHY preamble to include a first field and a second field, and generating the PHY preamble further includes at least two of: i) generating the PHY preamble so that one or more OFDM symbols are rotated by 90 degrees with respect to other OFDM symbols in the PHY preamble to indicate to receiver devices that are configured to recognize the first format that the data unit conforms to the first format, ii) generating the first field to include a set of one or more information bits that indicate to receiver devices that are configured to recognize the first format that the data unit conforms to the first format, and iii) including a duplicate of at least one of the first field and the second field in the PHY preamble, wherein the duplicate of the at least one of the first field and the second field indicates to receiver devices that are configured to recognize the first format that the data unit conforms to the first format. In an embodiment, generating the first field includes one or both of a) generating the set of one or more information bits according to a first error detection scheme that does not conform to a second error detection scheme utilized in a second format, and b) generating the set of one or more information bits to indicate a communication mode not supported in connection with the second format. For instance, in an embodiment, the second format is defined by a legacy communication protocol, and the communication mode not supported in connection with the second format is a communication mode not supported by the legacy communication protocol.

Referring to FIG. 20A, in one embodiment, the first field includes HEW-SIG field 2102. In an embodiment, the second field includes L-SIG field 806 of FIG. 20A. Referring to FIG. 21A, in another embodiment, the first field includes HEW-SIG field 2202. In an embodiment, the second field includes L-SIG field 806 of FIG. 21A. In another embodiment, the first field and the second field refer to other suitable fields in the PHY preamble 2100, the PHY preamble 2200, or another suitable PHY preamble.

In some embodiments, generating the PHY preamble so that one or more OFDM symbols are rotated by 90 degrees with respect to other OFDM symbols in the PHY preamble includes modulating fields of the PHY preamble such as described in connection with any one of FIG. 8A, 13A, 20A, or 21A.

In an embodiment, generating the set of one or more information bits according to a first error detection scheme that does not conform to a second error detection scheme utilized in a second format comprises using a first CRC scheme that is different than a second CRC scheme used in connection with the second format. For example, the set of information bits is generated according to the CRC generation scheme 1050 of FIG. 10A, the CRC generation scheme 1060 of FIG. 10B or the CRC generation scheme 1070 of FIG. 10C, in various embodiments. In other embodiments, the set of one or more information bits is generated according to other suitable error detection schemes different than an error detection schemed corresponding to the second format.

In an embodiment, generating the set of one or more information bits to indicate a communication mode not supported in connection with the second format includes generating bits to indicate a GID and MCS combination, or another suitable mode, not supported in connection with the second format.

Figure 23:
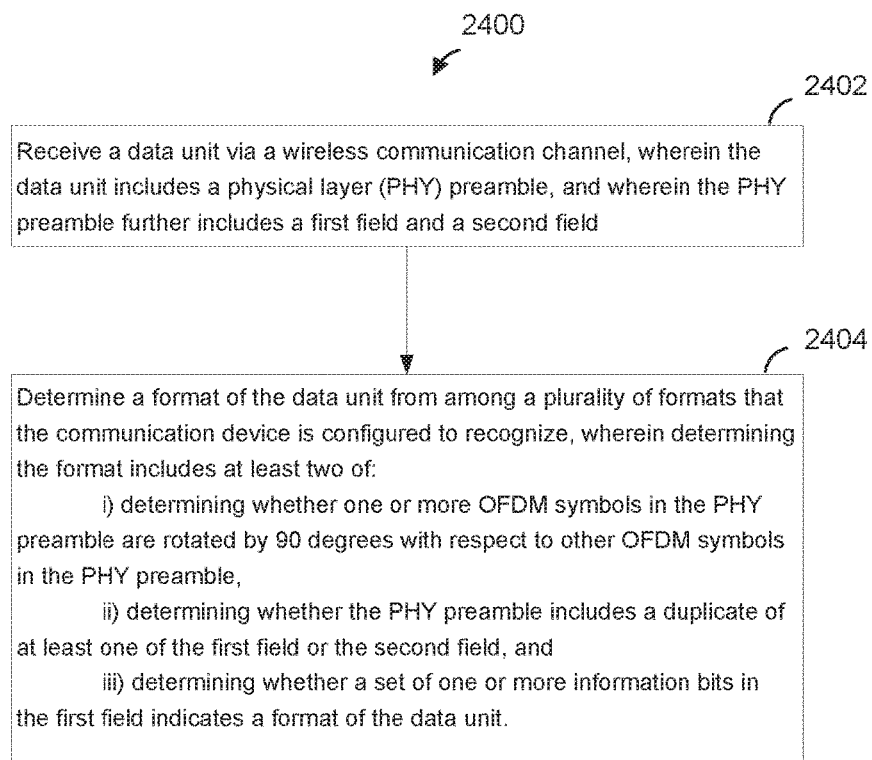
FIG. 23 is a diagram of an example method for determining a format of a received PHY data unit, according to an embodiment.

FIG. 23 is a flow diagram of an example method 2400 for determining a format of a PHY data unit, according to an embodiment. With reference to FIG. 1, the method 2400 is implemented by the network interface 16, in an embodiment. For example, in one such embodiment, the PHY processing unit 20 is configured to implement the method 2400. According to another embodiment, the MAC processing 18 is also configured to implement at least a portion of the method 2400. With continued reference to FIG. 1, in yet another embodiment, the method 2400 is implemented by the network interface 27. For example, in one such embodiment, the PHY processing unit 29 is configured to implement the method 2400. According to another embodiment, the MAC processing unit 28 is also configured to implement at least a portion of the method 2400. In other embodiments, the method 2400 is implemented by other suitable wireless network interfaces.

At block 2402, a PHY data unit including a PHY preamble is received via a wireless communication channel, wherein the PHY preamble includes a first field and a second field. In an embodiment, the data unit includes the PHY preamble 2100 of FIG. 20A. In another embodiment, the data unit includes the PHY preamble 2200 of FIG. 21A. In another embodiment, the data unit includes another suitable PHY preamble.

At block 2404, a format of the data unit is determined. Determining the format includes at least two of: i) determining whether one or more OFDM symbols in the PHY preamble are rotated by 90 degrees with respect to other OFDM symbols in the PHY preamble, ii) determining whether the PHY preamble includes a duplicate of at least one of the first field or the second field, and iii) determining whether a set of one or more information bits in the first field indicates a format of the data unit. In an embodiment, determining whether the first field includes the set of one or more information bits that indicates the format of the data unit includes one or both of a) determining whether the set of one or more information bits was generated according to a first error detection scheme that does not conform to a second error detection scheme utilized in a second format, and b) determining whether the set of one or more information bits indicate a communication mode not supported in connection with the second format. For instance, in an embodiment, the second format is defined by a legacy communication protocol, and the communication mode not supported in connection with the second format is a communication mode not supported by the legacy communication protocol.

Referring to FIG. 20A, in one embodiment, the first field includes HEW-SIG field 2102. In an embodiment, the second field includes L-SIG field 806 of FIG. 20A. Referring to FIG. 21A, in another embodiment, the first field includes HEW-SIG field 2202. In an embodiment, the second field includes L-SIG field 806 of FIG. 21A. In another embodiment, the first field and the second field refer to other suitable fields in the PHY preamble 2100, the PHY preamble 2200, or another suitable PHY preamble.

In some embodiments, determining whether one or more OFDM symbols in the PHY preamble are rotated by 90 degrees with respect to other OFDM symbols in the PHY preamble includes determining whether fields of the PHY preamble are modulated such as described in connection with any one of FIG. 8A, 13A, 20A, or 21A.

In an embodiment, determining whether a set of one or more information bits in the first field indicates a format of the data unit includes determining whether the set of one or more information bits includes a field generated according to a first error detection scheme that does not conform to a second error detection scheme utilized in a second format comprises using calculating a first CRC according to a first CRC scheme that is different than a second CRC scheme used in connection with the second format, and comparing a CRC in the PHY preamble to the first CRC. For example, techniques such as described in connection with FIG. 11 or FIG. 12 are utilized, in some example embodiments.

In an embodiment, it is determined whether the set of one or more information bits indicate a mode not supported in connection with the second format, such as a GID and MCS combination, or another suitable mode, not supported in connection with the one or more other formats.

In various embodiments, the one or more OFDM symbols in the PHY preamble rotated by 90 degrees include HEW-SIGA2 808-2 (FIG. 8A), HEW-SIGA3 1302-3 (FIG. 13A), HEW-SIGB1 2104 (FIG. 20A), or HEW-SIGA2 2203-3 (FIG. 21A). In other embodiments, the one or more OFDM symbols in the PHY preamble rotated by 90 degrees include correspond to any other suitable OFDM symbols in the PHY preamble 801 (FIG. 8A), the PHY preamble illustrated in FIG. 13A, the PHY preamble 2100 (FIG. 20A), or the PHY preamble 2200 (FIG. 21A). In some embodiments, the one or more OFDM symbols are determined to be modulated according to Q-BPSK modulation. In other embodiments, the one or more OFDM symbols in a PHY preamble are determined to be modulated according to BPSK modulation, as compared to one or more other OFDM symbols in the PHY preamble that are modulated according to Q-BPSK modulation.

Figure 24:
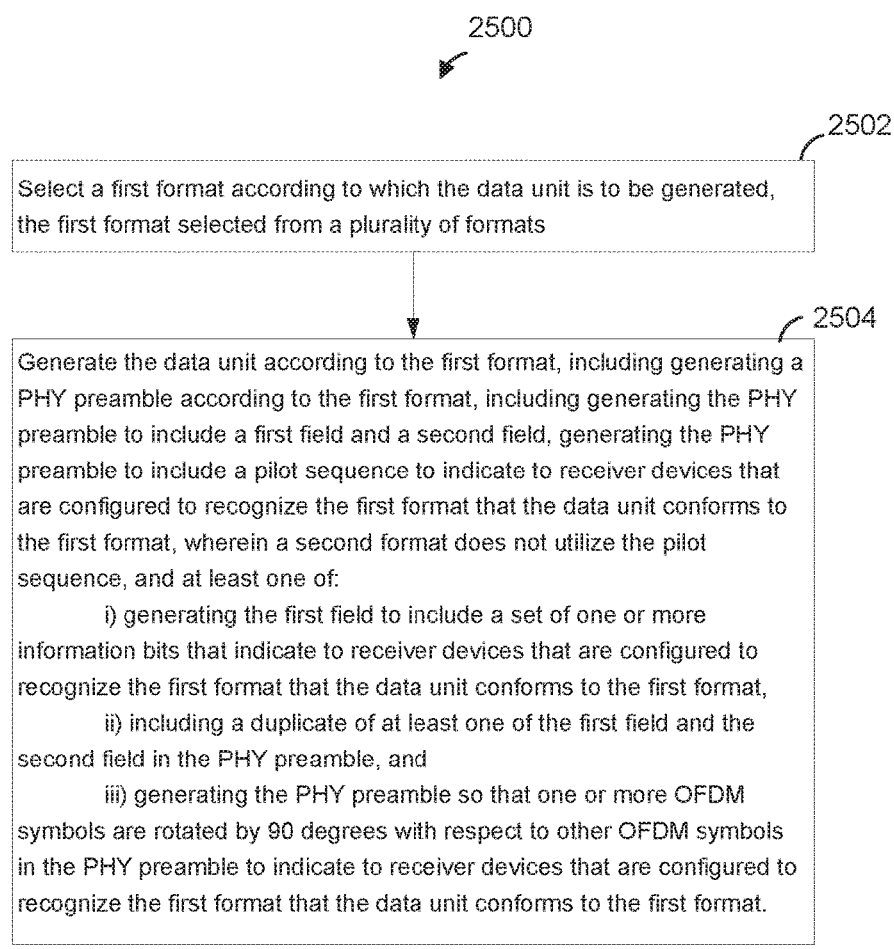
FIG. 24 is a flow diagram of another example method for generating a PHY data unit, according to another embodiment.

FIG. 24 is a flow diagram of an example method 2500 for generating a data unit, according to an embodiment. With reference to FIG. 1, the method 2500 is implemented by the network interface 16, in an embodiment. For example, in one such embodiment, the PHY processing unit 20 is configured to implement the method 2500. According to another embodiment, the MAC processing 18 is also configured to implement at least a part of the method 2500. With continued reference to FIG. 1, in yet another embodiment, the method 2500 is implemented by the network interface 27. For example, in one such embodiment, the PHY processing unit 29 is configured to implement the method 2500. According to another embodiment, the MAC processing 28 is also configured to implement at least a part of the method 2500. In other embodiments, the method 2500 is implemented by other suitable network interfaces.

At block 2502, a first format according to which a data unit is to be generated is selected from a plurality of formats. In an embodiment, the first format corresponds to the first communication protocol. In an embodiment, the first format corresponds to one of a plurality of formats defined by the first communication protocol. In an embodiment, the first format corresponds to a mode of the first communication protocol. In some embodiments, the plurality of formats correspond to different PHY preamble formats having one or more of i) different fields, ii) different lengths of fields, iii) fields with different subfields, iv) different modulation of one or more fields, etc.

At block 2504, the data unit is generated according to the selected first format. Generating the data unit includes generating a PHY preamble of the data unit. Generating the PHY preamble also includes generating the PHY preamble to include a first field and a second field. In an embodiment, generating the PHY preamble further generating the PHY preamble to include a pilot sequence to indicate to receiver devices that are configured to recognize the first format that the data unit conforms to the first format, wherein a second does not utilize the pilot sequences.

In an embodiment, generating the PHY preamble of the data unit further includes at least one of: i) generating the first field to include a set of one or more information bits that indicate to receiver devices that are configured to recognize the first format that the data unit conforms to the first format, ii) including a duplicate of at least one of the first field and the second field in the PHY preamble, wherein the duplicate of the at least one of the first field and the second field indicates to receiver devices that are configured to recognize the first format that the data unit conforms to the first format; and iii) generating the PHY preamble so that one or more OFDM symbols are rotated by 90 degrees with respect to other OFDM symbols in the PHY preamble to indicate to receiver devices that are configured to recognize the first format that the data unit conforms to the first format. In an embodiment, generating the first field to include the set of one or more information bits comprises one or both of (a) generating the set of one or more information bits according to an error detection scheme that does not conform to the second format, and (b) generating the set of one or more information bits to indicate a mode not supported in connection with the second format. For example, in an embodiment, the second format is defined by a legacy communication protocol, and the mode not supported in connection with the second format is a mode not supported by the legacy communication protocol.

In some embodiments, the pilot sequence is generated according to any of the pilots sequences described above with respect to FIGS. 17-19. In other embodiments, other suitable pilot sequences are utilized.

In an embodiment, a pilot sequence is selected from a plurality of pilot sequences corresponding to a plurality of formats. More generally, based on the selected format to be used for generating the data unit, a pattern of pilot signals that are to be included in the data unit is selected, according to an embodiment.

Referring to FIG. 20A, in an embodiment, the first field includes HEW-SIG field 2102. In an embodiment, the second field includes L-SIG field 806 of FIG. 20A. Referring to FIG. 21A, in another embodiment, the first field includes HEW-SIG field 2202. In an embodiment, the second field includes L-SIG field 806 of FIG. 21A. In another embodiment, the first field and the second field refer to other suitable fields in the PHY preamble 2100, the PHY preamble 2200, or another suitable PHY preamble.

In some embodiments, generating the PHY preamble so that one or more OFDM symbols are rotated by 90 degrees with respect to other OFDM symbols in the PHY preamble includes modulating fields of the PHY preamble such as described in connection with any one of FIG. 8A, 13A, 20A, or 21A.

In an embodiment, generating the set of one or more information bits according to a first error detection scheme that does not conform to a second error detection scheme utilized in a second format comprises using a first CRC scheme that is different than a second CRC schemed used in connection with the second format. For example, the set of information bits is generated according to the CRC generation scheme 1050 of FIG. 10A, the CRC generation scheme 1060 of FIG. 10B or the CRC generation scheme 1070 of FIG. 10C, according to various embodiments. In other embodiments, the set of one or more information bits is generated according to other suitable error detection schemes different than an error detection scheme corresponding to the second format.

In an embodiment, generating the set of one or more information bits to indicate the mode not supported in connection with the second format includes generating bits to indicate a GID and MCS combination, or another suitable mode, not supported in connection with the second format.

In one embodiment, the one or more OFDM symbols include OFDM symbols corresponding to the HEW-SIG field 2101 and HEW-SIGB1 field 2104 in FIG. 20A. In another embodiment, the one or more OFDM symbols include OFDM symbols corresponding to the HEW-SIG field 2201 in FIG. 21A. In other embodiments, the one or more OFDM symbols correspond to any other suitable fields in the PHY preamble 2100 or the PHY preamble 2200. In an embodiment, the one or more OFDM symbols are modulated according to Q-BPSK modulation whereas one or more other OFDM symbols in the PHY preamble are modulated according to BPSK modulation. In another embodiment, the one or more OFDM symbols are modulated according to BPSK modulation whereas one or more other OFDM symbols in the PHY preamble are modulated according to Q-BPSK modulation.

In an embodiment, the first format is according to the HEW communication protocol and the second format is according to a legacy communication protocol such as the IEEE 802.11ac Standard. In other embodiments, the first format and/or the second format are according to one or more other suitable communication protocols. For example, the second format corresponds to the HEW communication protocol, and the first format corresponds to another communication protocol defining even higher throughputs, in some embodiments.

Figure 25:
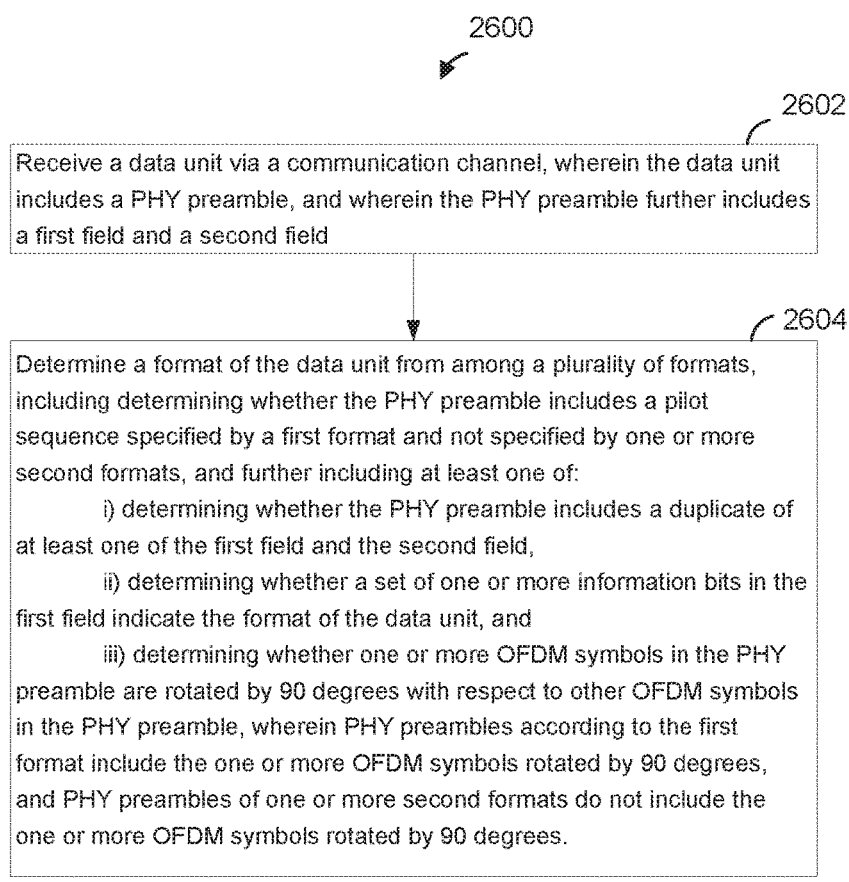
FIG. 25 is a diagram of another example method for determining a format of a received PHY data unit, according to another embodiment.

FIG. 25 is a flow diagram of an example method 2600, according to an embodiment. With reference to FIG. 1, the method 2600 is implemented by the network interface 16, in an embodiment. For example, in one such embodiment, the PHY processing unit 20 is configured to implement the method 2600. According to another embodiment, the MAC processing 18 is also configured to implement at least a part of the method 2600. With continued reference to FIG. 1, in yet another embodiment, the method 2600 is implemented by the network interface 27. For example, in one such embodiment, the PHY processing unit 29 is configured to implement the method 2600. According to another embodiment, the MAC processing 28 is also configured to implement at least a part of the method 2600. In other embodiments, the method 2600 is implemented by other suitable network interfaces.

At block 2602, a data unit including a PHY preamble is received via a wireless communication channel, wherein the PHY preamble includes a first field and a second field. In an embodiment, the data unit includes the PHY preamble 2100 of FIG. 20A. In another embodiment, the data unit includes the PHY preamble 2200 of FIG. 21A. In another embodiment, the data unit includes another suitable PHY preamble.

At block 2604, a format of the received data unit is determined. Determining the format includes determining whether the PHY preamble includes a pilot sequence specified by a first format and not specified by one or more second formats. Determining the format further includes at least one of: i) determining whether the PHY preamble includes a duplicate of at least one of the first field and the second field, wherein PHY preambles according to the first format include the duplicate of the at least one of the first field and the second field, and PHY preambles of the one or more second formats do not include the duplicate of the at least one of the first field and the second field, ii) determining whether a set of one or more information bits in the first field is set to indicate that the data unit conforms to the first format, and iii) determining whether one or more OFDM symbols in the PHY preamble are rotated by 90 degrees with respect to other OFDM symbols in the PHY preamble, wherein PHY preambles according to the format include the one or more OFDM symbols rotated by 90 degrees, and PHY preambles of one or more other formats do not include the one or more OFDM symbols rotated by 90 degrees.

In an embodiment, determining whether the set of one or more information bits in the first field is set to indicate that the data unit conforms to the first format includes at least one of (a) determining whether the set of one or more information bits was generated according to an error detection scheme specified by the format and not specified by one or more second formats, and (b) determining whether the set of one or more information bits indicates a mode supported by the format and not supported by one or more second formats. For instance, in an embodiment, the second format is defined by a legacy communication protocol, and the communication mode not supported in connection with the second format is a communication mode not supported by the legacy communication protocol.

In an embodiment, determining whether the PHY preamble includes a pilot sequence specified by the first format and not specified by one or more second formats comprises identifying a pilot sequence from among a plurality of pilot sequences corresponding to a plurality of formats. In various embodiments, determining whether the PHY preamble includes a pilot sequence specified by the first format and not specified by one or more second formats comprises determining the pilot sequence in the PHY preamble according to embodiments described above with respect to FIGS. 17-19. In other embodiments, other suitable pilot sequences are utilized.

Referring to FIG. 20A, in one embodiment, the first field includes HEW-SIG field 2102. In an embodiment, the second field includes L-SIG field 806 of FIG. 20A. Referring to FIG. 21A, in another embodiment, the first field includes HEW-SIG field 2202. In an embodiment, the second field includes L-SIG field 806 of FIG. 21A. In another embodiment, the first field and the second field refer to other suitable fields in the PHY preamble 2100, the PHY preamble 2200, or another suitable PHY preamble.

In some embodiments, determining whether one or more OFDM symbols in the PHY preamble are rotated by 90 degrees with respect to other OFDM symbols in the PHY preamble includes determining whether fields of the PHY preamble are modulated such as described in connection with any one of FIG. 8A, 13A, 20A, or 21A.

In an embodiment, determining whether the set of one or more information bits was generated according to an error detection scheme specified by the format and not specified by one or more second formats comprises determining whether the set of one or more information bits was generated according to a CRC scheme utilized in the first format, and not utilized in one or more second formats. For example, determining the error detection scheme according to which the set of information bits was generated is performed according to the embodiments discussed with reference to of FIG. 11 or FIG. 12, in various embodiments. In other embodiments, determining the error detection scheme according to which the set of one or more information bits was generated comprises determining other suitable error detection schemes according to which the set of one or more information bits was generated.

Additionally or alternatively, determining whether the set of one or more information bits indicates a mode supported by the format and not supported by one or more second formats comprises determining that the set of one or more information bits indicate a mode not supported in connection with the second format, such as a GID and MCS combination, or another suitable mode, not supported in connection with the one or more second format.

In various embodiments, the one or more OFDM symbols in the PHY preamble rotated by 90 degrees include HEW-SIGA2 808-2 (FIG. 8A), HEW-SIGA3 1302-3 (FIG. 13A), HEW-SIGB1 2104 (FIG. 20A), or HEW-SIGA2 2203-3 (FIG. 21A). In other embodiments, the one or more OFDM symbols in the PHY preamble rotated by 90 degrees include correspond to any other suitable OFDM symbols in the PHY preamble 801 (FIG. 8A), the PHY preamble illustrated in FIG. 13A, the PHY preamble 2100 (FIG. 20A), or the PHY preamble 2200 (FIG. 21A). In some embodiments, the one or more OFDM symbols are determined to be modulated according to Q-BPSK modulation. In other embodiments, the one or more OFDM symbols in a PHY preamble are determined to be modulated according to BPSK modulation, as compared to one or more other OFDM symbols in the PHY preamble that are modulated according to Q-BPSK modulation.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any non-transitory, tangible computer readable medium or media such as a magnetic disk, an optical disk, a random access memory (RAM), a read-only memory (ROM), a flash memory, a magnetic tape, etc. The software or firmware instructions may include machine readable instructions that, when executed by one or more processors, cause the one or more processors to perform various acts.

When implemented in hardware, the hardware may comprise one or more of discrete components, one or more integrated circuits, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for generating a data unit for transmission via a communication channel, the method comprising:
  selecting, at a communication device, a first format according to which the data unit is to be generated, the first format selected from a plurality of formats;
  selecting, at the communication device, a pilot sequence to be used for generating the data unit, wherein
    the pilot sequence is selected from a plurality of pilot sequences corresponding to the plurality of data unit formats,
    the pilot sequence is selected based on the selected first data unit format,
    selecting the pilot sequence includes selecting a parameter $c_{n,k}$ based on the selected first data unit format,
    $c_{n,k}$ is a sequence for an n-th orthogonal frequency division multiplexing (OFDM) symbol, and
    k is an OFDM subcarrier index;
  generating, at the communication device, the data unit according to the first format, including generating a physical layer (PHY) preamble according to the first format, wherein generating the PHY preamble includes generating the PHY preamble to include a first signal field and a second signal field, and wherein generating the PHY preamble further includes:
    generating one or more OFDM symbols of the PHY preamble according to the sequence $c_{n,k}$, and
    generating the PHY preamble to include the selected pilot sequence, modulated on one or more pilot subcarriers, in the one or more OFDM symbols; and
  wherein generating the PHY preamble further includes at least one of:
    i) generating the PHY preamble so that one or more orthogonal frequency division multiplexing (OFDM) symbols are rotated by 90 degrees with respect to other OFDM symbols in the PHY preamble,
    ii) generating, at the communication device, the first signal field to include a set of one or more information bits, and wherein generating the first signal field includes one or both of (a) generating the set of one or more information bits according to an error detection scheme that does not conform to a second format, and (b) generating the set of one or more information bits to indicate a mode not supported in connection with the second format, and
    iii) including, at the communication device, a duplicate of at least one of the first signal field and the second signal field in the PHY preamble,
  wherein the presence of the selected pilot sequence, modulated on the one or more pilot subcarriers, in the one or more OFDM symbols of the PHY preamble, and the at least one of:
    i) the one or more OFDM symbols that are rotated by 90 degrees with respect to the other OFDM symbols in the PHY preamble,
    ii) the set of one or more information bits in the first signal field in the PHY preamble that is at least one of (a) generated according to the error detection scheme that does not conform to the second format, and (b) indicates the mode not supported in connection with the second format, and iii) the duplicate of the at least one of the first signal field and the second signal field in the PHY preamble, indicates to receiver devices that the data unit conforms to the first format among the plurality of formats.

2. The method of claim 1, wherein:

at least some of the plurality of data unit formats correspond to different communication protocols;

the first format corresponds to a first communication protocol and a second format corresponds to a second communication protocol; and at least one of i) the error detection scheme does not conform to the second communication protocol, ii) the set of one or more information bits are generated to indicate a mode not supported by the second communication protocol, iii) preambles of data units that conform to the second communication protocol do not include a duplicate of the first signal field nor a duplicate of the second signal field, and iv) the second communication protocol does not specify that the one or more OFDM symbols are rotated by 90 degrees with respect to other OFDM symbols in the PHY preamble.

3. The method of claim 2, wherein:

the second signal field follows the first signal field in the PHY preamble; and at least one of:

i) the error detection scheme does not conform to the second communication protocol, and ii) the set of one or more information bits are generated to indicate a mode not supported by the second communication protocol.

4. The method of claim 2, wherein:

preambles of data units that conform to the second format do not include the selected pilot sequence.

5. The method of claim 4, wherein:

the first communication protocol defines a third format different than the first format; and at least one of i) the error detection scheme does not conform to the second communication protocol, ii) the error detection scheme does not conform to the third format, iii) the set of one or more information bits are generated to indicate a mode not supported by the second communication protocol, iv) the set of one or more information bits are generated to indicate a mode not supported by the third format, v) the second communication protocol does not specify that the one or more OFDM symbols are rotated by 90 degrees with respect to other OFDM symbols in the PHY preamble, vi) the third format does not specify that the one or more OFDM symbols are rotated by 90 degrees with respect to other OFDM symbols in the PHY preamble, and vii) preambles of data units conforming to the third format do not include the selected pilot sequence.

6. An apparatus, comprising:

a network interface device having one or more integrated circuits (ICs) configured to:

select a first format according to which a data unit is to be generated, the first format selected from a plurality of formats, and select a pilot sequence to be used for generating the data unit, wherein the pilot sequence is selected from a plurality of pilot sequences corresponding to the plurality of data unit formats, the pilot sequence is selected based on the selected first data unit format, selecting the pilot sequence includes selecting a parameter $c_{n,k}$ based on the selected first data unit format, $c_{n,k}$ is a sequence for an n-th orthogonal frequency division multiplexing (OFDM) symbol, and k is an OFDM subcarrier index;

wherein the one or more ICs are further configured to:

generate the data unit according to the first format, including generating a physical layer (PHY) preamble according to the first format, wherein generating the PHY preamble includes generating the PHY preamble to include a first signal field and a second signal field, and wherein generating the PHY preamble further includes:

generating one or more OFDM symbols of the PHY preamble according to the sequence $c_{n,k}$, and generating the PHY preamble to include the selected pilot sequence, modulated on one or more pilot subcarriers, in the one or more OFDM symbols; and wherein generating the PHY preamble further includes, at least one of:

i) generating the PHY preamble so that one or more orthogonal frequency division multiplexing (OFDM) symbols are rotated by 90 degrees with respect to other OFDM symbols in the PHY preamble, ii) generating the first signal field to include a set of one or more information bits, and wherein generating the first signal field includes one or both of (a) generating the set of one or more information bits according to an error detection scheme that does not conform to a second format, and (b) generating the set of one or more information bits to indicate a mode not supported in connection with the second format, and iii) including a duplicate of at least one of the first signal field and the second signal field in the PHY preamble, wherein the presence of the selected pilot sequence, modulated on the one or more pilot subcarriers, in the one or more OFDM symbols of the PHY preamble, and the at least one of:

i) the one or more OFDM symbols that are rotated by 90 degrees with respect to the other OFDM symbols in the PHY preamble, ii) the set of one or more information bits in the first signal field in the PHY preamble that is at least one of (a) generated according to the error detection scheme that does not conform to the second format, and (b) indicates the mode not supported in connection with the second format, and iii) the duplicate of the at least one of the first signal field and the second signal field in the PHY preamble, indicates to receiver devices that the data unit conforms to the first format among the plurality of formats.

7. The apparatus of claim 6, wherein:

at least some of the plurality of data unit formats correspond to different communication protocols;

the first format corresponds to a first communication protocol and a second format corresponds to a second communication protocol; and at least one of
- i) the error detection scheme does not conform to the second communication protocol,
- ii) the set of one or more information bits are generated to indicate a mode not supported by the second communication protocol,
- iii) preambles of data units that conform to the second communication protocol do not include a duplicate of the first signal field nor a duplicate of the second signal field, and
- iv) the second communication protocol does not specify that the one or more OFDM symbols are rotated by 90 degrees with respect to other OFDM symbols in the PHY preamble.

8. The apparatus of claim 7, wherein:

the second signal field follows the first signal field in the PHY preamble; and at least one of:
- i) the error detection scheme does not conform to the second communication protocol, and
- ii) the set of one or more information bits are generated to indicate a mode not supported by the second communication protocol.

9. The apparatus of claim 7, wherein:

wherein preambles of data units that conform to the second format do not include the selected pilot sequence.

10. The apparatus of claim 9, wherein:

the first communication protocol defines a third format different than the first format; and at least one of
- i) the error detection scheme does not conform to the second communication protocol,
- ii) the error detection scheme does not conform to the third format,
- iii) the set of one or more information bits are generated to indicate a mode not supported by the second communication protocol,
- iv) the set of one or more information bits are generated to indicate a mode not supported by the third format,
- v) the second communication protocol does not specify that the one or more OFDM symbols are rotated by 90 degrees with respect to other OFDM symbols in the PHY preamble,
- vi) the third format does not specify that the one or more OFDM symbols are rotated by 90 degrees with respect to other OFDM symbols in the PHY preamble, and
- vii) preambles of data units conforming to the third format do not include the selected pilot sequence.

11. A method, comprising:

receiving, at a communication device, a data unit via a communication channel, wherein the data unit includes a physical layer (PHY) preamble, and wherein the PHY preamble further includes a first signal field and a second signal field;

determining, at the communication device, a pilot sequence modulated on one or more pilot subcarriers of one or more orthogonal frequency division multiplexing (OFDM) symbols of the PHY preamble; and determining, at the communication device, a format of the data unit from among a plurality of formats that the communication device is configured to recognize, wherein determining the format of the data unit includes identifying, at the communication device, the pilot sequence, modulated on the one or more pilot subcarriers, of the PHY preamble from a plurality of pilot sequences corresponding to a plurality of data unit formats, wherein identifying the pilot sequence comprises identifying a sequence $c_{n,k}$, wherein n is an OFDM symbol index and k is an OFDM subcarrier index;

wherein determining the format of the data unit further includes at least one of:
- i) determining whether one or more orthogonal frequency division multiplexing (OFDM) symbols in the PHY preamble are rotated by 90 degrees with respect to other OFDM symbols in the PHY preamble, wherein PHY preambles according to the format include the one or more OFDM symbols rotated by 90 degrees, and PHY preambles of one or more other formats do not include the one or more OFDM symbols rotated by 90 degrees,
- ii) determining whether a set of one or more information bits in the first signal field is at least one of (a) generated according to an error detection scheme specified by the format and not specified by one or more other formats, and (b) indicates a mode supported by the format and not supported by one or more other formats, and
- iii) determining whether the PHY preamble includes a duplicate of at least one of the first signal field and the second signal field, wherein PHY preambles according to the format include the duplicate of the at least one of the first signal field and the second signal field, and PHY preambles of one or more other formats do not include the duplicate of the at least one of the first signal field and the second signal field.

12. The method of claim 11, wherein:

the format corresponds to a first communication protocol and one or more other formats correspond to one or more second communication protocols;

determining the format of the data unit includes at least one of
- i) determining that the error detection scheme conforms to the first communication protocol and does not conform to at least one of the one or more other second communication protocols,
- ii) determining that the set of one or more information bits indicate a mode supported by the first communication protocol and not supported by at least one of the one or more other second communication protocols,
- iii) determining that the PHY preamble includes the duplicate of at least one of the first signal field and the second signal field, wherein preambles of data units that conform to at least one of the one or more other second communication protocols do not include a duplicate of the first signal field nor a duplicate of the second signal field, and
- iv) determining that one or more OFDM symbols in the PHY preamble are rotated by 90 degrees with respect to other OFDM symbols in the PHY preamble, wherein at least one of the one or more other second communication protocols does not specify that the one or more OFDM symbols are rotated by 90 degrees with respect to other OFDM symbols in the PHY preamble.

13. The method of claim 12, wherein:
the second signal field follows the first signal field in the PHY preamble; and
determining the format of the data unit includes at least one of:
  i) determining that the set of one or more information bits in the first signal field is generated according the error detection scheme, wherein the error detection scheme does not conform to at least one of the second communication protocols, and
  ii) determining that the set of one or more information bits indicate a mode not supported by at least one of the second communication protocols.

14. The method of claim 12, wherein:
preambles of data units that conform to at least one of the second communication protocols do not include the pilot sequence.

15. The method of claim 14, wherein:
the format is a first format;
the first communication protocol defines a second format different than the first format; and
at least one of
  i) the error detection scheme does not conform to at least one of the second communication protocols,
  ii) the error detection scheme does not conform to the second format,
  iii) the set of one or more information bits are generated to indicate a mode not supported by at least one of the second communication protocols,
  iv) the set of one or more information bits are generated to indicate a mode not supported in connection with the second format,
  v) at least one of the second communication protocols does not specify that the one or more OFDM symbols are rotated by 90 degrees with respect to other OFDM symbols in the PHY preamble,
  vi) the second format does not specify that the one or more OFDM symbols are rotated by 90 degrees with respect to other OFDM symbols in the PHY preamble, and
  vii) preambles of data units conforming to the second format do not include the pilot sequence.

16. An apparatus, comprising:
a network interface device having one or more integrated circuits (ICs) configured to:
  receive a data unit via a communication channel, wherein the data unit includes a physical layer (PHY) preamble of the data unit, and wherein the PHY preamble further includes a first signal field and a second signal field,
  determine a pilot sequence modulated on one or more pilot subcarriers of one or more orthogonal frequency division multiplexing (OFDM) symbols of the PHY preamble, and
  determine a format of the data unit from among a plurality of formats that the communication device is configured to recognize, wherein determining the format includes identifying, at the communication device, the pilot sequence, modulated on the one or more pilot subcarriers, of the PHY preamble from a plurality of pilot sequences corresponding to a plurality of data unit formats, wherein identifying the pilot sequence comprises identifying a sequence $c_{n,k}$, wherein n is an OFDM symbol index and k is an OFDM subcarrier index:
wherein determining the format of the data unit further includes at least one of:
  i) determining whether one or more orthogonal frequency division multiplexing (OFDM) symbols in the PHY preamble are rotated by 90 degrees with respect to other OFDM symbols in the PHY preamble, wherein PHY preambles according to the format include the one or more OFDM symbols rotated by 90 degrees, and PHY preambles of one or more other formats do not include the one or more OFDM symbols rotated by 90 degrees,
  ii) determining whether a set of one or more information bits in the first signal field is at least one of (a) generated according to an error detection scheme specified by the format and not specified by one or more other formats, and (b) indicates a mode supported by the format and not supported by one or more other formats, and
  iii) determining whether the PHY preamble includes a duplicate of at least one of the first signal field and the second signal field, wherein PHY preambles according to the format include the duplicate of the at least one of the first signal field and the second signal field, and PHY preambles of one or more other formats do not include the duplicate of the at least one of the first signal field and the second signal field.

17. The apparatus of claim 16, wherein:
the format corresponds to a first communication protocol and one or more other formats correspond to one or more second communication protocols;
the one or more ICs are configured to at least one of
  i) determine that the error detection scheme conforms to the first communication protocol and does not conform to at least one of the one or more other second communication protocols,
  ii) determine that the set of one or more information bits are generated to indicate a mode supported by the first communication protocol and not supported by at least one of the one or more other second communication protocols,
  iii) determine that the PHY preamble includes the duplicate of the first signal field or the duplicate of the second signal field, wherein preambles of data units that conform to at least one of the one or more other second communication protocols do not include a duplicate of the first signal field nor a duplicate of the second signal field, and
  iv) determine that one or more OFDM symbols in the PHY preamble are rotated by 90 degrees with respect to other OFDM symbols in the PHY preamble, wherein at least one of the one or more other second communication protocols does not specify that the one or more OFDM symbols are rotated by 90 degrees with respect to other OFDM symbols in the PHY preamble.

18. The apparatus of claim 17, wherein:
the second signal field follows the first signal field in the PHY preamble; and
the one or more ICs are configured to at least one of:
  i) determine whether the set of one or more information bits in the first signal field is generated according the error detection scheme, wherein the error detection scheme does not conform to at least one of the second communication protocols, and
  ii) determine whether the set of one or more information bits indicate a mode not supported by at least one of the second communication protocols.

19. The apparatus of claim 17, wherein:
preambles of data units that conform to at least one of the second communication protocols do not include the pilot sequence.

20. The apparatus of claim 19, wherein:
the format is a first format;
the first communication protocol defines a second format different than the first format; and
at least one of
- i) the error detection scheme does not conform to at least one of the second communication protocols,
- ii) the error detection scheme does not conform to the second format,
- iii) the set of one or more information bits are generated to indicate a mode not supported by at least one of the second communication protocols,
- iv) the set of one or more information bits are generated to indicate a mode not supported in connection with the second format,
- v) at least one of the second communication protocols does not specify that the one or more OFDM symbols are rotated by 90 degrees with respect to other OFDM symbols in the PHY preamble,
- vi) the second format does not specify that the one or more OFDM symbols are rotated by 90 degrees with respect to other OFDM symbols in the PHY preamble, and
- vii) preambles of data units conforming to the second format do not include the pilot sequence.

\* \* \* \* \*